(12) United States Patent
Piao et al.

(10) Patent No.: US 11,405,605 B2
(45) Date of Patent: *Aug. 2, 2022

(54) ENCODING METHOD AND DEVICE THEREFOR, AND DECODING METHOD AND DEVICE THEREFOR

(71) Applicant: SAMSUNG ELECTRONICS CO., LTD., Suwon-si (KR)

(72) Inventors: Yin-ji Piao, Yongin-si (KR); Jie Chen, Seoul (KR); Chan-yul Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

This patent is subject to a terminal disclaimer.

(21) Appl. No.: 16/940,986

(22) Filed: Jul. 28, 2020

(65) Prior Publication Data

US 2020/0359015 A1   Nov. 12, 2020

Related U.S. Application Data

(63) Continuation of application No. 16/345,950, filed as application No. PCT/KR2017/012135 on Oct. 31, 2017, now Pat. No. 10,798,375.

(Continued)

(51) Int. Cl.
*H04N 19/46* (2014.01)
*H04N 19/52* (2014.01)
(Continued)

(52) U.S. Cl.
CPC ......... *H04N 19/105* (2014.11); *H04N 19/119* (2014.11); *H04N 19/129* (2014.11);
(Continued)

(58) Field of Classification Search
CPC .. H04N 19/105; H04N 19/117; H04N 19/119; H04N 19/129; H04N 19/137;
(Continued)

(56) References Cited

U.S. PATENT DOCUMENTS 9,491,467 B2   11/2016   Kim et al.
10,178,393 B2   1/2019   Choi et al.
(Continued)

FOREIGN PATENT DOCUMENTS

KR   10-1014660 B1   2/2011
KR   1020130085391 A   7/2013
(Continued)

OTHER PUBLICATIONS

Communication dated Jun. 6, 2019, issued by the European Patent Office in counterpart European Application No. 17866548.5.
(Continued)

*Primary Examiner* — Anner N Holder
(74) *Attorney, Agent, or Firm* — Sughrue Mion, PLLC

(57) ABSTRACT

Provided is a video decoding method including obtaining, from a bitstream, split information indicating whether a current block is to be split; when the split information does not indicate that the current block is to be split, decoding the current block according to encoding information about the current block; and when the split information indicates that the current block is to be split, splitting the current block into at least two lower blocks, obtaining encoding order information indicating an encoding order of the at least two lower blocks of the current block from the bitstream, determining a decoding order of the at least two lower blocks according to the encoding order information, and decoding the at least two lower blocks according to the decoding order.

3 Claims, 43 Drawing Sheets

Related U.S. Application Data

(60) Provisional application No. 62/415,619, filed on Nov. 1, 2016.

(51) Int. Cl.

| | | |
|---|---|---|
| *H04N 19/70* | (2014.01) | |
| *H04N 19/82* | (2014.01) | |
| *H04N 19/88* | (2014.01) | |
| *H04N 19/96* | (2014.01) | |
| *H04N 19/105* | (2014.01) | |
| *H04N 19/117* | (2014.01) | |
| *H04N 19/119* | (2014.01) | |
| *H04N 19/129* | (2014.01) | |
| *H04N 19/137* | (2014.01) | |
| *H04N 19/159* | (2014.01) | |
| *H04N 19/176* | (2014.01) | |
| *H04N 19/186* | (2014.01) | |
| *H04N 19/583* | (2014.01) | |
| *H04N 19/593* | (2014.01) | |

(52) U.S. Cl.
CPC ......... *H04N 19/137* (2014.11); *H04N 19/159* (2014.11); *H04N 19/176* (2014.11); *H04N 19/186* (2014.11); *H04N 19/46* (2014.11); *H04N 19/52* (2014.11); *H04N 19/593* (2014.11); *H04N 19/88* (2014.11); *H04N 19/96* (2014.11); *H04N 19/117* (2014.11); *H04N 19/583* (2014.11); *H04N 19/70* (2014.11); *H04N 19/82* (2014.11)

(58) Field of Classification Search
CPC .. H04N 19/159; H04N 19/176; H04N 19/186; H04N 19/46; H04N 19/52; H04N 19/583; H04N 19/593; H04N 19/70; H04N 19/82; H04N 19/88; H04N 19/96
See application file for complete search history.

(56) References Cited

U.S. PATENT DOCUMENTS

| | | |
|---|---|---|
| 2005/0089094 A1 | 4/2005 | Yoo et al. |
| 2011/0150085 A1 | 6/2011 | Andrijanic et al. |
| 2012/0014438 A1 | 1/2012 | Segall |
| 2012/0020579 A1 | 1/2012 | Choi et al. |
| 2013/0083857 A1 | 4/2013 | Zheng et al. |
| 2013/0114692 A1 | 5/2013 | Sze et al. |
| 2013/0128974 A1 | 5/2013 | Chien |
| 2014/0286413 A1 | 9/2014 | Joshi |
| 2014/0341283 A1 | 11/2014 | Choi et al. |
| 2015/0350640 A1 | 12/2015 | Jeong |
| 2016/0219276 A1 | 7/2016 | Li |
| 2016/0234511 A1* | 8/2016 | Zheng ............... H04N 19/119 |
| 2017/0251213 A1 | 8/2017 | Ye |
| 2017/0353721 A1 | 12/2017 | Piao et al. |
| 2018/0139453 A1* | 5/2018 | Park ............... H04N 19/119 |
| 2019/0028731 A1 | 1/2019 | Chuang |
| 2019/0158870 A1 | 5/2019 | Xu |

FOREIGN PATENT DOCUMENTS

| | | |
|---|---|---|
| KR | 10-2014-0064748 A | 5/2014 |
| KR | 10-2014-0136413 A | 11/2014 |
| KR | 10-1648910 B1 | 8/2016 |

OTHER PUBLICATIONS

Taichiro Shiodera et al., "Block Based Extra/Inner-Polating Prediction for Intra Coding", Image Processing, IEEE International Conference on, IEEE, P, Sep. 1, 2007, pp. VI-445-VI-448, (4 pages total).

Jian-Liang Lin et al., "Motion Vector Coding in the HEVC Standard", IEEE Journal of Selected Topics in Signal Processing, vol. 7, No. 6, Dec. 1, 2013, pp. 957-968 (12 pages total).

Gary J. Sullivan, "Overview of the High Efficiency Video Coding (HEVC) Standard", IEEE Transactions on Circuits and Systems for Video Technology , Jan. 1, 2012, pp. 1-19, (19 pages total).

Search Report and Written Opinion dated Feb. 13, 2018, issued by the International Searching Authority in International Application No. PCT/KR2017/012135 (PCT/ISA/210 and PCT/ISA/237).

Chen, J., "Further improvements to HMKTA-1.0", Jun. 23, 2015, ITU—Telecommunications Standardization Sector, 52nd Meeting: Jun. 19-26, 2015, Document VCEG-Az07_v2, 9 pages total.

Alshina, E., et al., "Known tools performance investigation for next generation video coding", Jun. 23, 2015, ITU—Telecommunications Standardization Sector, Video Coding Experts Group (VCEG), 52nd Meeting: Jun. 19-26, 2015, 7 pages total.

Chien, W. & Karczewicz, M., Extension of Advanced Temporal Motion Vector Predictor (ATMVP), Jun. 23, 2015, ITU—Telecommunications Standardization Sector, Video Coding Experts Group (VCEG), 52nd Meeting: Jun. 19-26, 2015, Document VCEG-Az10, 4 pages total.

Chen, J., et al., "Algorithm Description of Joint Exploration Test Model 3", Joint Video Exploration Team (JVET) of ITU-T SG 16 WP 3 and ISO/IEC JTC 1/SC 29/WG 11, May-Jun. 1, 2016, Document: JVET-C1001 v1; pp. 1-32 (35 pages).

Communication dated Jun. 17, 2021 issued by the Korean Intellectual Property Office in Korean Application No. 10-2019-7003994.

Communication dated Jun. 30, 2021 issued by the European Patent Office in application No. 17866548.5.

Huang, H., et al., "Control-Point Representation and Differential Coding Affine-Motion Compensation", IEEE Transactions on Circuits and Systems for Video Technology, vol. 23, No. 10, Oct. 2013, pp. 1651-1660.

McCann, K., et al., "Samsung's Response to the Call for Proposals on Video Compression Technology", Joint Collaborative Team on Video Coding (JCT-VC) of ITU-T SG16 WP3 and ISO/IEC JTC1/SC29/WG11, Apr. 15-23, 2010, Document: JCTVC-A124, pp. 1-40.

Sze, V., et al., "High Efficiency Video Coding (HEVC)", Integrated Circuits and Systems: Algorithms and Architectures, Springer, Aug. 24, 2014, pp. 1-372 (375 pages).

Shunsuke Iwamura et al., "Direction-dependent scan order with JEM tools", NHK, May 26-Jun. 1, 2016, Joint Video Exploration Team (JVET) of ITU-T SG 16 WP 3 and ISO/IEC JTC 1/SC 29/WG 11, 3rd Meeting, Geneva, CH, Document: JVET-C0069, pp. 1-6 (6 pages total).

Communication dated Dec. 6, 2021 issued by the Korean Intellectual Property Office in Korean Application No. 10-2019-7003994.

Communication dated Jun. 16, 2022 issued by the Korean Intellectual Property Office in Korean Application No. 10-2019-7003994.

* cited by examiner

FIG. 12

| BLOCK SHAPE / DEPTH | 0: SQUARE | 1: NS_VER | 2: NS_HOR |
|---|---|---|---|
| DEPTH D | 1200 ▢ | 1210 ▯ | 1220 ▭ |
| DEPTH D+1 | ▫—1202 | ▯—1212 | ▭—1222 |
| DEPTH D+2 | ▫—1204 | ▯—1214 | ▭—1224 |
| ... | ... | ... | ... |

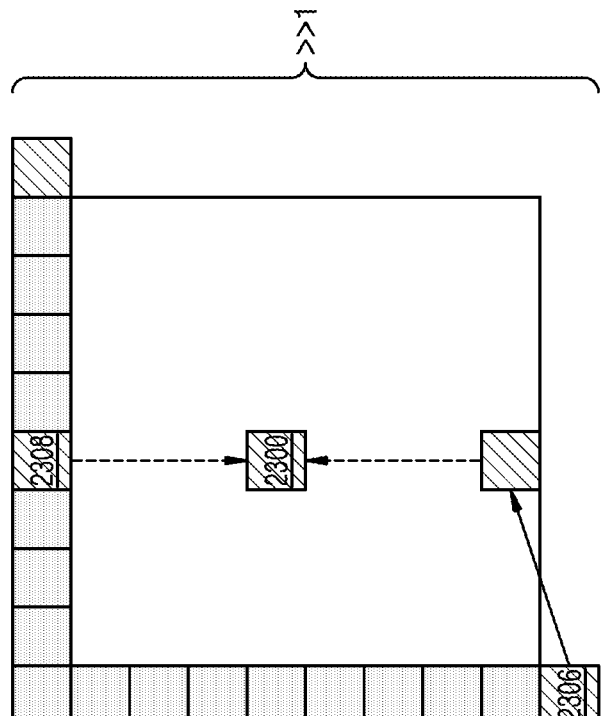
FIG. 23A
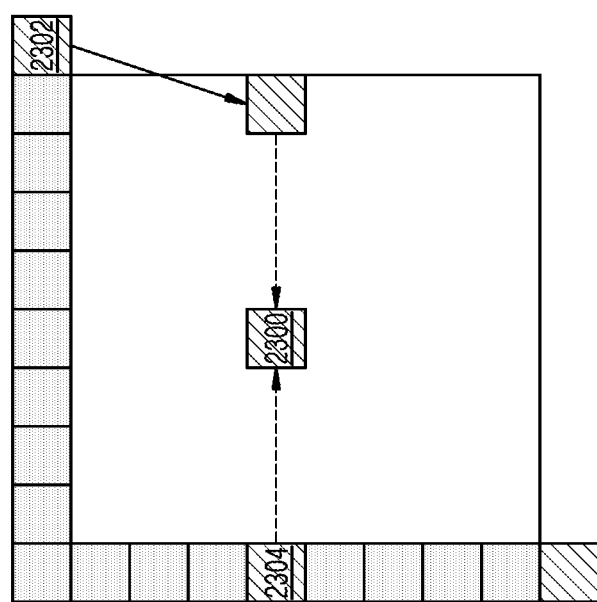

ENCODING METHOD AND DEVICE THEREFOR, AND DECODING METHOD AND DEVICE THEREFOR

CROSS-REFERENCE TO RELATED APPLICATIONS

This application is a Continuation Application of U.S. patent application Ser. No. 16/345,950, filed on Apr. 29, 2019, which is a National Stage of International Application No. PCT/KR2017/012135, filed Oct. 31, 2017, claiming priority based on U.S. Patent Application No. 62/415,619, filed Nov. 1, 2016, the contents of all of which are incorporated herein by reference in their entirety.

TECHNICAL FIELD

The present disclosure relates to a video encoding method and a video decoding method, and more particularly, to an intra or inter prediction method for methods and devices for determining encoding and decoding orders of an image.

BACKGROUND ART

When a video of high quality is encoded, a large amount of data is required. However, because a bandwidth available for transmission of the video data is limited, a data rate applied to transmission of the video data may be limited. Therefore, for efficient transmission of video data, there is a need for video data encoding and decoding methods with minimal deterioration in image quality and increased compression rates.

Video data may be compressed by removing spatial redundancy and temporal redundancy between pixels. Because adjacent pixels generally have common characteristics, encoding information of a data unit consisting of pixels is transmitted to remove redundancy between the adjacent pixels.

Pixel values of the pixels included in the data unit are not directly transmitted but information about a method of obtaining the pixel values is transmitted. A prediction method, in which a pixel value that is similar to an original value is predicted, is determined for each data unit, and encoding information about the prediction method is transmitted from an encoder to a decoder. Because a prediction value is not completely equal to the original value, residual data of a difference between the original value and the prediction value is transmitted from the encoder to the decoder.

When prediction is exact, an amount of the encoding information for specifying the prediction method is increased but a size of the residual data is decreased. Therefore, the prediction method is determined, in consideration of sizes of the encoding information and the residual data. In particular, a data unit that is split from a picture has various sizes, and in this regard, when a size of the data unit is increased, there is an increased probability that accuracy of prediction is decreased, whereas an amount of encoding information is decreased. Thus, a size of a block is determined according to characteristics of a picture.

The prediction method includes intra prediction and inter prediction. The intra prediction is a method of predicting pixels of a block from pixels adjacent to the block. The inter prediction is a method of predicting pixels by referring to pixels of a different picture referred to for a picture including the block. Therefore, spatial redundancy is removed by the intra prediction, and temporal redundancy is removed by the inter prediction.

When the number of prediction methods is increased, an amount of encoding information for indicating the prediction method is increased. Thus, the amount of the encoding information may be decreased by predicting, from a different block, the encoding information to be applied to a block.

Because loss of video data is allowed to the extent that the human eye cannot recognize the loss, residual data may be lossy-compressed according to transformation and quantization processes, and by doing so, an amount of the residual data may be decreased.

DESCRIPTION OF EMBODIMENTS

Technical Problem

Provided is a video encoding method of determining whether to split a current block and an encoding order of lower blocks, and determining an encoding method according to whether neighboring blocks of the current block have been encoded. Provided is a video decoding method of splitting a current block, determining an encoding order of split lower blocks, and determining an encoding method according to whether neighboring blocks of the current block have been encoded. In addition, a computer-readable recording medium having recorded thereon a program for executing the video encoding method and the video decoding method according to an embodiment on a computer is provided.

Solution to Problem

Provided is a video decoding method including obtaining, from a bitstream, split information indicating whether a current block is to be split; when the split information does not indicate that the current block is to be split, decoding the current block according to encoding information about the current block; and when the split information indicates that the current block is to be split, splitting the current block into at least two lower blocks, obtaining encoding order information indicating an encoding order of the at least two lower blocks of the current block from the bitstream, determining a decoding order of the at least two lower blocks according to the encoding order information, and decoding the at least two lower blocks according to the decoding order.

Provided is a video decoding device including a block splitter configured to split a current block into at least two lower blocks when split information indicating whether the current block is to be split indicates that the current block is to be split; an encoding order determiner configured to determine, when the current block is split into the at least two lower blocks, a decoding order of the at least two lower blocks according to encoding order information indicating an encoding order of the at least two lower blocks; a prediction method determiner configured to determine a prediction method for the current block when the split information indicates that the current block is not to be split; and a decoder configured to reconstruct the current block according to a result of prediction according to the prediction method.

Provided is a video encoding method including splitting a current block into at least two lower blocks; determining, according to a result of the splitting of the current block, whether to split the current block, and generating split information indicating whether the current block is to be split; according to coding efficiency of the current block, determining an encoding order of the at least two lower blocks of the current block, and generating encoding order information indicating an encoding order of the at least two lower blocks; and outputting a bitstream including the split information and the encoding order information.

Provided is a video encoding device including an encoding information generator configured to split a current block into at least two lower blocks; determine, according to a result of the splitting of the current block, whether to split the current block; generate split information indicating whether the current block is to be split, according to coding efficiency of the current block; determine an encoding order of the at least two lower blocks of the current block; and generate encoding order information indicating an encoding order of the at least two lower blocks; and an output unit configured to output a bitstream including the split information and the encoding order information.

Provided is a non-transitory computer-readable recording medium having recorded thereon a program for performing the video encoding method and the video decoding method.

The technical problems of the present disclosure are not limited to the aforementioned technical features, and other unstated technical problems may be inferred from embodiments below.

Advantageous Effects of Disclosure

Whether to split a current block and an encoding order of a lower block are determined, and a prediction method for the lower block is determined according to the encoding order of the lower block, so that coding efficiency of an image is increased.

BRIEF DESCRIPTION OF DRAWINGS

FIG. 12 illustrates a process of determining a depth of a coding unit when a shape and size of the coding unit change, in a case where a plurality of coding units are determined when the coding unit is recursively split, according to an embodiment.

FIGS. 23A to 23C illustrate a prediction method in a planar mode according to whether a right block has been decoded.

BEST MODE

Figure 1A:
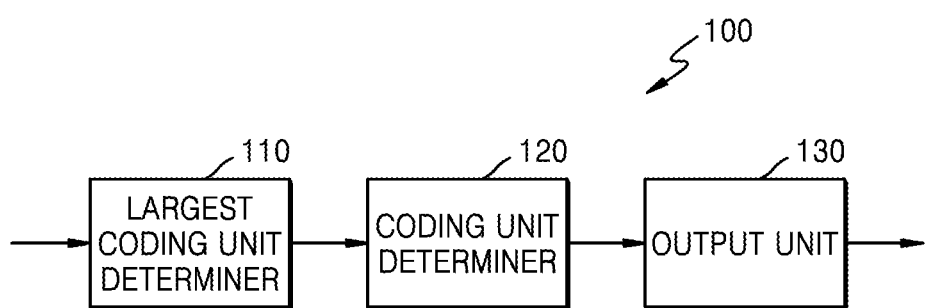
FIG. 1A illustrates a block diagram of an image encoding device based on coding units according to a tree structure, according to an embodiment of the present disclosure.

Provided is a video decoding method including obtaining, from a bitstream, split information indicating whether a current block is to be split; when the split information does not indicate that the current block is to be split, decoding the current block according to encoding information about the current block; and when the split information indicates that the current block is to be split, splitting the current block into at least two lower blocks, obtaining encoding order information indicating an encoding order of the at least two lower blocks of the current block from the bitstream, determining a decoding order of the at least two lower blocks according to the encoding order information, and decoding the at least two lower blocks according to the decoding order.

Provided is a video decoding device including a block splitter configured to split a current block into at least two lower blocks when split information indicating whether the current block is to be split indicates that the current block is to be split; an encoding order determiner configured to determine, when the current block is split into the at least two lower blocks, a decoding order of the at least two lower blocks according to encoding order information indicating an encoding order of the at least two lower blocks; a prediction method determiner configured to determine a prediction method for the current block when the split information indicates that the current block is not to be split; and a decoder configured to reconstruct the current block according to a result of prediction according to the prediction method.

Mode of Disclosure

Advantages and features of one or more embodiments of the present disclosure and methods of accomplishing the same may be understood more readily by reference to the following detailed description of the embodiments and the accompanying drawings. In this regard, the present disclosure may, however, be embodied in many different forms and should not be construed as being limited to the embodiments set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs specific functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, variables, or the like. A function provided by the components and "units" may be associated with the smaller number of components and "units", or may be divided into additional components and "units"

The term "current block" refers to one of a coding unit, a prediction unit, and a transform unit which are currently to be encoded or decoded. In addition, the term "lower block" refers to a data unit split from the "current block". The term "upper block" refers to a data unit including the "current block".

Hereinafter, a "sample" is data allocated to a sampling location of an image and may mean data that is a processing target. For example, pixel values in an image of a spatial domain or transform coefficients on a transformation domain may be samples. A unit including at least one sample may be defined as a block.

The present disclosure will now be described more fully with reference to the accompanying drawings for one of ordinary skill in the art to be able to perform the present disclosure without any difficulty. In addition, portions irrelevant to the descriptions of the present disclosure will be omitted in the drawings for clear descriptions of the present disclosure.

FIG. 1A illustrates a block diagram of an image encoding device 100 based on coding units according to a tree structure, according to an embodiment of the present disclosure.

The image encoding device 100 includes a largest coding unit determiner 110, a coding unit determiner 120, and an output unit 130.

The largest coding unit determiner 110 splits a picture or a slice included in the picture into a plurality of largest coding units, according to a size of a largest coding unit. The largest coding unit may be a data unit having a size of 32×32, 64×64, 128×128, 256×256, or the like, wherein a shape of the data unit is a square having a width and length in squares of 2. The largest coding unit determiner 110 may provide largest coding unit size information indicating the size of the largest coding unit to the output unit 130. The largest coding unit size information may be included in a bitstream by the output unit 130.

The coding unit determiner 120 determines coding units by splitting the largest coding unit. A coding unit may be determined by its largest size and depth. A depth may be defined as the number of times that the coding unit is spatially split from the largest coding unit. When the depth is increased by 1, the coding unit is split into at least two coding units. Therefore, when the depth is increased, sizes of coding units according to depths are each decreased. Whether to split a coding unit is determined according to whether splitting the coding unit is efficient according to rate-distortion optimization. Then, split information indicating whether the coding unit is to be split may be generated. The split information may be expressed as a form of a flag.

The coding unit may be split by using various methods. For example, a square coding unit may be split into four square coding units of which width and height are half of those of the square coding unit. The square coding unit may be split into two rectangular coding units of which width is half. The square coding unit may be split into two rectangular coding units of which height is half. The square coding unit may be split into three coding units in a manner that a width or height thereof is split by 1:2:1.

A rectangular coding unit of which width is twice as large as a height may be split into two square coding units. The rectangular coding unit of which width is twice as large as the height may be split into two rectangular coding units of which width is four times larger than a height. The rectangular coding unit of which width is twice as large as the height may be split into two rectangular coding units and one square coding unit in a manner that the width is split by 1:2:1.

Equally, a rectangular coding unit of which height is twice as large as a width may be split into two square coding units. The rectangular coding unit of which height is twice as large as the width may be split into two rectangular coding units of which height is four times larger than a width. Equally, the rectangular coding unit of which height is twice as large as the width may be split into two rectangular coding units and one square coding unit in a manner that the height is split by 1:2:1.

When the image encoding device 100 is capable of using two or more split methods, information about a split method that is usable to a coding unit, the split method being from among the split methods that are available to the image encoding device 100, may be determined for each picture. Therefore, only specific split methods may be used for each picture. When the image encoding device 100 uses only one split method, the information about a split method that is usable to a coding unit is not separately determined.

When split information of a coding unit indicates that the coding unit is to be split, split shape information indicating a split method with respect to the coding unit may be generated. When only one split method is usable in a picture including the coding unit, the split shape information may not be generated. When the split method is determined to be adaptive to encoding information adjacent to the coding unit, the split shape information may not be generated.

The largest coding unit may be split to smallest coding units according to smallest coding unit size information. A depth of the largest coding unit may be defined to be an uppermost depth, and a depth of the smallest coding units may be defined to be a lowermost depth. Therefore, a coding unit having an upper depth may include a plurality of coding units having a lower depth.

As described above, according to a largest size of a coding unit, image data of a current picture is split into a largest coding unit. The largest coding unit may include coding units that are split according to depths. Because the largest coding unit is split according to the depths, image data of a spatial domain included in the largest coding unit may be hierarchically split according to the depths.

A maximum depth that limits the maximum number of hierarchically splitting the largest coding unit or a minimum size of a coding unit may be preset.

The coding unit determiner 120 compares coding efficiency of hierarchically splitting a coding unit with coding efficiency of not splitting the coding unit. Then, the coding unit determiner 120 determines whether to split the coding unit according to a result of the comparison. When the coding unit determiner 120 determines that splitting the coding unit is more efficient, the coding unit determiner 120 hierarchically splits the coding unit. However, according to the result of the comparison, when the coding unit determiner 120 determines that not splitting the coding unit is more efficient, the coding unit determiner 120 does not split the coding unit. Whether to split the coding unit may be independently determined from whether a neighboring different coding unit is split.

According to an embodiment, whether to split the coding unit may be determined from a coding unit having a large depth, during an encoding procedure. For example, coding efficiency of a coding unit having a maximum depth is compared with coding efficiency of a coding unit having a depth that is less than the maximum depth by 1, and it is determined which one of coding units having the maximum depth and coding units having the depth that is less than the maximum depth by 1 is efficiently encoded in each area of a largest coding unit. According to a result of the determination, whether to split the coding units having the depth that is less than the maximum depth by 1 is determined in each area of the largest coding unit. Afterward, it is determined which one of coding units having a depth that is less than the maximum depth by 2 and one of the coding units having the maximum depth and the coding units having the depth that is less than the maximum depth by 1, the one having been selected according to the result of the determination, are further efficiently encoded in each area of the largest coding unit. The same determination process is performed on each of coding units having a smaller depth, and finally, whether to split the largest coding unit is determined according to which one of the largest coding unit and a hierarchical structure generated by hierarchically splitting the largest coding unit is further efficiently encoded.

Whether to split the coding unit may be determined from a coding unit having a small depth, during the encoding procedure. For example, coding efficiency of the largest coding unit is compared with coding efficiency of a coding unit of which depth is greater than the largest coding unit by 1, and it is determined which one of the largest coding unit and coding units of which depth is greater than the largest coding unit by 1 is efficiently encoded. When the coding efficiency of the largest coding unit is better, the largest coding unit is not split. When coding efficiency of the coding units of which depth is greater than the largest coding unit by 1 is better, the largest coding unit is split, and the comparison process is equally applied to split coding units.

When coding efficiency is examined from a coding unit having a large depth, calculation is large but a tree structure having high coding efficiency is obtained. On the contrary, when the coding efficiency is examined from a coding unit having a small depth, calculation is small but a tree structure having low coding efficiency is obtained. Therefore, in consideration of coding efficiency and calculation, an algorithm for obtaining a hierarchical tree structure of a largest coding unit may be designed by using various methods.

To determine efficiency of a coding unit according to each depth, the coding unit determiner 120 determines prediction and transformation methods that are most efficient to the coding unit. To determine the most efficient prediction and transformation methods, the coding unit may be split into predetermined data units. A data unit may have one of various shapes according to a method of splitting the coding unit. The method of splitting the coding unit which is performed to determine the data unit may be defined as a partition mode. For example, when a coding unit of 2N×2N (where N is a positive integer) is no longer split, a size of a prediction unit included in the coding unit is 2N×2N. When the coding unit of 2N×2N is split, the size of the prediction unit included in the coding unit may be 2N×N, N×2N, or N×N, according to the partition mode. The partition mode according to the present embodiment may generate symmetrical data units obtained by symmetrically splitting a height or width of the coding unit, data units obtained by asymmetrically splitting the height or width of the coding unit, such as 1:n or n:1, data units obtained by diagonally splitting the coding unit, data units obtained by geometrically splitting the coding unit, partitions having arbitrary shapes, or the like.

The coding unit may be predicted and transformed based on a data unit included in the coding unit. However, according to the present embodiment, a data unit for prediction and a data unit for transformation may be separately determined. The data unit for prediction may be defined as a prediction unit, and the data unit for transformation may be defined as a transform unit. A partition mode applied to the prediction unit and a partition mode applied to the transform unit may be different from each other, and prediction of the prediction unit and transformation of the transform unit may be performed in a parallel and independent manner in the coding unit.

To determine an efficient prediction method, the coding unit may be split into at least one prediction unit. Equally, to determine an efficient transformation method, the coding unit may be split into at least one transform unit. The split into the prediction unit and the split into the transform unit may be independently performed from each other. However, when a reconstructed sample in the coding unit is used in intra prediction, a dependent relation is established between prediction units or transform units included in the coding unit, so that the split into the prediction unit and the transform unit may affect each other.

The prediction unit included in the coding unit may be predicted through intra prediction or inter prediction. The intra prediction involves predicting prediction-unit samples by using reference samples adjacent to the prediction unit. The inter prediction involves predicting prediction-unit samples by obtaining reference samples from a reference picture that is referred to for a current picture.

For the intra prediction, the coding unit determiner 120 may apply a plurality of intra prediction methods to the prediction unit, thereby selecting the most efficient intra prediction method. The intra prediction method includes a discrete cosine (DC) mode, a planar mode, directional modes such as a vertical mode and a horizontal mode, or the like.

When a reconstructed sample adjacent to a coding unit is used as a reference sample, the intra prediction may be performed on each prediction unit. However, when a reconstructed sample in the coding unit is used as a reference sample, reconstruction with respect to the reference sample in the coding unit has to precede prediction with respect to the reference sample in the coding unit, so that a prediction order of a prediction unit may depend on a transformation order of a transform unit. Therefore, when the reconstructed sample in the coding unit is used as the reference sample, only an intra prediction method for transform units corresponding to the prediction unit, and actual intra prediction may be performed on each transform unit.

The coding unit determiner 120 may determine an optimal motion vector and a reference picture, thereby selecting the most efficient inter prediction method. For inter prediction, the coding unit determiner 120 may determine a plurality of motion vector candidates from a coding unit that is spatially and temporally adjacent to a current coding unit, and may determine, from among them, the most efficient motion vector to be a motion vector. Equally, the coding unit determiner 120 may determine a plurality of reference picture candidates from the coding unit that is spatially and temporally adjacent to the current coding unit, and may determine the most efficient reference picture from among them. According to an embodiment, the reference picture may be determined from reference picture lists that are predetermined with respect to a current picture. According to an embodiment, for accuracy of prediction, the most efficient motion vector from among the plurality of motion vector candidates may be determined to be a motion vector predictor, and a motion vector may be determined by compensating for the motion vector predictor. The inter prediction may be performed in parallel on each prediction unit in the coding unit.

The coding unit determiner 120 may reconstruct the coding unit by obtaining only information indicating the motion vector and the reference picture, according to a skip mode. According to the skip mode, all encoding information including a residual signal is skipped, except for the information indicating the motion vector and the reference picture. Because the residual signal is skipped, the skip mode may be used when accuracy of prediction is very high.

A partition mode to be used may be limited according to the prediction method for the prediction unit. For example, only partition modes for a prediction unit having a size of 2N×2N or N×N may be applied to intra prediction, whereas partition modes for a prediction unit having a size of 2N×2N, 2N×N, N×2N, or N×N may be applied to inter prediction. In addition, only a partition mode for a prediction unit having a size of 2N×2N may be applied to a skip mode of the inter prediction. The image encoding device 100 may change a partition mode for each prediction method, according to coding efficiency.

The image encoding device 100 may perform transformation based on a coding unit or a transform unit included in the coding unit. The image encoding device 100 may transform residual data that is a difference value between an original value and a prediction value with respect to pixels included in the coding unit. For example, the image encoding device 100 may perform lossy-compression on the residual data through quantization and discrete cosine transform (DCT)/discrete sine transform (DST). Alternatively, the image encoding device 100 may perform lossless-compression on the residual data without the quantization.

The image encoding device 100 may determine a transform unit that is the most efficient one for quantization and transformation. The transform unit in the coding unit may be recursively split into smaller sized regions in a manner similar to that in which the coding unit is split according to the tree structure, according to an embodiment. Thus, residual data in the coding unit may be split according to the transform unit having the tree structure according to transformation depths. The image encoding device 100 may generate transformation split information about splitting the coding unit and the transform unit according to the determined tree structure of the transform unit.

A transformation depth indicating the number of splitting times to reach the transform unit by splitting the height and width of the coding unit may also be set in the image encoding device 100. For example, in a current coding unit of 2N×2N, a transformation depth may be 0 when the size of a transform unit is 2N×2N, may be 1 when the size of the transform unit is N×N, and may be 2 when the size of the transform unit is N/2×N/2. That is, the transform unit according to the tree structure may be set according to the transformation depth.

In conclusion, the coding unit determiner 120 determines a prediction method that is the most efficient one for a current prediction unit and is from among a plurality of intra prediction methods and inter prediction methods. Then, the coding unit determiner 120 determines a prediction unit determination scheme according to coding efficiency according to a prediction result. Equally, the coding unit determiner 120 determines a transform unit determination scheme according to coding efficiency according to a transformation result. According to the most efficient prediction unit and transform unit determination scheme, coding efficiency of a coding unit is finally determined. The coding unit determiner 120 finalizes a hierarchical structure of a largest coding unit, according to coding efficiency of a coding unit according to each depth.

The coding unit determiner 120 may measure coding efficiency of coding units according to depths, prediction efficiency of prediction methods, or the like by using Rate-Distortion Optimization based on Lagrangian multipliers.

The coding unit determiner 120 may generate split information indicating whether a coding unit is to be split according to each depth according to the determined hierarchical structure of the largest coding unit. Then, the coding unit determiner 120 may generate, for split coding units, partition mode information to be used in determining a prediction unit and transform unit split information to be used in determining a transform unit. In addition, when the coding unit may be split by using at least two split methods, the coding unit determiner 120 may generate both split information and split shape information that indicates a split method. The coding unit determiner 120 may generate information about the prediction method and the transformation method that are used in the prediction unit and the transform unit.

The output unit 130 may output, in a bitstream, a plurality of pieces of information generated by the largest coding unit determiner 110 and the coding unit determiner 120 according to the hierarchical structure of the largest coding unit.

A method of determining the coding unit, the prediction unit, and the transform unit according to the tree structure of the largest coding unit will be described below with reference to FIGS. 3 to 12.

Figure 1B:
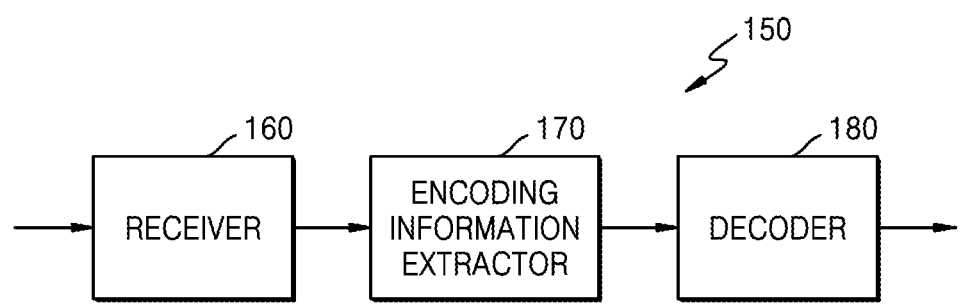
FIG. 1B illustrates a block diagram of an image decoding device based on coding units according to a tree structure, according to an embodiment.

FIG. 1B illustrates a block diagram of an image decoding device 150 based on coding units according to a tree structure, according to an embodiment.

The image decoding device 150 includes a receiver 160, an encoding information extractor 170, and a decoder 180.

Definitions of the terms including a coding unit, a depth, a prediction unit, a transform unit, various split information, or the like for a decoding operation performed by the image decoding device 150 are equal to those described above with reference to FIG. 1A and the image encoding device 100. Because the image decoding device 150 is designed to reconstruct image data, various encoding methods used by the image encoding device 100 may also be applied to the image decoding device 150.

The receiver 160 receives and parses a bitstream with respect to an encoded video. The encoding information extractor 170 extracts, from the parsed bitstream, a plurality of pieces of information to be used in decoding largest coding units, and provides them to the decoder 180. The encoding information extractor 170 may extract information about a largest size of a coding unit of a current picture from a header, a sequence parameter set, or a picture parameter set of the current picture.

The encoding information extractor 170 extracts, from the parsed bitstream, a final depth and split information about coding units according to a tree structure according to each largest coding unit. The extracted final depth and split information are output to the decoder 180. The decoder 180 may split a largest coding unit according to the extracted final depth and split information, thereby determining a tree structure of the largest coding unit.

The split information extracted by the encoding information extractor 170 is split information about the tree structure determined to cause a minimum encoding error, the determination being performed by the image encoding device 100. Therefore, the image decoding device 150 may reconstruct an image by decoding data according to a decoding scheme that causes the minimum encoding error.

The encoding information extractor 170 may extract split information about a data unit such as a prediction unit and a transform unit included in the coding unit. For example, the encoding information extractor 170 may extract partition mode information about a partition mode that is the most efficient one for the prediction unit. The encoding information extractor 170 may extract transformation split information about a tree structure that is the most efficient one for the transform unit.

The encoding information extractor 170 may obtain information about the most efficient prediction method with respect to prediction units split from the coding unit. Then, the encoding information extractor 170 may obtain information about the most efficient transformation method with respect to transform units split from the coding unit.

The encoding information extractor 170 extracts the information from the bitstream, according to a method of configuring the bitstream, the method being performed by the output unit 130 of the image encoding device 100.

The decoder 180 may split a largest coding unit into coding units having the most efficient tree structure, based on the split information. Then, the decoder 180 may split the coding unit into the prediction units according to the partition mode information. The decoder 180 may split the coding unit into the transform units according to the transformation split information.

The decoder 180 may predict the prediction units according to the information about the prediction method. The decoder 180 may perform inverse quantization and inverse transformation on residual data that corresponds to a difference between an original value and a prediction value of a pixel, according to information about a method of transforming a transform unit. The decoder 180 may reconstruct pixels of the coding unit, according to a result of the prediction on the prediction units and a result of the transformation on the transform units.

Figure 2:
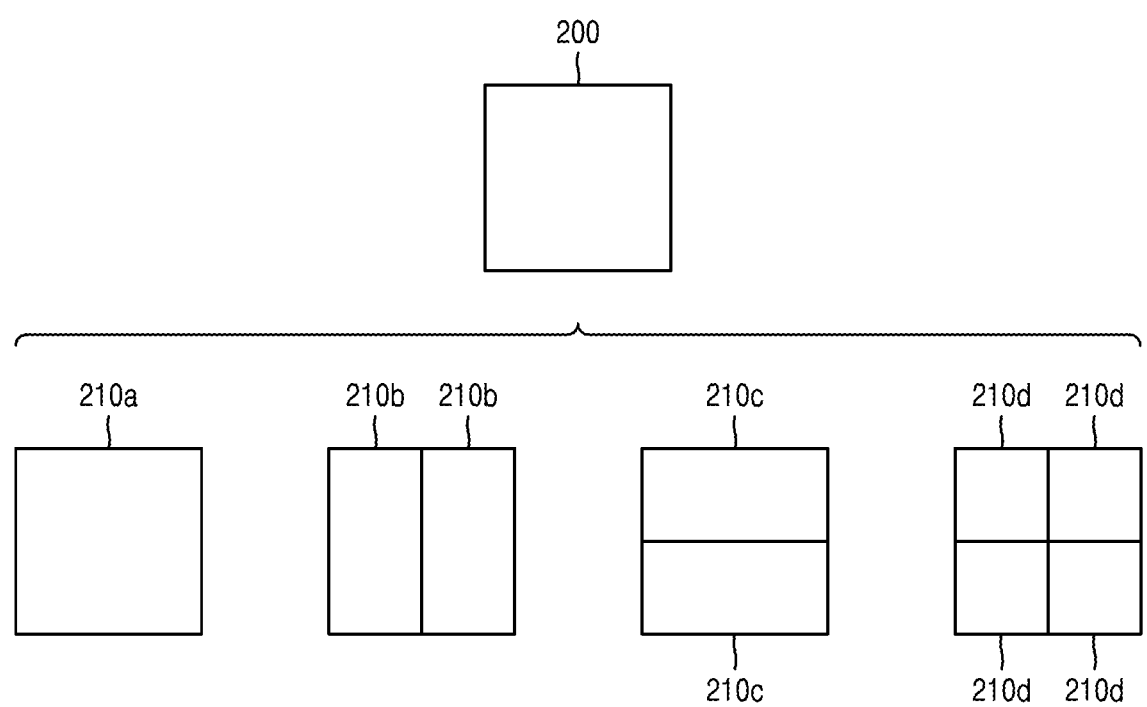
FIG. 2 illustrates a process of determining at least one coding unit when a current coding unit is split, according to an embodiment.

FIG. 2 illustrates a process of determining at least one coding unit when the image decoding device 150 splits a current coding unit, according to an embodiment.

According to an embodiment, the image decoding device 150 may determine, by using block shape information, a shape of a coding unit, and may determine, by using split shape information, a shape according to which the coding unit is to be split. That is, a method of splitting a coding unit, which is indicated by the split shape information, may be determined based on which block shape is indicated by the block shape information used by the image decoding device 150.

According to an embodiment, the image decoding device 150 may use the block shape information indicating that a current coding unit has a square shape. For example, the image decoding device 150 may determine whether to split a square coding unit or not, whether to split the square coding unit vertically, whether to split the square coding unit horizontally, or whether to split the square coding unit into four coding units, according to the split shape information. Referring to FIG. 2, when block shape information of a current coding unit 200 indicates a square shape, the decoder 180 may not split a coding unit 210*a* having the same size as the current coding unit 200 according to split shape information indicating no split, or may determine coding units 210*b*, 210*c*, and 210*d* split based on split shape information indicating a predetermined split method.

Referring to FIG. 2, the image decoding device 150 may determine the two coding units 210*b* obtained by splitting the current coding unit 200 in a vertical direction based on split shape information indicating split in a vertical direction, according to an embodiment. The image decoding device 150 may determine the two coding units 210*c* obtained by splitting the current coding unit 200 in a horizontal direction based on split shape information indicating split in a horizontal direction. The image decoding device 150 may determine the four coding units 210*d* obtained by splitting the current coding unit 200 in vertical and horizontal directions based on split shape information indicating split in vertical and horizontal directions. However, a split shape for splitting a square coding unit may not be limitedly interpreted to above shapes, and may include various shapes indicatable by split shape information. Predetermined split shapes for splitting a square coding unit will be described in detail below through various embodiments.

Figure 3:
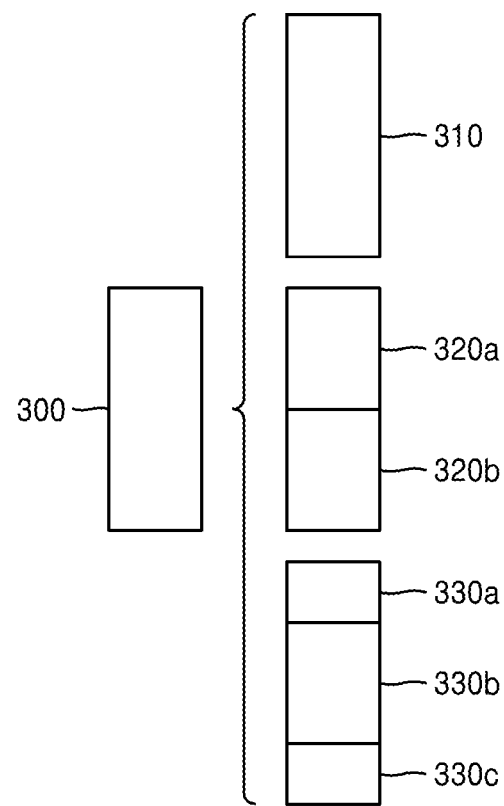
FIG. 3 illustrates a process of determining at least one coding unit when a coding unit having a non-square shape is split, according to an embodiment.
Figure 3:
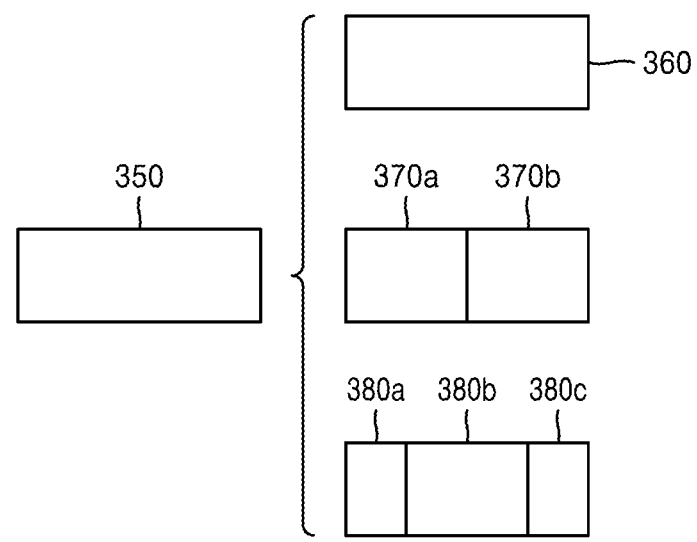

FIG. 3 illustrates a process of determining at least one coding unit when the image decoding device 150 splits a coding unit having non-square shape, according to an embodiment.

According to the present embodiment, the image decoding device 150 may use block shape information indicating that a current coding unit has a non-square shape. The image decoding device 150 may determine whether or not to split the current coding unit having the non-square shape, or whether to split the current coding unit having the non-square shape by using a predetermined method. Referring to FIG. 3, when block shape information of a current coding unit 300 or 350 indicates a non-square shape, the image decoding device 150 may not split a coding unit 310 or 360 having the same size as the current coding unit 300 or 350 according to split shape information indicating no split, or may determine coding units 320*a*, 320*b*, 330*a*, 330*b*, 330*c*, 370*a*, 370*b*, 380*a*, 380*b*, and 380*c* split according to split shape information indicating a predetermined split method. A predetermined split method of splitting a non-square coding unit will be described in detail below through various embodiments.

According to an embodiment, the image decoding device 150 may determine, by using the split shape information, a shape of a coding unit is split, and in this case, the split shape information may indicate the number of at least one coding unit generated when a coding unit is split. Referring to FIG. 3, when the split shape information indicates that the current coding unit 300 or 350 is to be split into two coding units, the image decoding device 150 may determine the two coding units 320*a* and 320*b* or 370*a* and 370*b*, which are respectively included in the current coding unit 300 or 350 by splitting the current coding unit 300 or 350 based on the split shape information.

According to an embodiment, when the image decoding device 150 splits the current coding unit 300 or 350 having the non-square shape based on the split shape information, the image decoding device 150 may split the current coding unit 300 or 350 having the non-square shape in consideration of a location of a longer side. For example, the image decoding device 150 may determine a plurality of coding units by splitting the current coding unit 300 or 350 in a direction of splitting the longer sides of the current coding unit 300 or 350 in consideration of the shape of the current coding unit 300 or 350.

According to an embodiment, when split shape information indicates that a coding unit is to be split into an odd number of blocks, the image decoding device 150 may determine an odd number of coding units included in the current coding unit 300 or 350. For example, when split shape information indicates that the current coding unit 300 or 350 is to be split into three coding units, the image decoding device 150 may split the current coding unit 300 or 350 into the three coding units 330*a*, 330*b*, and 330*c* or 380*a*, 380*b*, and 380*c*. According to the present embodiment, the image decoding device 150 may determine the odd number of coding units included in the current coding unit 300 or 350, wherein sizes of the determined coding units are not the same. For example, a size of the coding unit 330*b* or 380*b* from among the odd number of coding units 330*a*, 330*b*, and 330*c* or 380*a*, 380*b*, and 380*c* may be different from sizes of the coding units 330*a* and 330*c* or 380*a* or 380*c*. That is, coding units that may be determined when the current coding unit 300 or 350 is split may have different types of sizes.

According to an embodiment, when split shape information indicates that a coding unit is to be split into an odd number of blocks, the image decoding device 150 may determine an odd number of coding units included in the current coding unit 300 or 350 and in addition, set a predetermined limit on at least one coding unit from among the odd number of coding units generated by splitting the current coding unit 300 or 350. Referring to FIG. 3, the image decoding device 150 may decode the coding unit 330*b* or 380*b* at the center of the three coding units 330*a*, 330*b*, and 330*c* or 380*a*, 380*b*, and 380*c* generated when the current coding unit 300 or 350 is split in a different manner from the coding units 330*a* and 330*c* or 380*a* and 380*c*. For example, the image decoding device 150 may limit the coding unit 330*b* or 380*b* at the center not to be further split unlike the coding units 330*a* and 330*c* or 380*a* and 380*c*, or to be split only a certain number of times.

Figure 4:
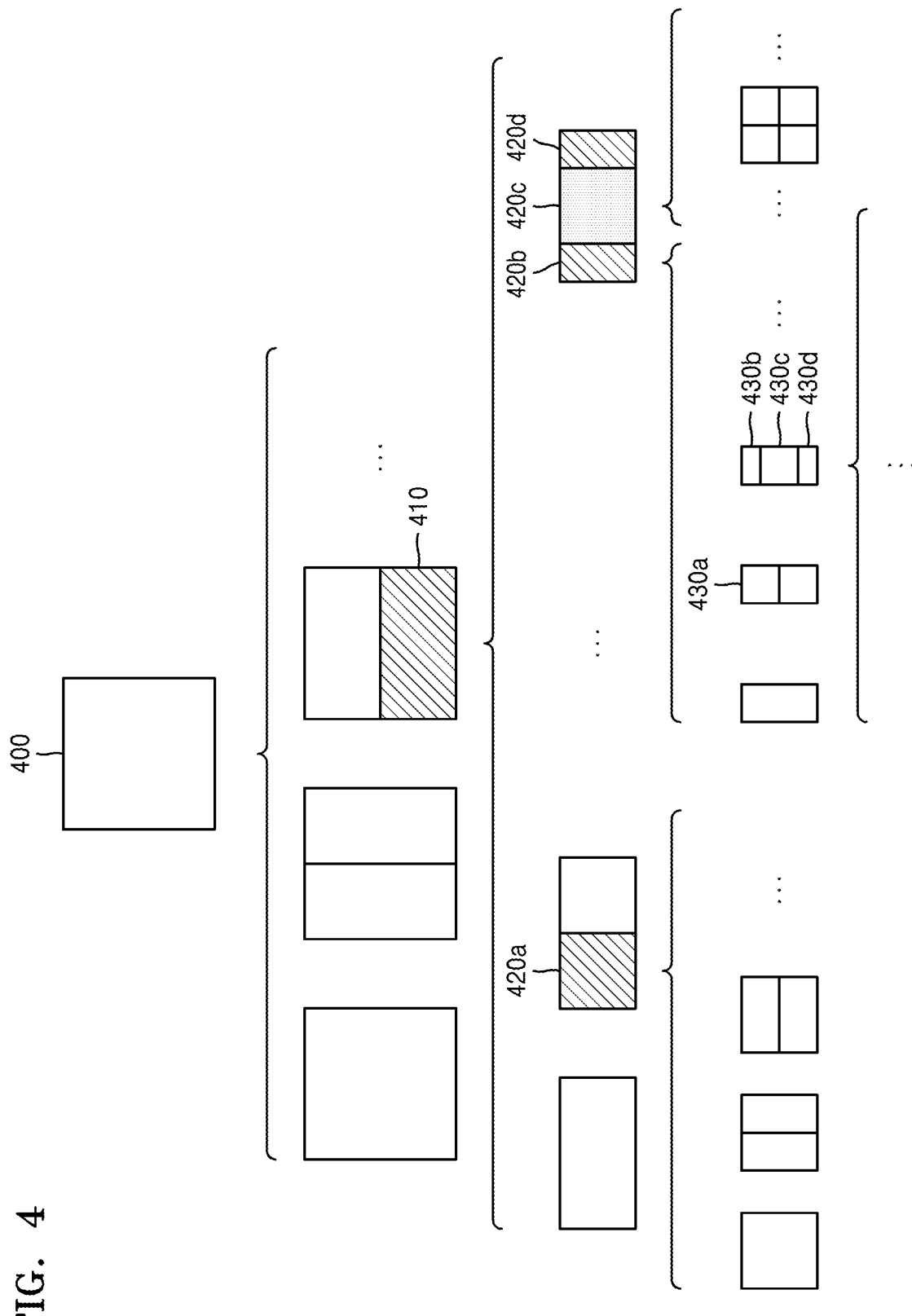
FIG. 4 illustrates a process of splitting a coding unit based on at least one of block shape information and split shape information, according to an embodiment.

FIG. 4 illustrates a process of splitting, by the image decoding device 150, a coding unit based on at least one of block shape information and split shape information, according to an embodiment.

According to an embodiment, the image decoding device 150 may determine whether to split a first coding unit 400 having a square shape into coding units based on at least one of block shape information and split shape information. According to an embodiment, when the split shape information indicates a split of the first coding unit 400 in a horizontal direction, the image decoding device 150 may determine a second coding unit 410 by splitting the first coding unit 400 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to an embodiment, the image decoding device 150 may determine whether to split the determined second coding unit 410 into coding units based on at least one of block shape information and split shape information. Referring to FIG. 4, the image decoding device 150 may split the second coding unit 410, which has a non-square shape determined by splitting the first coding unit 400, into at least one third coding unit, for example, third coding units 420a, 420b, 420c, and 420d, based on at least one of block shape information and split shape information, or may not split the second coding unit 410. The image decoding device 150 may obtain at least one of block shape information and split shape information, the image decoding device 150 may split the first coding unit 400 based on at least one of the block shape information and the split shape information to obtain a plurality of second coding units (for example, the second coding unit 410) having various shapes, and the second coding unit 410 may be split according to a manner of splitting the first coding unit 400 based on at least one of the block shape information and the split shape information. According to an embodiment, when the first coding unit 400 is split into the second coding units 410 based on at least one of block shape information and split shape information about the first coding unit 400, the second coding unit 410 may also be split into the third coding units, for example, the third coding units 420a, 420b, and 420c, 420d, based on at least one of block shape information and split shape information about the second coding unit 410. That is, a coding unit may be recursively split based on at least one of split shape information and block shape information related to the coding unit. A method used to recursively split a coding unit will be described below through various embodiments.

According to an embodiment, the image decoding device 150 may determine to split each of the third coding units (for example, the third coding units 420a, 420b, 420c, and 420d) into coding units or not to split the second coding unit 410 based on at least one of block shape information and split shape information. The image decoding device 150 may split the second coding unit 410 having a non-square shape into the odd number of third coding units 420b, 420c, and 420d. The image decoding device 150 may set a predetermined limitation on a predetermined third coding unit from among the odd number of third coding units 420b, 420c, and 420d. For example, the image decoding device 150 may limit the coding unit 420c located at the center from among the odd number of third coding units 420b, 420c, and 420d to be split no more or to be split to a settable number of times. Referring to FIG. 4, the image decoding device 150 may limit the coding unit 420c located at the center from among the odd number of third coding units 420b, 420c, and 420d included in the second coding unit 410 having a non-square shape to be split no more, to be split into a predetermined split manner (for example, split only into four coding units or split into a shape corresponding to that into which the second coding unit 410 is split), or to be split only a predetermined number of times (for example, split only n times, wherein n>0). However, the limitations on the coding unit 420c located at the center are simply embodiments, and thus the present disclosure should not be interpreted limitedly to the above embodiments, and it should be interpreted that the limitations include various limitations of decoding the coding unit 420c located at the center differently from the coding units 420b and 420d.

According to an embodiment, the image decoding device 150 may obtain, from a predetermined location in a current coding unit, at least one of block shape information and split shape information used to split the current coding unit.

According to an embodiment, when the current coding unit is split into a predetermined number of coding units, the image decoding device 150 may select one of the coding units. A method of selecting one of a plurality of coding units may vary, and descriptions about such a method will be described below through various embodiments.

According to an embodiment, the image decoding device 150 may split the current coding unit into the plurality of coding units, and may determine the coding unit at the predetermined location.

Figure 5:
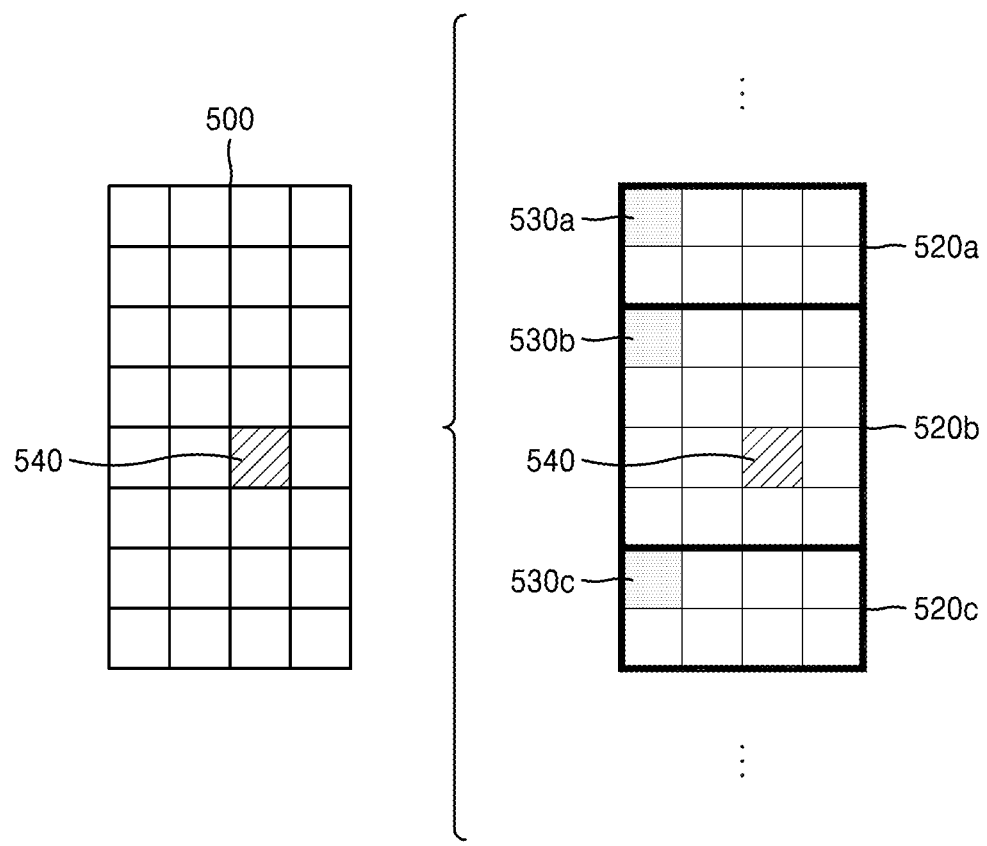
FIG. 5 illustrates a method of determining a predetermined coding unit from among an odd number of coding units, according to an embodiment.

FIG. 5 illustrates a method of determining, by the image decoding device 150, a coding unit at a predetermined location from among an odd number of coding units, according to an embodiment.

According to an embodiment, the image decoding device 150 may use information indicating a location of each of an odd number of coding units so as to determine a coding unit located at the center of the odd number of coding units. Referring to FIG. 5, the image decoding device 150 may determine an odd number of coding units 520a, 520b, and 520c by splitting a current coding unit 500. The image decoding device 150 may determine the coding unit 520b at the center by using information about locations of the odd number of coding units 520a, 520b, and 520c. For example, the image decoding device 150 may determine the coding unit 520 located at the center by determining locations of the coding units 520a, 520b, and 520c based on information indicating locations of predetermined samples included in the coding units 520a, 520b, and 520c. In detail, the image decoding device 150 may determine the coding unit 520b located at the center by determining the locations of the coding units 520a, 520b, and 520c based on information indicating locations of upper left samples 530a, 530b, and 530c of the coding units 520a, 520b, and 520c.

According to an embodiment, the information indicating the locations of the upper left samples 530a, 530b, and 530c respectively included in the coding units 520a, 520b, and 520c may include information about locations or coordinates in a picture of the coding units 520a, 520b, and 520c. According to an embodiment, the information indicating the locations of the upper left samples 530a, 530b, and 530c respectively included in the coding units 520a, 520b, and 520c may include information indicating widths or heights of the coding units 520a, 520b, and 520c included in the current coding unit 500, wherein the widths or heights may correspond to information indicating differences between coordinates in the picture of the coding units 520a, 520b, and 520c. That is, the image decoding device 150 may determine the coding unit 520b located at the center by directly using the information about the locations or coordinates in the picture of the coding units 520a, 520b, and 520c, or by using the information about the widths or heights of the coding units, which indicate difference values between coordinates.

According to an embodiment, the information indicating the location of the upper left sample 530a of the top coding unit 520a may indicate (xa, ya) coordinates, information indicating the location of the upper left sample 530b of the center coding unit 520b may indicate (xb, yb) coordinates, and the information indicating the location of the upper left sample 530c of the bottom coding unit 520c may indicate (xc, yc) coordinates. The image decoding device 150 may determine the center coding unit 520b by using the coordinates of the upper left samples 530a, 530b, and 530c respectively included in the coding units 520a, 520b, and 520c. For example, when the coordinates of the upper left samples 530a, 530b, and 530c are aligned in an ascending order or descending order, the center coding unit 520b including (xb, yb) that is coordinates of the upper left sample 530b may be determined as a coding unit located at the center from among the coding units 520a, 520b, and 520c determined when the current coding unit 500 is split. Here, the coordinates indicating the locations of the upper left samples 530a, 530b, and 530c may indicate coordinates indicating absolute locations in the picture, and further, may use (dxb, dyb) coordinates that are information indicating a relative location of the upper left sample 530b of the center coding unit 520b and (dxc, dyc) coordinates that are information indicating a relative location of the upper left sample 530c of the bottom coding unit 520c, based on the location of the upper left sample 530c of the top coding unit 520a. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to an embodiment, the image decoding device 150 may split the current coding unit 500 into the plurality of coding units 520a, 520b, and 520c, and select a coding unit from among the coding units 520a, 520b, and 520c according to a predetermined criterion. For example, the image decoding device 150 may select the coding unit 520b that has a different size from among the coding units 520a, 520b, and 520c.

According to an embodiment, the image decoding device 150 may determine the width or height of each of the coding units 520a, 520b, and 520c by using the (xa, ya) coordinates that are the information indicating the location of the upper left sample 530a of the top coding unit 520a, the (xb, yb) coordinates that are the information indicating the location of the upper left sample 530b of the center coding unit 520b, and the (xc, yc) coordinates that are the information indicating the location of the upper left sample 530c of the bottom coding unit 520c. The image decoding device 150 may determine a size of each of the coding units 520a, 520b, and 520c by using the coordinates (xa, ya), (xb, yb), and (xc, yc) indicating the locations of the coding units 520a, 520b, and 520c.

According to an embodiment, the image decoding device 150 may determine the width of the top coding unit 520a to xb-xa and the height to yb-ya. According to an embodiment, the image decoding device 150 may determine the width of the center coding unit 520b to xc-xb and the height to yc-yb. According to an embodiment, the image decoding device 150 may determine the width or height of the bottom coding unit by using the width or height of the current coding unit, and the width and height of the top coding unit 520a and the center coding unit 520b. The image decoding device 150 may determine one coding unit having a size different from other coding units based on the determined widths and heights of the coding units 520a, 520b, and 520c. Referring to FIG. 5, the image decoding device 150 may determine, as the coding unit at the predetermined location, the center coding unit 520b having a size different from sizes of the top coding unit 520a and the bottom coding unit 520c. However, because a process of determining, by the image decoding device 150, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to an embodiment, the image decoding device 150 may select a coding unit at a predetermined location from among an odd number of coding units that are determined when a current coding unit is split, in consideration of a shape of the current coding unit. For example, when the current coding unit has a non-square shape in which a width is longer than a height, the image decoding device 150 may determine the coding unit at the predetermined location along a horizontal direction. In other words, the image decoding device 150 may determine a coding unit from among coding units having different locations in the horizontal direction, and may set a limitation on the coding unit. When the current coding unit has the non-square shape in which the height is longer than the width, the image decoding device 150 may determine the coding unit at the predetermined location along a vertical direction. In other words, the image decoding device 150 may determine a coding unit from among coding units having different locations in the vertical direction, and set a limitation on the coding unit.

According to an embodiment, the image decoding device 150 may use information indicating a location of each of an even number of coding units so as to determine a coding unit at a predetermined location from among the even number of coding units. The image decoding device 150 may determine the even number of coding units by splitting a current coding unit, and determine the coding unit at the predetermined location by using the information about the locations of the even number of coding units. Detailed processes thereof may correspond to processes of determining a coding unit at a predetermined location (for example, a center location) from among an odd number of coding units, which have been described above with reference to FIG. 5, and thus descriptions thereof are not provided again.

According to an embodiment, when a current coding unit having a non-square shape is split into a plurality of coding units, predetermined information about a coding unit at a predetermined location may be used during a split process so as to determine the coding unit at the predetermined location from among the plurality of coding units. For example, the image decoding device 150 may use at least one of block shape information and split shape information, which are stored in a sample included in a center coding unit during a split process so as to determine a coding unit located at the center from among a plurality of coding units obtained by splitting a current coding unit.

Referring to FIG. 5, the image decoding device 150 may split the current coding unit 500 into the plurality of coding units 520a, 520b, and 520c based on at least one of block shape information and split shape information, and determine the coding unit 520b located at the center from among the plurality of coding units 520a, 520b, and 520c. In addition, the image decoding device 150 may determine the coding unit 520b located at the center in consideration of a location where at least one of the block shape information and the split shape information is obtained. That is, at least one of the block shape information and the split shape information of the current coding unit 500 may be obtained from the sample 540 located at the center of the current coding unit 500, and when the current coding unit 500 is split into the plurality of coding units 520a, 520b, and 520c based on at least one of the block shape information and the split shape information, the coding unit 520b including the sample 540 may be determined as the coding unit located at the center. However, information used to determine a coding unit located at the center should not be limitedly interpreted to at least one of block shape information and split shape information, and various types of information may be used during a process of determining a coding unit located at the center.

According to an embodiment, predetermined information for identifying a coding unit at a predetermined location may be obtained from a predetermined sample included in a coding unit to be determined. Referring to FIG. 5, the image decoding device 150 may use at least one of block shape information and split shape information obtained from a sample located at a predetermined location in the current coding unit 500 (for example, a sample located at the center of the current coding unit 500) so as to determine a coding unit at a predetermined location from among the plurality of coding units 520a, 520b, and 520c determined when the current coding unit 500 is split (for example, a coding unit located at the center from among the plurality of coding units). That is, the image decoding device 150 may determine the sample at the predetermined location in consideration of a block shape of the current coding unit 500, and the image decoding device 150 may determine and set a predetermined limitation on the coding unit 520b including the sample from which predetermined location (for example, at least one of the block shape information and the split shape information) is obtained, from among the plurality of coding units 520a, 520b, and 520c determined when the current coding unit 500 is split. Referring to FIG. 5, the image decoding device 150 may determine the sample 540 located at the center of the current coding unit 500, as the sample from which the predetermined information is obtained, and the image decoding device 150 may set the predetermined location during a decoding process, on the coding unit 520b including the sample 540. However, a location of a sample from which predetermined information is obtained should not be limitedly interpreted to the above location, and the sample may be interpreted to samples at arbitrary locations included in the coding unit 520 determined to be limited.

According to an embodiment, a location of a sample from which predetermined location is obtained may be determined based on a shape of the current coding unit 500. According to an embodiment, block shape information may be used to determine whether a shape of a current coding unit is a square or a non-square, and a location of a sample from which predetermined information is obtained may be determined based on the shape. For example, the image decoding device 150 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding device 150 may determine, as a sample from which predetermined information is obtained, one of samples adjacent to a boundary of splitting a longer side of the current coding unit into halves.

According to an embodiment, when a current coding unit is split into a plurality of coding units, the image decoding device 150 may use at least one of block shape information and split shape information so as to determine a coding unit at a predetermined location from among the plurality of coding units. According to an embodiment, the image decoding device 150 may obtain at least one of the block shape information and the split shape information from a sample at a predetermined location included in the coding unit, and the image decoding device 150 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Because a recursive split process of a coding unit has been described above with reference to FIG. 4, details thereof are not provided again.

According to an embodiment, the image decoding device 150 may determine at least one coding unit by splitting a current coding unit, and determine an order of decoding the at least one coding unit according to a predetermined block (for example, a current coding unit).

Figure 6:
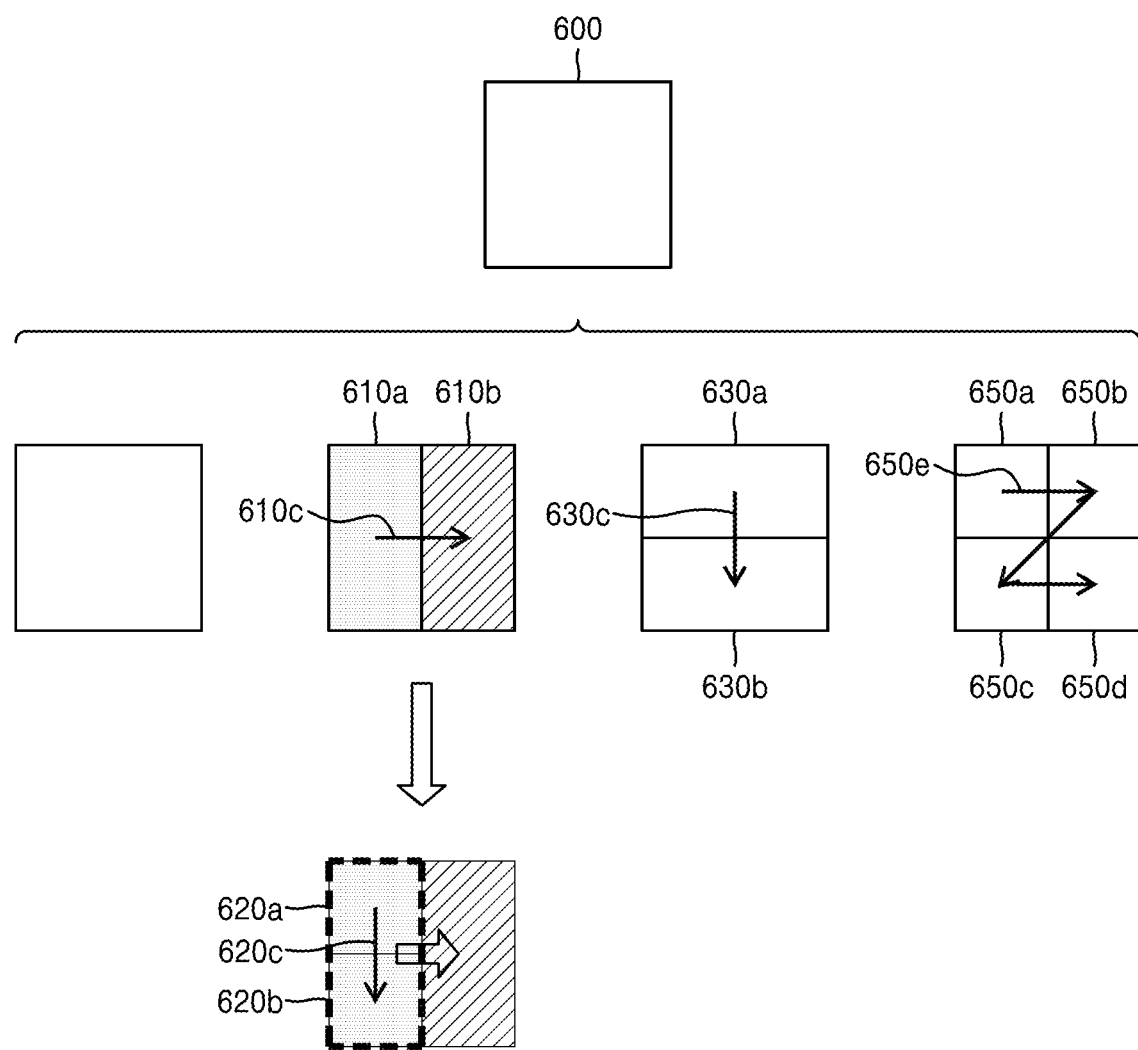
FIG. 6 illustrates an order in which a plurality of coding units are processed when a current coding unit is split and thus the plurality of coding units are determined, according to an embodiment.

FIG. 6 illustrates an order of processing a plurality of coding units when the image decoding device 150 determines the plurality of coding units by splitting a current coding unit, according to an embodiment.

According to an embodiment, the image decoding device 150 may determine, according to block shape information and split shape information, second coding units 610a and 610b by splitting a first coding unit 600 in a vertical direction, second coding units 630a and 630b by splitting the first coding unit 600 in a horizontal direction, or second coding units 650a, 650b, 650c, and 650d by splitting the first coding unit 600 in vertical and horizontal directions.

Referring to FIG. 6, the image decoding device 150 may determine an order such that the second coding units 610a and 610b determined by splitting the first coding unit 600 in the vertical direction to be processed in a horizontal direction 610c. The image decoding device 150 may determine a processing order of the second coding units 630a and 630b determined by splitting the first coding unit 600 in the horizontal direction to be in a vertical direction 630c. The image decoding device 150 may determine the second coding units 650a, 650b, 650c, and 650d determined by splitting the first coding unit 600 in the vertical and horizontal directions to be processed according to a predetermined order (for example, a raster scan order or a z-scan order 650e) in which coding units in one row are processed and then coding units in a next row are processed.

According to an embodiment, the image decoding device 150 may recursively split coding units. Referring to FIG. 6, the image decoding device 150 may determine a plurality of coding units 610a, 610b, 630a, 630b, 650a, 650b, 650c, and 650d by splitting the first coding unit 600, and may recursively split each of the determined plurality of coding units 610a, 610b, 630a, 630b, 650a, 650b, 650c, and 650d. A method of splitting the plurality of coding units 610a, 610b, 630a, 630b, 650a, 650b, 650c, and 650d may be similar to a method of splitting the first coding unit 600. Accordingly, the plurality of coding units 610a, 610b, 630a, 630b, 650a, 650b, 650c, and 650d may each be independently split into a plurality of coding units. Referring to FIG. 6, the image decoding device 150 may determine the second coding units 610a and 610b by splitting the first coding unit 600 in the vertical direction, and in addition, may determine to split or not to split each of the second coding units 610a and 610b independently.

According to an embodiment, the image decoding device 150 may split the left second coding unit 610a in the horizontal direction to obtain third coding units 620a and 620b, and may not split the right second coding unit 610b.

According to an embodiment, a processing order of coding units may be determined based on a split process of coding units. In other words, a processing order of split coding units may be determined based on a processing order of coding units just before being split. The image decoding device 150 may determine an order of processing the third coding units 620a and 620b determined when the left second coding unit 610a is split independently from the right second coding unit 610b. Because the third coding units 620a and 620b are determined when the left second coding unit 610a is split in the horizontal direction, the third coding units 620a and 620b may be processed in a vertical direction 620c. Also, because the order of processing the left second coding unit 610a and the right second coding unit 610b is in the horizontal direction 610c, the third coding units 620a and 620b included in the left second coding unit 610a may be processed in the vertical direction 620c and then the right second coding unit 610b may be processed. Because the above descriptions are for describing a process of determining a processing order according to coding units before being split, the process should not be limitedly interpreted to the above embodiments, and various methods of independently processing coding units split and determined in various shapes according to a predetermined order may be used.

Figure 7:
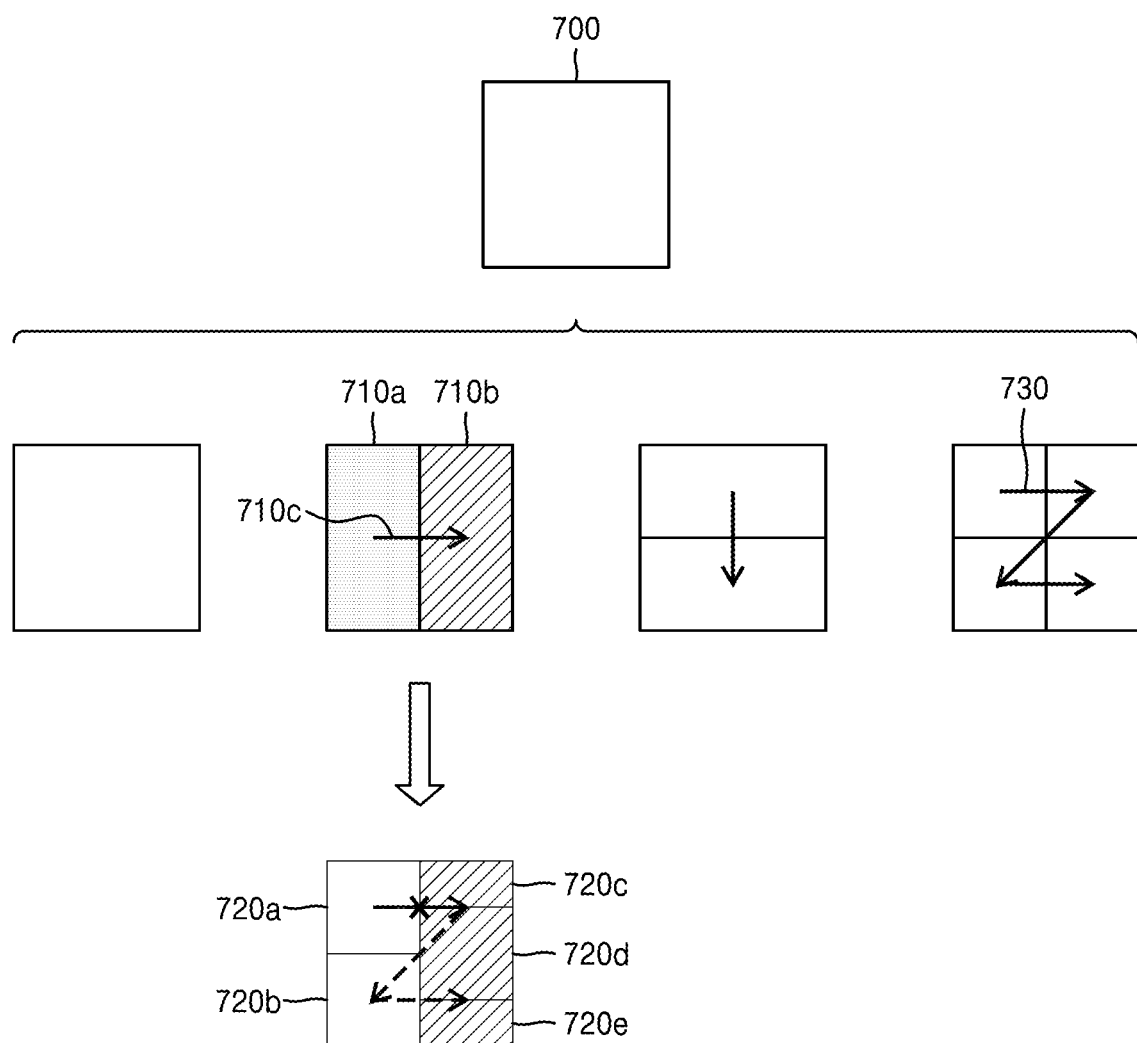
FIG. 7 illustrates a process of determining a current coding unit to be split into an odd number of coding units when coding units are unable to be processed in a predetermined order, according to an embodiment.

FIG. 7 illustrates a process of determining, by the image decoding device 150, a current coding unit to be split into an odd number of coding units when coding units are unable to be processed in a predetermined order, according to an embodiment.

According to an embodiment, the image decoding device 150 may determine that the current coding unit is split into the odd number of coding units based on obtained block shape information and split shape information. Referring to FIG. 7, a first coding unit 700 having a square shape may be split into second coding units 710a and 710b having non-square shapes, and the second coding units 710a and 710b may be independently split into third coding units 720a, 720b, 720c, 720d, and 720e. According to an embodiment, the image decoding device 150 may determine a plurality of the third coding units 720a and 720b by splitting the left coding unit 710a from among the second coding units in a horizontal direction, and the right coding unit 710b may be split into an odd number of the third coding units 720c, 720d, and 720e.

According to an embodiment, the image decoding device 150 may determine whether a coding unit split into an odd number exists by determining whether the third coding units 720a, 720b, 720c, 720d, and 720e are processable in a predetermined order. Referring to FIG. 7, the image decoding device 150 may determine the third coding units 720a, 720b, 720c, 720d, and 720e by recursively splitting the first coding unit 700. The image decoding device 150 may determine, based on at least one of block shape information and split shape information, whether there is a coding unit split into an odd number from among the first coding unit 700, the second coding units 710a and 710b, and the third coding units 720a, 720b, 720c, 720d, and 720e. For example, a coding unit located at the right from among the second coding units 710a and 710b may be split into the odd number of third coding units 720c, 720d, and 720e. An order of processing a plurality of coding units included in the first coding unit 700 may be a predetermined order 730 (for example, a z-scan order), and the image decoding device 150 may determine whether the third coding units 720c, 720d, and 720e determined when the right second coding unit 710b is split into an odd number satisfy a condition of being processable according to the predetermined order.

According to an embodiment, the image decoding device 150 may determine whether the third coding units 720a, 720b, 720c, 720d, and 720e included in the first coding unit 700 satisfy a condition of being processable according to a predetermined order, wherein the condition is related to whether at least one of a width and a height of the second coding units 710a and 710b is split into halves along boundaries of the third coding units 720a, 720b, 720c, 720d, and 720e. For example, the third coding units 720a and 720b that are determined when the left second coding unit 710a having a non-square shape is split into halves satisfy the condition, but the third coding units 720c, 720d, and 720e do not satisfy the condition because the boundaries of the third coding units 720c, 720d, and 720e that are determined when the right second coding unit 710b is split into three coding units are unable to split a width or height of the right second coding unit 710b into halves. Also, the image decoding device 150 may determine disconnection of a scan order when the condition is dissatisfied, and determine that the right second coding unit 710b is split into an odd number of coding units based on the determination result. According to an embodiment, when a coding unit is split into an odd number of coding units, the image decoding device 150 may set a predetermined limitation on a coding unit at a predetermined location from among the coding units, and because details about the limitation or the predetermined location have been described above through various embodiments, details thereof are not provided again.

Figure 8:
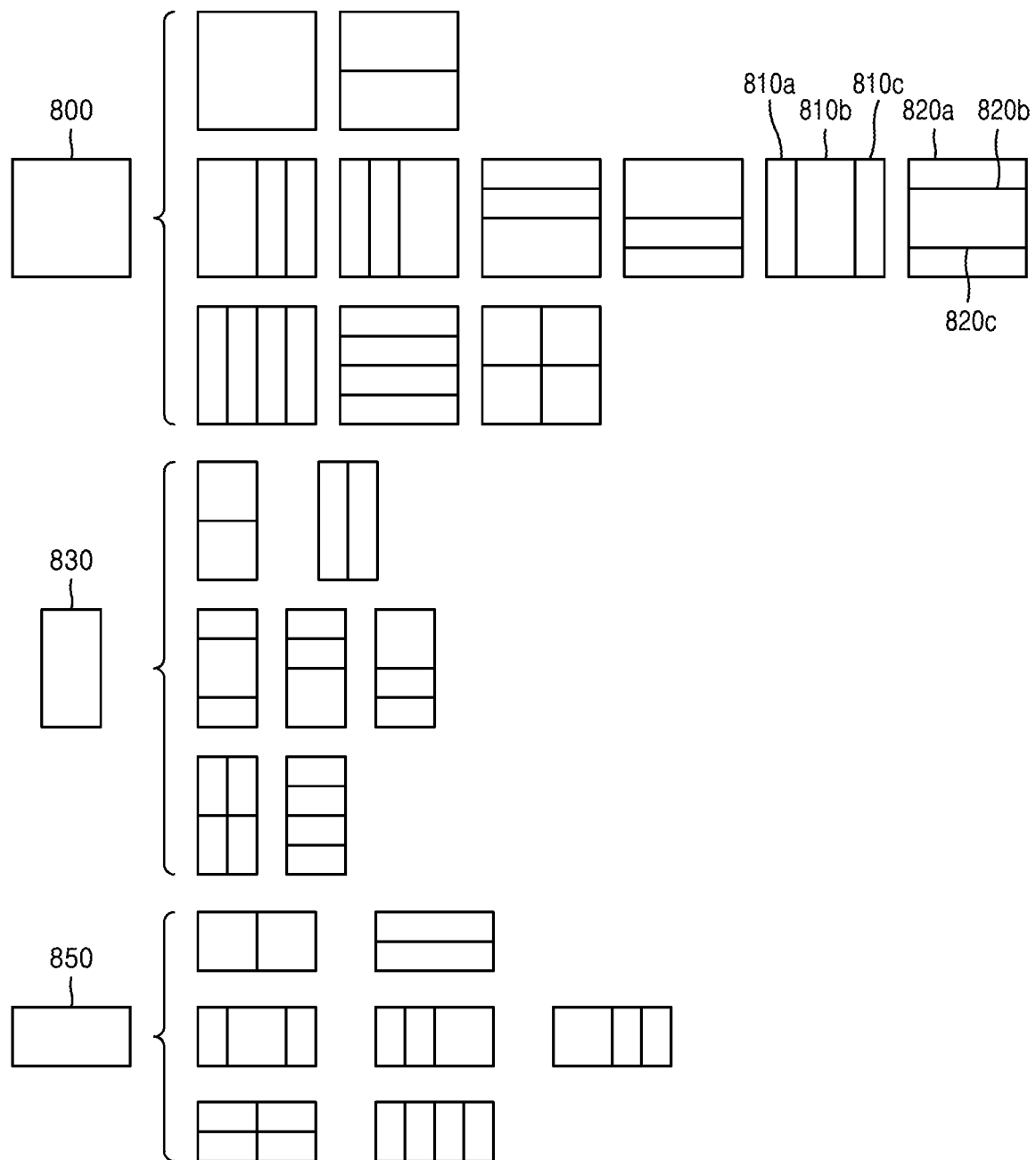
FIG. 8 illustrates a process of determining at least one coding unit when a first coding unit is split, according to an embodiment.

FIG. 8 illustrates a process of determining, by the image decoding device 150, at least one coding unit when a first coding unit 800 is split, according to an embodiment. According to an embodiment, the image decoding device 150 may split the first coding unit 800 based on at least one of block shape information and split shape information obtained through the receiver 160. The first coding unit 800 having a square shape may be split into four coding units having square shapes or non-square shapes. For example, referring to FIG. 8, when block shape information indicates that the first coding unit 800 is a square and split shape information indicates that the first coding unit 800 is to be split into non-square coding units, the image decoding device 150 may split the first coding unit 800 into a plurality of non-square coding units. In detail, when the split shape information indicates that the first coding unit 800 is to be split into a horizontal or vertical direction to determine an odd number of coding units, the image decoding device 150 may split the first coding unit 800 having a square shape into, as the odd number of coding units, second coding units 810a, 810b, and 810c determined when the first coding unit 800 is split in the vertical direction, or second coding units 820a, 820b, and 820c determined when the first coding unit 800 is split in the horizontal direction.

According to an embodiment, the image decoding device 150 may determine whether the second coding units 810a, 810b, and 810c and 820a, 820b, and 820c included in the first coding unit 800 satisfy a condition of being processable according to a predetermined order, wherein the condition is related to whether at least one of the width and the height of the first coding unit 800 is split into halves along the boundaries of the second coding units 810a, 810b, and 810c and 820a, 820b, and 820c. Referring to FIG. 8, because the boundaries of the second coding units 810a, 810b, and 810c determined when the first coding unit 800 having a square shape is split in the vertical direction are unable to split the width of the first coding unit 800 into halves, it may be determined that the first coding unit 800 does not satisfy the condition of being processable according to the predetermined order. Also, because the boundaries of the second coding units 820a, 820b, and 820c determined when the first coding unit 800 having a square shape is split in the horizontal direction are unable to split the width of the first coding unit 800 into halves, it may be determined that the first coding unit 800 does not satisfy the condition of being processable according to the predetermined order. When the condition is dissatisfied, the image decoding device 150 determines disconnection of a scan order and may determine that the first coding unit 800 is split into an odd number of coding units based on the determination result. According to an embodiment, when a coding unit is split into an odd number of coding units, the image decoding device 150 may set a predetermined limitation on a coding unit at a predetermined location from among the coding units, and because details about the limitation or the predetermined location have been described above through various embodiments, details thereof are not provided again.

According to an embodiment, the image decoding device 150 may determine coding units having various shapes by splitting a first coding unit.

Referring to FIG. 8, the image decoding device 150 may split the first coding unit 800 having a square shape and a first coding unit 830 or 850 having a non-square shape into coding units having various shapes.

Figure 9:
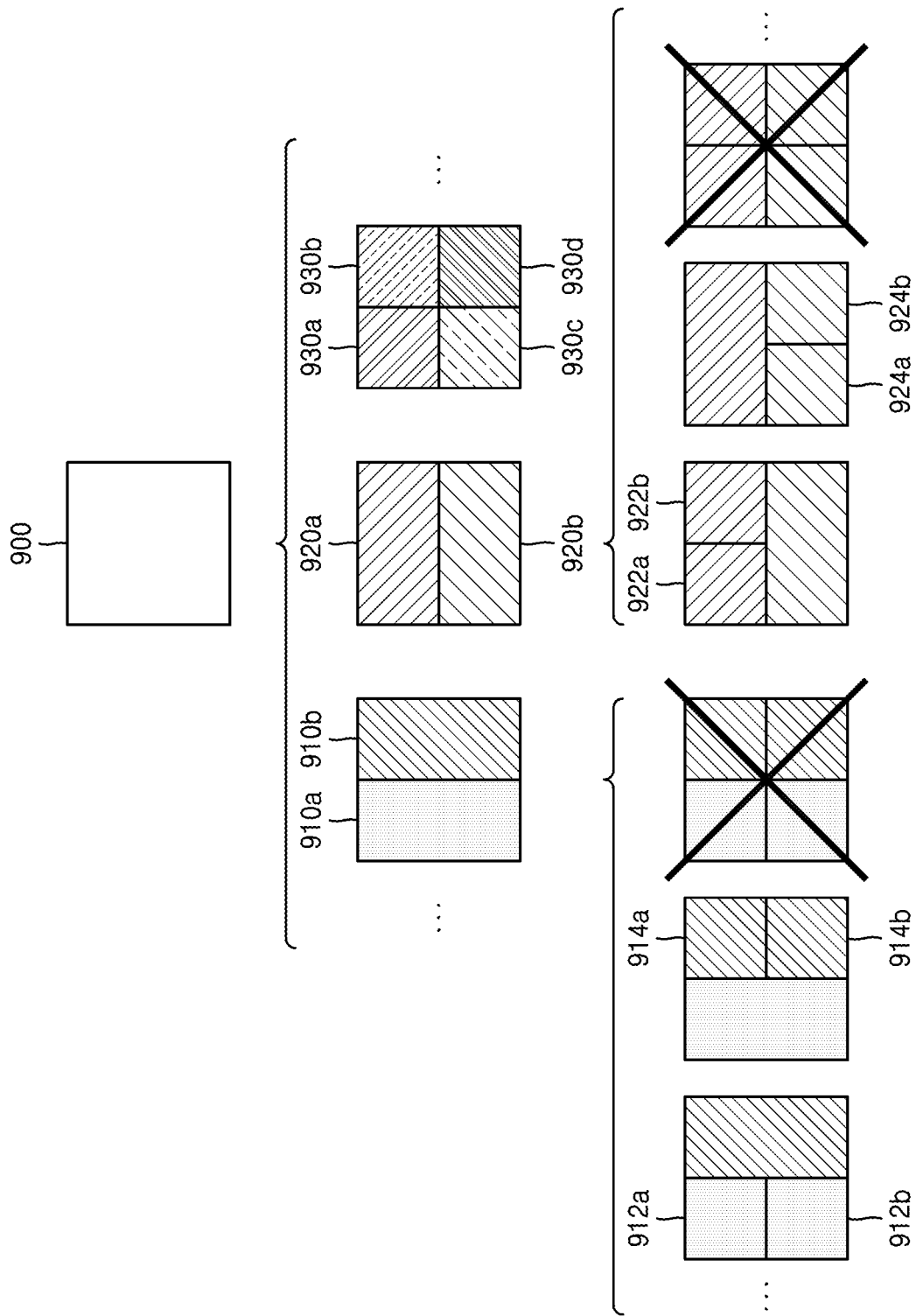
FIG. 9 illustrates that, when a second coding unit having a non-square shape, which is determined when a first coding unit is split, satisfies a predetermined condition, a shape of the second coding unit that is splittable is limited, according to an embodiment.

FIG. 9 illustrates that, when a second coding unit having a non-square shape, which is determined when a first coding unit 900 is split, satisfies a predetermined condition, a shape of the second coding unit that is splittable is limited by the image decoding device 150, according to an embodiment.

According to an embodiment, the image decoding device 150 may determine, based on at least one of block shape information and split shape information obtained through the receiver 160, to split the first coding unit 900 having a square shape into second coding units 910a, 910b, 920a, and 920b having non-square shapes. The second coding units 910a, 910b, 920a, and 920b may be independently split. Accordingly, the image decoding device 150 may determine to split or not to split the second coding units 910a, 910b, 920a, and 920b based on at least one of block shape information and split shape information related to each of the second coding units 910a, 910b, 920a, and 920b. According to an embodiment, the image decoding device 150 may determine third coding units 912a and 912b by splitting the left second coding unit 910a having a non-square shape and determined when the first coding unit 900 is split in a vertical direction. However, when the left second coding unit 910a is split in a horizontal direction, the image decoding device 150 may limit the right second coding unit 910b not to be split in the horizontal direction like a direction in which the left second coding unit 910a is split. When the right second coding unit 910b is split in the same direction and third coding units 914a and 914b are determined, the third coding units 912a, 912b, 914a, and 914b may be determined when the left second coding unit 910a and the right second coding unit 910b are independently split in the horizontal direction. However, this is the same result as the image decoding device 150 splitting the first coding unit 900 into four second coding units 930a, 930b, 930c, and 930d having square shapes based on at least one of block shape information and split shape information, and thus may be inefficient in terms of image decoding.

According to an embodiment, the image decoding device 150 may determine third coding units 922a, 922b, 924a, and 924b by splitting the second coding units 920a or 920b having a non-square shape and determined when the first coding unit 900 is split in the horizontal direction. However, when one of second coding units (for example, the top second coding unit 920a) is split in the vertical direction, the image decoding device 150 may limit the other second coding unit (for example, the bottom second coding unit 920b) not to be split in the vertical direction like a direction in which the top second coding unit 920a is split based on the above reasons.

Figure 10:
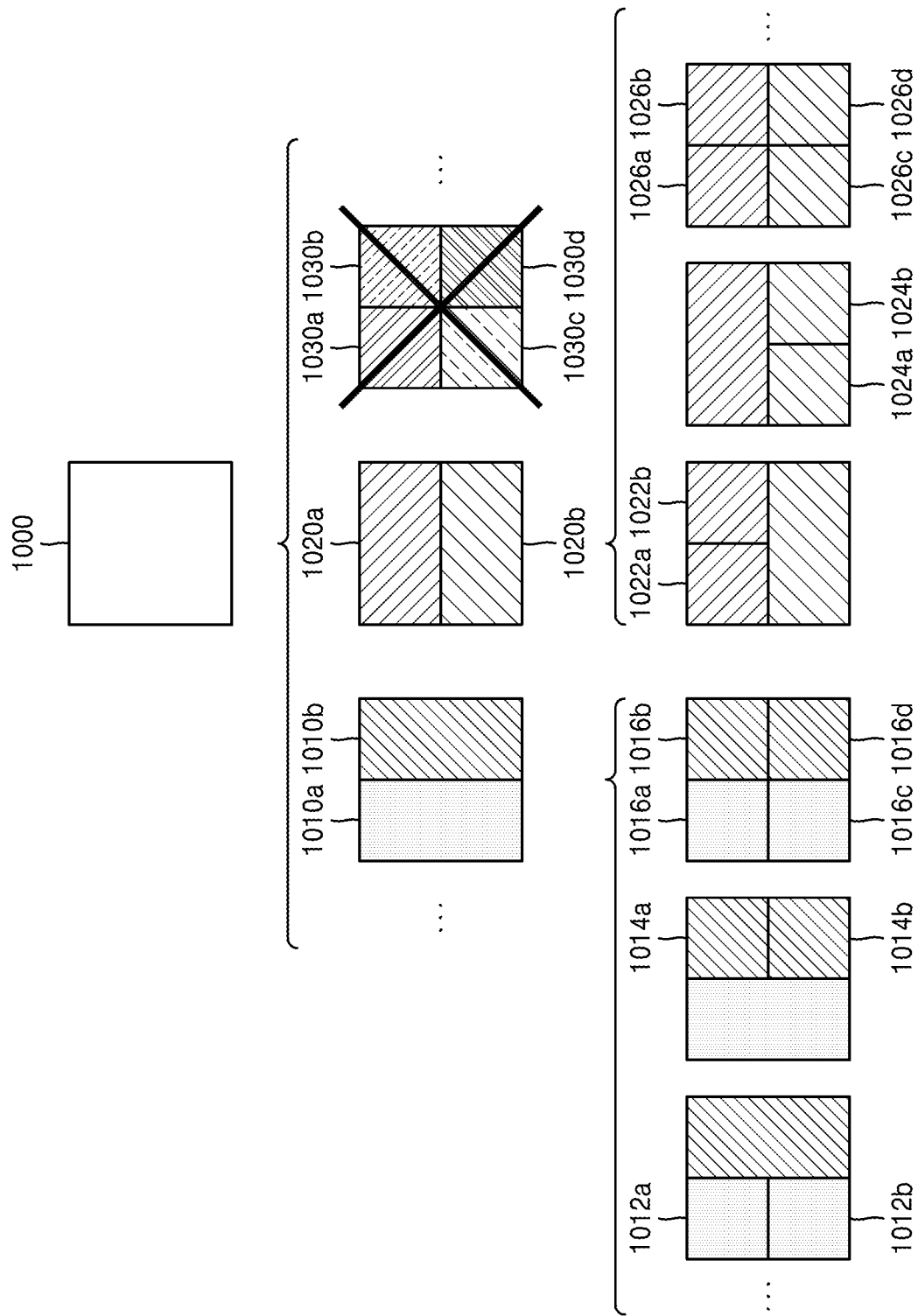
FIG. 10 illustrates a process of splitting a coding unit having a square shape when split shape information does not indicate that the coding unit is to be split into four coding units having square shapes, according to an embodiment.

FIG. 10 illustrates a process of splitting, by the image decoding device 150, a coding unit having a square shape when split shape information does not indicate that the coding unit is to be split into four coding units having square shapes, according to an embodiment.

According to an embodiment, the image decoding device 150 may determine second coding units 1010a, 1010b, 1020a, 1020b, and the like by splitting a first coding unit 1000 based on at least one of block shape information and split shape information. The split shape information may include information about various shapes into which a coding unit is splittable, but sometimes, the information about various shapes may not include information for splitting a coding unit into four square coding units. According to such split shape information, the image decoding device 150 is unable to split the first coding unit 1000 having a square shape into four square second coding units 1030a, 1030b, 1030c, and 1030d. Based on the split shape information, the image decoding device 150 may determine the second coding units 1010a, 1010b, 1020a, 1020b, and the like having non-square shapes.

According to an embodiment, the image decoding device 150 may independently split the second coding units 1010a, 1010b, 1020a, 1020b, and the like having non-square shapes. Each of the second coding units 1010a, 1010b, 1020a, 1020b, and the like may be split in a predetermined order through a recursive method that may correspond to a method of splitting the first coding unit 1000 based on at least one of block shape information and split shape information.

For example, the image decoding device 150 may determine third coding units 1012a and 1012b having square shapes by splitting the left second coding unit 1010a in a horizontal direction and may determine third coding units 1014a and 1014b having square shapes by splitting the right second coding unit 1010b in a horizontal direction. In addition, the image decoding device 150 may determine third coding units 1016a, 1016b, 1016c, and 1016d having square shapes by splitting both the left second coding unit 1010a and the right second coding unit 1010b in the horizontal direction. In this case, coding units may be determined in the same manner in which the first coding unit 1000 is split into the four square second coding units 1030a, 1030b, 1030c, and 1030d.

As another example, the image decoding device 150 may determine third coding units 1022a and 1022b having square shapes by splitting the top second coding unit 1020a in the vertical direction and determine third coding units 1024a and 1024b having square shapes by splitting the bottom second coding unit 1020b in the vertical direction. In addition, the image decoding device 150 may determine third coding units 1022a, 1022b, 1024a, and 1024b having square shapes by splitting both the top second coding unit 1020a and the bottom second coding unit 1020b in the vertical direction. In this case, coding units may be determined in the same manner in which the first coding unit 1000 is split into the four square second coding units 1030a, 1030b, 1030c, and 1030d.

Figure 11:
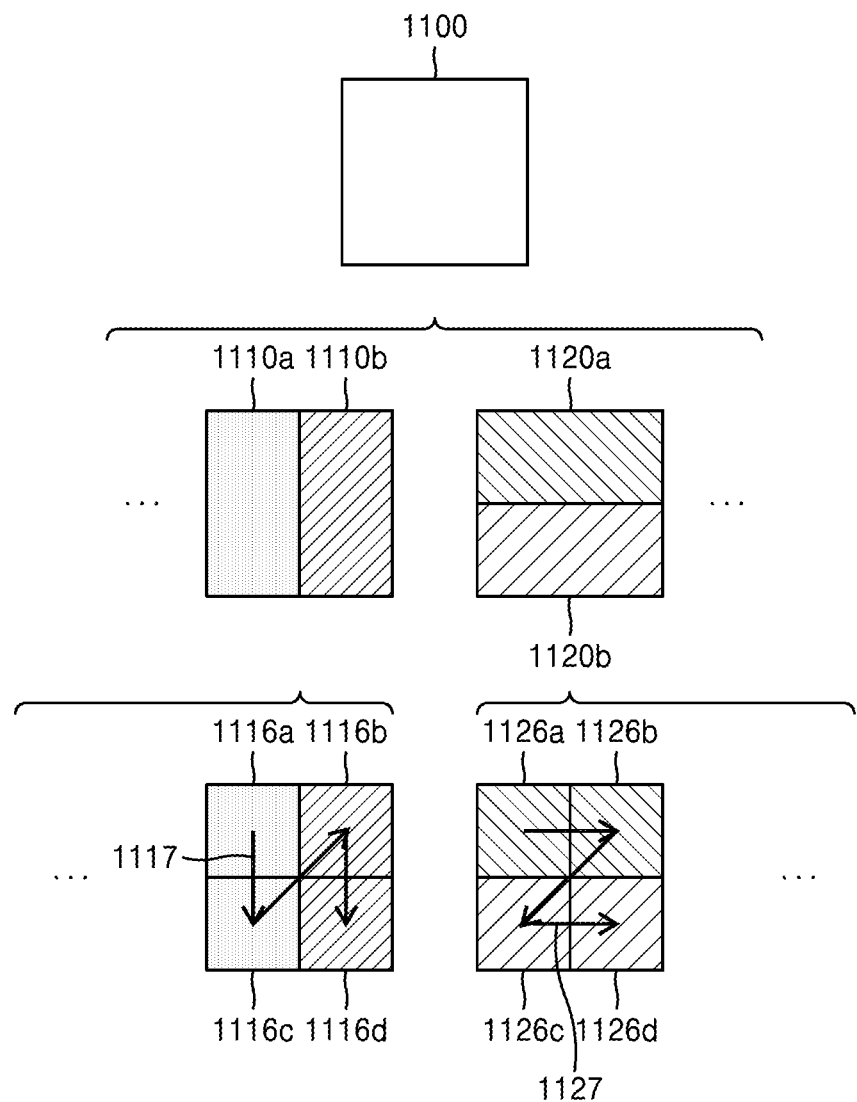
FIG. 11 illustrates that a processing order between a plurality of coding units may be changed according to a split process of a coding unit, according to an embodiment.

FIG. 11 illustrates that a processing order between a plurality of coding units may be changed according to a split process of a coding unit, according to an embodiment.

According to an embodiment, the image decoding device 150 may split a first coding unit 1100, based on block shape information and split shape information. When the block shape information indicates a square shape and the split shape information indicates that the first coding unit 1100 is to be split in at least one of a horizontal direction and a vertical direction, the image decoding device 150 may split the first coding unit 1100 to determine second coding units (for example, second coding units 1110a, 1110b, 1120a, 1120b, 1130a, 1130b, 1130c, 1130d, and the like). Referring to FIG. 11, the second coding units 1110a, 1110b, 1120a, and 1120b having non-square shapes and determined when the first coding unit 1100 is split only in the horizontal or vertical direction may each be independently split based on block shape information and split shape information about each of the second coding units 1110a, 1110b, 1120a, and 1120b. For example, the image decoding device 150 may determine third coding units 1116a, 1116b, 1116c, and 1116d by splitting the second coding units 1110a and 1110b in the horizontal direction, wherein the second coding units 1110a and 1110b are generated when the first coding unit 1100 is split in the vertical direction, and may determine third coding units 1126a, 1126b, 1126c, and 1126d by splitting the second coding units 1120a and 1120b in the horizontal direction, wherein the second coding units 1120a and 1120b are generated when the first coding unit 1100 is split in the horizontal direction. Because split processes of the second coding units 1110a, 1110b, 1120a, and 1120b have been described with reference to FIG. 9, details thereof are not provided again.

According to an embodiment, the image decoding device 150 may process coding units according to a predetermined order. Because characteristics about processing of coding units according to a predetermined order have been described above with reference to FIG. 6, details thereof are not provided again. Referring to FIG. 11, the image decoding device 150 may determine four square third coding units 1116a, 1116b, 1116c, and 1116d or 1126a, 1126b, 1126c, and 1126d by splitting the first coding unit 1100 having a square shape. According to an embodiment, the image decoding device 150 may determine a processing order of the third coding units 1116a, 1116b, 1116c, and 1116d or 1126a, 1126b, 1126c, and 1126d according to a shape of the first coding unit 1100 being split.

According to an embodiment, the image decoding device 150 may determine the third coding units 1116a, 1116b, 1116c, and 1116d by splitting each of the second coding units 1110a and 1110b in the horizontal direction, wherein the second coding units 1110a and 1110b are generated when the first coding unit 1100 is split in the vertical direction, and the image decoding device 150 may process the third coding units 1116a, 1116b, 1116c, and 1116d according to an order 1117 of first processing the third coding units 1116a and 1116b included in the left second coding unit 1110a in the vertical direction and then processing the third coding units 1116c and 1116d included in the right second coding unit 1110b in the vertical direction.

According to an embodiment, the image decoding device 150 may determine the second coding units 1126a, 1126b, 1126c, and 1126d by splitting each of the second coding units 1120a and 1120b in the vertical direction, wherein the second coding units 1120a and 1120b are generated when the first coding unit 1100 is split in the horizontal direction, and the image decoding device 150 may process the third coding units 1126a, 1126b, 1126c, and 1126d according to an order of first processing the third coding units 1126a and 1126b included in the top second coding unit 1120a in the horizontal direction and then processing the third coding units 1126c and 1126d included in the bottom second coding unit 1120b in the horizontal direction.

Referring to FIG. 11, the third coding units 1116a, 1116b, 1116c, 1116d, 1126a, 1126b, 1126c, and 1126d having square shapes may be determined when each of the second coding units 1110a, 1110b, 1120a, and 1120b are split. The second coding units 1110a and 1110b determined when the first coding unit 1100 is split in the vertical direction and the second coding units 1120a and 1120b determined when the first coding unit 1100 is split in the horizontal direction have different shapes, but according to the third coding units 1116a, 1116b, 1116c, 1116d, 1126a, 1126b, 1126c, and 1126d determined thereafter, the first coding unit 1100 is split into coding units having the same shapes. Accordingly, even when coding units having the same shapes are determined as a result by recursively splitting coding units through different processes based on at least one of block shape information and split shape information, the image decoding device 150 may process the coding units having the same shapes in different orders.

FIG. 12 illustrates a process of determining a depth of a coding unit when a shape and size of the coding unit change, in a case where a plurality of coding units are determined when the coding unit is recursively split, according to an embodiment.

According to an embodiment, the image decoding device 150 may determine a depth of a coding unit according to a predetermined criterion. For example, the predetermined criterion may be a length of a longer side of the coding unit. When a length of a longer side of a coding unit before being split is 2 n times a length of a longer side of a current coding unit, wherein n>0, the image decoding device 150 may determine that a depth of the current coding unit is higher than a depth of the coding unit before being split by n. Hereinafter, a coding unit having a higher depth will be referred to as a coding unit of a lower depth.

Referring to FIG. 12, according to an embodiment, the image decoding device 150 may determine a second coding unit 1202 and a third coding unit 1204 of lower depths by splitting a first coding unit 1200 having a square shape, based on block shape information indicating a square shape (for example, block shape information may indicate '0: SQUARE'). When a size of the first coding unit 1200 having a square shape is 2N×2N, the second coding unit 1202 determined by splitting a width and a height of the first coding unit 1200 by ½ may have a size of N×N. In addition, the third coding unit 1204 determined by splitting a width and a height of the second coding unit 1202 by ½ may have a size of N/2×N/2. In this case, a width and a height of the third coding unit 1204 correspond to ½ times those of the first coding unit 1200. When a depth of the first coding unit 1200 is D, a depth of the second coding unit 1202, which is ½ times the width and height of the first coding unit 1200, may be D+1, and a depth of the third coding unit 1204, which is ½ times the width and height of the first coding unit 1200, may be D+2.

According to an embodiment, the image decoding device 150 may determine a second coding unit 1212 or 1222 and a third coding unit 1214 or 1224 of lower depths by splitting a first coding unit 1210 or 1220 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding device 150 may determine second coding units (for example, the second coding units 1202, 1212, 1222, and the like) by splitting at least one of the width and the height of the first coding unit 1210 having a size of N×2N. In other words, the image decoding device 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding device 150 may determine the second coding units (for example, the second coding units 1202, 1212, 1222, and the like) by splitting at least one of the width and the height of the first coding unit 1220 having a size of 2N×N. That is, the image decoding device 150 may determine the second coding unit 1202 having a size of N×N or the second coding unit 1212 having a size of N/2×N by splitting the first coding unit 1220 in the vertical direction, or may determine the second coding unit 1222 having a size of N×N/2 by splitting the first coding unit 1220 in the horizontal and vertical directions.

According to an embodiment, the image decoding device 150 may determine third coding units (for example, the third coding units 1204, 1214, 1224, and the like) by splitting at least one of a width and a height of the second coding unit 1202 having a size of N×N. That is, the image decoding device 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding device 150 may determine the third coding units (for example, the third coding units 1204, 1214, 1224, and the like) by splitting at least one of a width and a height of the second coding unit 1212 having a size of N/2×N. That is, the image decoding device 150 may determine the third coding unit 1204 having a size of N/2×N/2 or the third coding unit 1224 having a size of N/2×N/2 by splitting the second coding unit 1212 in a horizontal direction, or determine the third coding unit 1214 having a size of N/2×N/2 by splitting the second coding unit 1212 in vertical and horizontal directions.

According to an embodiment, the image decoding device 150 may determine the third coding units (for example, the third coding units 1204, 1214, 1224, and the like) by splitting at least one of a width and a height of the second coding unit 1214 having a size of N×N/2. That is, the image decoding device 150 may determine the third coding unit 1204 having a size of N/2×N/2 or the third coding unit 1214 having a size of N/2×N/2 by splitting the second coding unit 1212 in a vertical direction, or determine the third coding unit 1224 having a size of N/2×N/2 by splitting the second coding unit 1212 in vertical and horizontal directions.

According to an embodiment, the image decoding device 150 may split coding units having square shapes (for example, the first coding units 1200, 1202, and 1204) in a horizontal or vertical direction. For example, the first coding unit 1200 having a size of 2N×2N may be split in the vertical direction to determine the first coding unit 1210 having a size of N×2N or in the horizontal direction to determine the first coding unit 1220 having a size of 2N×N/. According to an embodiment, when a depth is determined based on a length of a longest side of a coding unit, a depth of a coding unit determined when the first coding unit 1200, 1202, or 1204 is split in the horizontal or vertical direction may be the same as a depth of the first coding unit 1200, 1202, or 1204.

According to an embodiment, the width and height of the third coding unit 1214 or 1224 may be ½ times the first coding unit 1210 or 1220. When the depth of the first coding unit 1210 or 1220 is D, the depth of the second coding unit 1212 or 1214, which is ½ times the width and height of the first coding unit 1210 or 1220, may be D+1, and the depth of the third coding unit 1214 or 1224, which is ½ times the width and height of the first coding unit 1210 or 1220, may be D+2.

Figure 13:
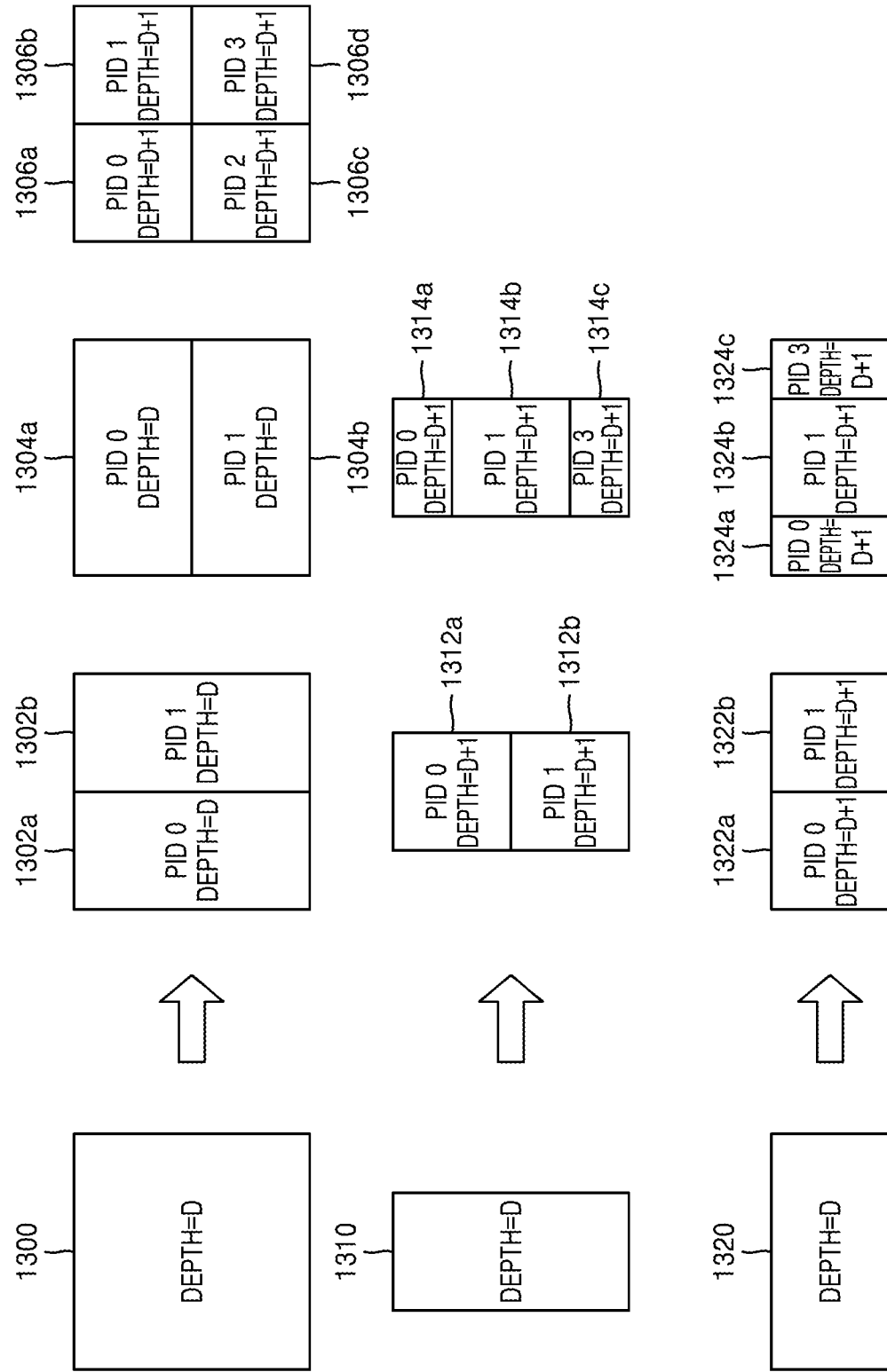
FIG. 13 illustrates a depth determinable according to shapes and sizes of coding units, and a part index (PID) for distinguishing between the coding units, according to an embodiment.

FIG. 13 illustrates a depth determinable according to shapes and sizes of coding units, and a part index (PID) for distinguishing between the coding units, according to an embodiment.

According to an embodiment, the image decoding device 150 may determine second coding units having various shapes by splitting a first coding unit 1300 having a square shape. Referring to FIG. 13, the image decoding device 150 may determine second coding units 1302a, 1302b, 1304a, 1304b, 1306a, 1306b, 1306c, and 1306d by splitting the first coding unit 1300 in at least one of a vertical direction and a horizontal direction, according to split shape information. That is, the image decoding device 150 may determine the second coding units 1302a, 1302b, 1304a, 1304b, 1306a, 1306b, 1306c, and 1306d based on split shape information about the first coding unit 1300.

According to an embodiment, depths of the second coding units 1302a, 1302b, 1304a, 1304b, 1306a, 1306b, 1306c, and 1306d determined according to the split shape information about the first coding unit 1300 having a square shape may be determined based on lengths of longer sides. For example, because lengths of longer sides of the second coding units 1302a, 1302b, 1304a, and 1304b having non-square shapes are the same as a length of one side of the first coding unit 1300 having a square shape, depths of the first coding unit 1300 and the second coding units 1302a, 1302b, 1304a, and 1304b having non-square shapes may be D, i.e., the same. On the other hand, when the image decoding device 150 splits the first coding unit 1300 into the four second coding units 1306a, 1306b, 1306c, and 1306d having square shapes based on split shape information, because a length of one side of each of the second coding units 1306a, 1306b, 1306c, and 1306d having square shapes is ½ of a length of one side of the first coding unit 1300, depths of the second coding units 1306a, 1306b, 1306c, and 1306d may be D+1, i.e., one depth lower than the depth D of the first coding unit 1300.

According to an embodiment, the image decoding device 150 may split a first coding unit 1310 having a height longer than a width into a plurality of second coding units 1312*a*, 1312*b*, 1314*a*, 1314*b*, and 1314*c* by splitting the first coding unit 1310 in a horizontal direction according to split shape information. According to an embodiment, the image decoding device 150 may split a first coding unit 1320 having a width longer than a height into a plurality of second coding units 1322*a* and 1322*b*, or 1324*a*, 1324*b*, and 1324*c* by splitting the first coding unit 1320 in a vertical direction according to split shape information.

According to an embodiment, depths of the second coding units 1312*a*, 1312*b*, 1314*a*, 1314*b*, 1316*a*, 1316*b*, 1316*c*, and 1316*d* determined according to the split shape information about the first coding unit 1310 or 1320 having a non-square shape may be determined based on lengths of longer sides. For example, because a length of one side of each of the second coding units 1312*a* and 1312*b* having square shapes is ½ of a length of one side of the first coding unit 1310 having a non-square shape in which a height is longer than a width, the depths of the second coding units 1302*a*, 1302*b*, 1304*a*, and 1304*b* having square shapes are D+1, i.e., one depth lower than the depth D of the first coding unit 1310 having a non-square shape.

In addition, the image decoding device 150 may split the first coding unit 1310 having a non-square shape into an odd number of the second coding units 1314*a*, 1314*b*, and 1314*c* based on split shape information. The odd number of second coding units 1314*a*, 1314*b*, and 1314*c* may include the second coding units 1314*a* and 1314*c* having non-square shapes and the second coding unit 1314*b* having a square shape. Here, because lengths of longer sides of the second coding units 1314*a* and 1314*c* having non-square shapes and a length of one side of the second coding unit 1314*b* having a square shape are ½ of a length of one side of the first coding unit 1310, depths of the second coding units 1314*a*, 1314*b*, and 1314*c* may be D+1, i.e., one depth lower than the depth D of the first coding unit 1310. The image decoding device 150 may determine depths of coding units related to the first coding unit 1310 having a non-square shape in which a width is longer than a height in the similar manner as depths of coding units related to the first coding unit 1310 are determined.

According to an embodiment, while determining PIDs for distinguishing between coding units, the image decoding device 150 may determine the PIDs based on size ratios between the coding units when an odd number of the coding units do not have the same size. Referring to FIG. 13, the coding unit 1314*b* located at the center of the odd number of coding units 1314*a*, 1314*b*, and 1314*c* has the same width as the coding units 1314*a* and 1314*c*, but has a height twice higher than heights of the coding units 1314*a* and 1314*c*. In this case, the coding unit 1314*b* located at the center may include two of each of the coding units 1314*a* and 1314*c*. Accordingly, when a PID of the coding unit 1314*b* located at the center according to a scan order is 1, a PID of the coding unit 1314*c* located in a next order may be increased by 2, i.e., 3. That is, values of PIDs may be discontinuous. According to the present embodiment, the image decoding device 150 may determine whether an odd number of coding units have the same size based on discontinuity of PIDs for distinguishing between the coding units.

According to an embodiment, the image decoding device 150 may determine whether a plurality of coding units determined when a current coding unit is split have certain split shapes based on values of PIDs for distinguishing between the coding units. Referring to FIG. 13, the image decoding device 150 may determine an even number of the coding units 1312*a* and 1312*b* or an odd number of the coding units 1314*a*, 1314*b*, and 1314*c* by splitting the first coding unit 1310 having a rectangular shape in which a height is longer than a width. The image decoding device 150 may use an ID indicating each coding unit so as to distinguish between a plurality of coding units. According to an embodiment, the PID may be obtained from a sample at a predetermined location (for example, an upper left sample) of each coding unit.

According to an embodiment, the image decoding device 150 may determine a coding unit at a predetermined location from among coding units determined via split, by using PIDs for distinguishing between the coding units. According to an embodiment, when split shape information about the first coding unit 1310 having a rectangular shape in which a height is longer than a width indicates a split into three coding units, the image decoding device 150 may split the first coding unit 1310 into the three coding units 1314*a*, 1314*b*, and 1314*c*. The image decoding device 150 may allocate a PID to each of the three coding units 1314*a*, 1314*b*, and 1314*c*. The image decoding device 150 may compare PIDs of coding units so as to determine a center coding unit from among an odd number of coding units. The image decoding device 150 may determine the coding unit 1314*b* having a PID corresponding to a center value from among PIDs as a coding unit located at the center from among coding units determined when the first coding unit 1310 is split, based on PIDs of the coding units. According to an embodiment, the image decoding device 150 may determine PIDs based on size ratios between coding units when the coding units do not have the same size, while determining the PIDs for distinguishing between the coding units. Referring to FIG. 13, the coding unit 1314*b* generated when the first coding unit 1310 is split may have the same width as the coding units 1314*a* and 1314*c*, but may have a height twice higher than heights of the coding units 1314*a* and 1314*c*. In this case, when the PID of the coding unit 1314*b* located at the center is 1, the PID of the coding unit 1314*c* located in a next order may be increased by 2, i.e., 3. As such, when an increase range changes while PIDs are uniformly increasing, the image decoding device 150 may determine that a coding unit is split into a plurality of coding units including a coding unit having a different size from other coding units. According to an embodiment, when split shape information indicates a split into an odd number of coding units, the image decoding device 150 may split a current coding unit into an odd number of coding units in which a coding unit at a predetermined location (for example, a center coding unit) has a different size from other coding units. In this case, the image decoding device 150 may determine the center coding unit having the different size by using PIDs of the coding units. However, because the PID, and a size or location of a coding unit at a predetermined location are specified to describe an embodiment, and thus the present disclosure is not limited thereto, and various PIDs, and various locations and sizes of a coding unit may be used.

According to an embodiment, the image decoding device 150 may use a predetermined data unit from which a coding unit starts to be recursively split.

Figure 14:
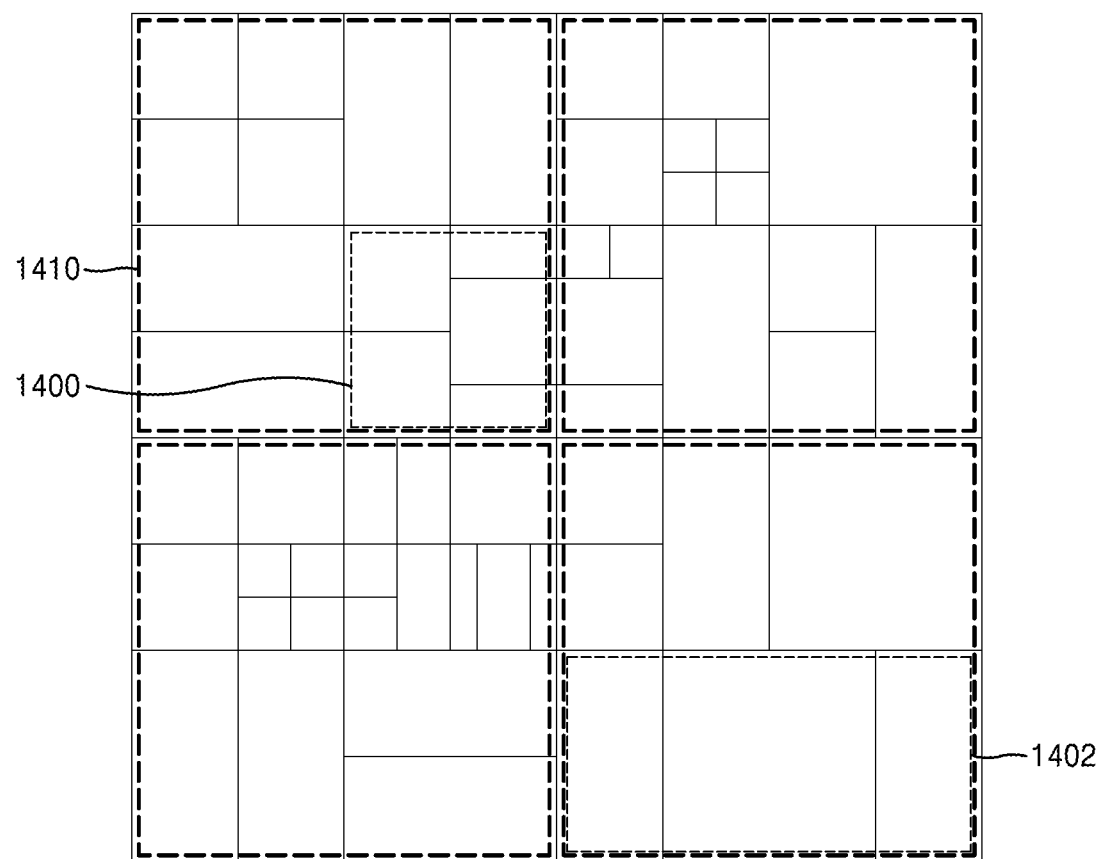
FIG. 14 illustrates that a plurality of coding units are determined according to a plurality of predetermined data units included in a picture, according to an embodiment.

FIG. 14 illustrates that a plurality of coding units are determined according to a plurality of predetermined data units included in a picture, according to an embodiment.

According to an embodiment, a predetermined data unit may be defined as a data unit from which a coding unit starts to be recursively split by using at least one of block shape information and split shape information. That is, the predetermined data unit may correspond to a coding unit of an uppermost depth used while determining a plurality of coding units splitting a current picture. Hereinafter, for convenience of description, such a predetermined data unit is referred to as a reference data unit.

According to an embodiment, a reference data unit may indicate a predetermined size and shape. According to an embodiment, a reference coding unit may include M×N samples. Here, M and N may be equal to each other, and may be an integer expressed as a multiple of 2. That is, a reference data unit may indicate a square shape or a non-square shape, and may later be split into an integer number of coding units.

According to an embodiment, the image decoding device 150 may split a current picture into a plurality of reference data units. According to an embodiment, the image decoding device 150 may split the plurality of reference data units obtained by splitting the current picture by using split information about each of the reference data units. Split processes of such reference data units may correspond to split processes using a quad-tree structure.

According to an embodiment, the image decoding device 150 may pre-determine a smallest size available for the reference data unit included in the current picture. Accordingly, the image decoding device 150 may determine the reference data unit having various sizes that are equal to or larger than the smallest size, and determine at least one coding unit based on the determined reference data unit by using block shape information and split shape information.

Referring to FIG. 14, the image decoding device 150 may use a reference coding unit 1400 having a square shape, or may use a reference coding unit 1402 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the receiver 160 of the image decoding device 150 may obtain, from a bitstream, at least one of information about a shape of a reference coding unit and information about a size of the reference coding unit, according to the various data units. Processes of determining at least one coding unit included in the reference coding unit 1400 having a square shape have been described above through processes of splitting the current coding unit 1000 of FIG. 10, and processes of determining at least one coding unit included in the reference coding unit 1402 having a non-square shape have been described above through processes of splitting the current coding unit 1100 or 1150 of FIG. 11, and thus descriptions thereof are not provided here.

According to an embodiment, to determine a size and shape of a reference coding unit according to some data units pre-determined based on a predetermined condition, the image decoding device 150 may use a PID for checking the size and shape of the reference coding unit. That is, the receiver 160 may obtain, from a bitstream, only a PID for checking a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding device 150 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding device 150 may select at least one of the pre-determined size and shape of the reference coding unit according to the PID so as to determine at least one of the size and shape of the reference coding unit included in a data unit that is a criterion for obtaining the PID.

According to an embodiment, the image decoding device 150 may use at least one reference coding unit included in one largest coding unit. That is, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. That is, the image decoding device 150 may determine a reference coding unit by splitting a largest coding unit n times according to a quad-tree structure, and split the reference coding unit based on at least one of block shape information and split shape information according to various embodiments.

Figure 15:
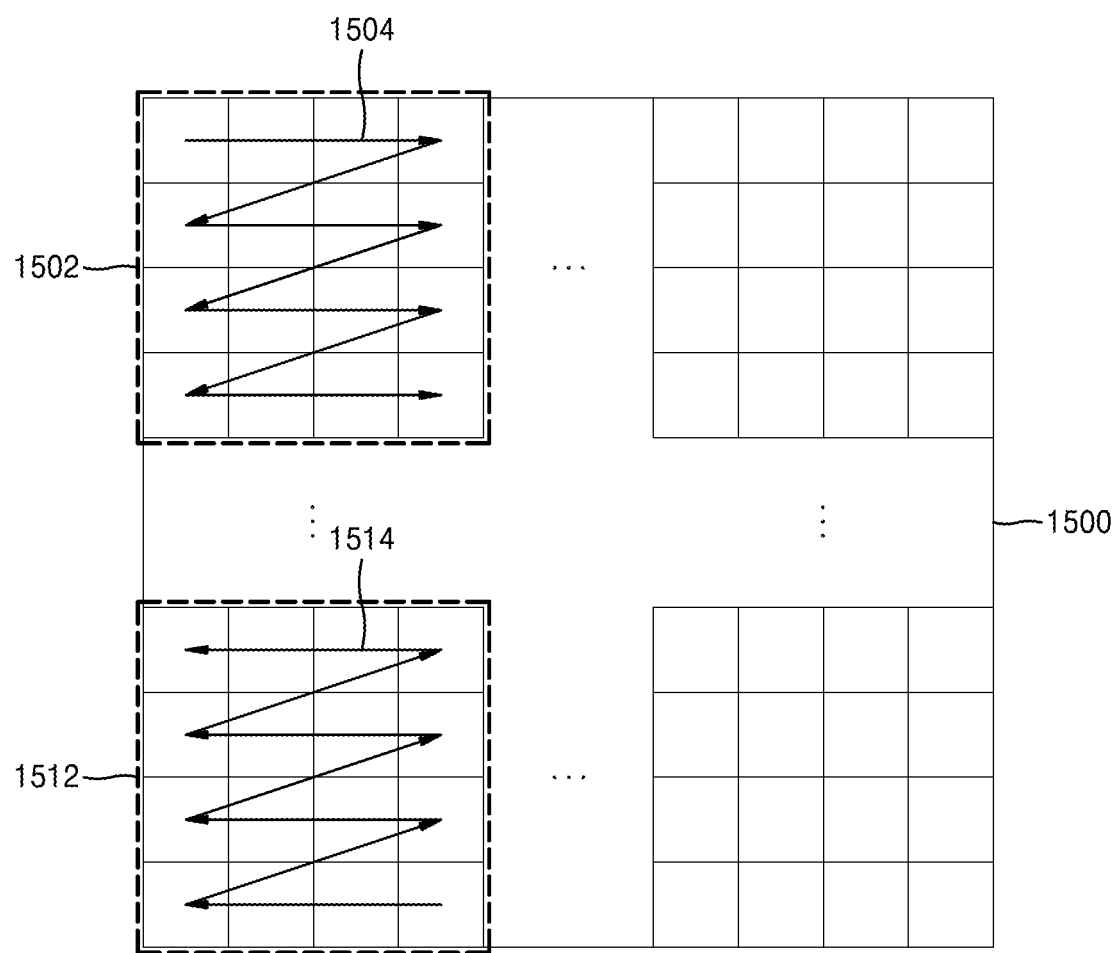
FIG. 15 illustrates a processing block that is a criterion in determining a determining order of a reference coding unit included in a picture, according to an embodiment.

FIG. 15 illustrates a processing block that is a criterion in determining a determining order of a reference coding unit included in a picture 1500, according to an embodiment.

According to an embodiment, the image decoding device 150 may determine at least one processing block splitting a picture. A processing block is a data unit including at least one reference coding unit splitting an image, and the at least one reference coding unit included in the processing block may be determined in a certain order. That is, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to an embodiment, the image decoding device 150 may determine a size of at least one processing block included in an image by obtaining information about a size of a processing block. The image decoding device 150 may obtain, from a bitstream, the information about a size of a processing block to determine the size of the at least one processing block included in the image. The size of the processing block may be a predetermined size of a data unit indicated by the information about a size of a processing block.

According to an embodiment, the receiver 160 of the image decoding device 150 may obtain, from the bitstream, the information about a size of a processing block according to certain data units. For example, the information about a size of a processing block may be obtained from the bitstream in data units of images, sequences, pictures, slices, and slice segments. That is, the receiver 160 may obtain, from the bitstream, the information about a size of a processing block according to such several data units, and the image decoding device 150 may determine the size of at least one processing block splitting the picture by using the obtained information about a size of a processing block, wherein the size of the processing block may be an integer times a size of a reference coding unit.

According to an embodiment, the image decoding device 150 may determine sizes of processing blocks 1502 and 1512 included in the picture 1500. For example, the image decoding device 150 may determine a size of a processing block based on information about a size of a processing block, the information obtained from a bitstream. Referring to FIG. 15, the image decoding device 150 may determine horizontal sizes of the processing blocks 1502 and 1512 to be four times a horizontal size of a reference coding unit, and a vertical size thereof to be four times a vertical size of the reference coding unit, according to an embodiment. The image decoding device 150 may determine a determining order of at least one reference coding unit in at least one processing block.

According to an embodiment, the image decoding device 150 may determine each of the processing blocks 1502 and 1512 included in the picture 1500 based on a size of a processing block, and may determine a determining order of at least one reference coding unit included in each of the processing blocks 1502 and 1512. According to an embodiment, determining of a reference coding unit may include determining of a size of the reference coding unit.

According to an embodiment, the image decoding device 150 may obtain, from a bitstream, information about a determining order of at least one reference coding unit included in at least one processing block, and may determine the determining order of the at least one reference coding unit based on the obtained information. The information about a determining order may be defined as an order or direction of determining reference coding units in a processing block. That is, an order of determining reference coding units may be independently determined per processing block.

According to an embodiment, the image decoding device 150 may obtain, from a bitstream, information about a determining order of a reference coding unit according to certain data units. For example, the receiver 160 may obtain, from the bitstream, the information about a determining order of a reference coding unit according to data units, such as images, sequences, pictures, slices, slice segments, and processing blocks. Because the information about a determining order of a reference coding unit indicates a determining order of a reference coding unit in a processing block, the information about a determining order may be obtained per certain data unit including an integer number of processing blocks.

According to an embodiment, the image decoding device 150 may determine at least one reference coding unit based on the determined order.

According to an embodiment, the receiver 160 may obtain, from the bitstream, information about a determining order of a reference coding unit, as information related to the processing blocks 1502 and 1512, and the image decoding device 150 may determine an order of determining at least one reference coding unit included in the processing blocks 1502 and 1512 and determine at least one reference coding unit included in the picture 1500 according to a determining order of a coding unit. Referring to FIG. 15, the image decoding device 150 may determine determining orders 1504 and 1514 of at least one reference coding unit respectively related to the processing blocks 1502 and 1512. For example, when information about a determining order of a reference coding unit is obtained per processing block, determining orders of a reference coding unit related to the processing blocks 1502 and 1512 may be different from each other. When the determining order 1504 related to the processing block 1502 is a raster scan order, reference coding units included in the processing block 1502 may be determined according to the raster scan order. On the other hand, when the determining order 1514 related to the processing block 1512 is an inverse order of a changed raster scan order, reference coding units included in the processing block 1512 may be determined in the inverse order of the changed raster scan order. With reference to FIGS. 1 to 15, the method of splitting an image into largest coding units, and splitting each largest coding unit into coding units having a hierarchical tree structure are described above. With reference to FIGS. 16 to 25, it will now be described how to encode or decode the coding units to be split from a current coding unit having a smaller depth than the coding units by 1 according to which coding order.

Figure 16:
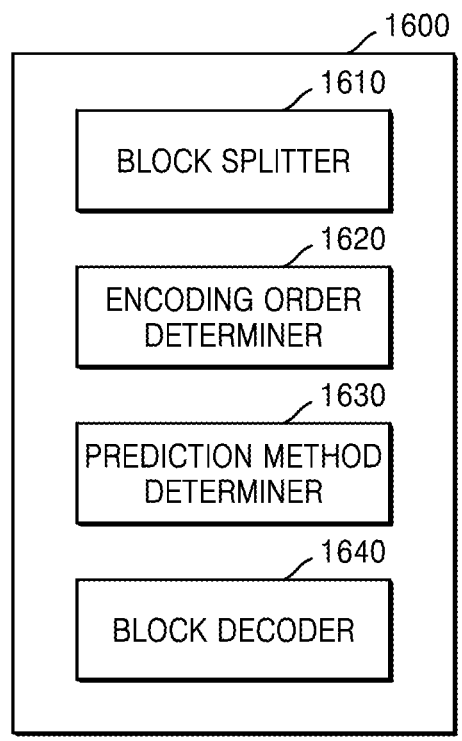
FIG. 16 illustrates a video decoding device involving splitting a current block and determining an encoding order of split lower blocks, according to an embodiment.

FIG. 16 illustrates a video decoding device 1600 involving determining whether to split a current block and an encoding order of split lower blocks, according to an embodiment.

The video decoding device 1600 includes a block splitter 1610, an encoding order determiner 1620, a prediction method determiner 1630, and a block decoder 1640. In FIG. 16, the block splitter 1610, the encoding order determiner 1620, the prediction method determiner 1630, and the block decoder 1640 are formed as separate elements, but in another embodiment, the block splitter 1610, the encoding order determiner 1620, the prediction method determiner 1630, and the block decoder 1640 may be integrated to be implemented as one element.

In FIG. 16, the block splitter 1610, the encoding order determiner 1620, the prediction method determiner 1630, and the block decoder 1640 are seen as elements located within one apparatus, but the block splitter 1610, the encoding order determiner 1620, the prediction method determiner 1630, and the block decoder 1640 are not required to be physically adjacent to each other. Thus, in another embodiment, the block splitter 1610, the encoding order determiner 1620, the prediction method determiner 1630, and the block decoder 1640 may be dispersed.

The block splitter 1610, the encoding order determiner 1620, the prediction method determiner 1630, and the block decoder 1640 may be implemented by one processor. In another embodiment, the block splitter 1610, the encoding order determiner 1620, the prediction method determiner 1630, and the block decoder 1640 may be implemented by a plurality of processors.

Functions performed by the block splitter 1610, the encoding order determiner 1620, the prediction method determiner 1630, and the block decoder 1640 of FIG. 16 may be performed by the decoder 180 of FIG. 1B.

The block splitter 1610 may obtain split information indicating whether a current block is to be split. The split information indicates whether the current block is to be split into at least two smaller blocks. When the split information indicates that the current block is to be split, the block splitter 1610 splits the current block into at least two lower blocks.

The current block may be split into various forms according to a shape of the current block. For example, when the current block has a square shape, the current block may be split into at least four square lower blocks, according to the split information.

When at least two split methods are allowed for the shape of the current block, the block splitter 1610 may select a split method according to split shape information. Thus, when the split information indicates that the current block is to be split, the block splitter 1610 may split the current block, according to the split method indicated by the split shape information.

For example, when the current block has a square shape of 2N×2N size, the split shape information may indicate a split method from among N×N split, 2N×N split, N×2N split, vertically unequal tri-split, and horizontally unequal tri-split, the split method being applied to the current block. The N×N split indicates a method of splitting the current block into four blocks of N×N size. The 2N×N split indicates a method of splitting the current block into blocks of 2N×N size. The N×2N split indicates a method of splitting the current block into blocks of N×2N size. The vertically unequal tri-split indicates a method of splitting a 2N×2N-size block into three blocks that have a same width and have respective heights having a ratio 1:2:1. The horizontally unequal tri-split indicates a method of splitting a 2N×2N-size block into three blocks that have a same height and have respective heights having a ratio 1:2:1. In addition, the current block may be split according to one of various horizontal split methods or vertical split methods.

When the current block has a vertically-long rectangular shape having 2N×N size, the split shape information may indicate a split method from among N×N split and vertically unequal tri-split, the split method being applied to the current block. The N×N split indicates a method of splitting the current block into two blocks of N×N size. The vertically unequal tri-split indicates a method of splitting a 2N×N-size block into three blocks that have a same width and have respective heights having a ratio 1:2:1. In addition, the current block may be split according to one of various horizontal split methods or vertical split methods.

When the current block has a horizontally-long rectangular shape having N×2N size, the split shape information may indicate a split method from among N×N split and horizontally unequal tri-split, the split method being applied to the current block. The N×N split indicates a method of splitting the current block into two blocks of N×N size. The horizontally unequal tri-split indicates a method of splitting a N×2N-size block into three blocks that have a same height and have respective heights having a ratio 1:2:1. In addition, the current block may be split according to one of various horizontal split methods or vertical split methods.

In addition to the aforementioned split methods, a method of asymmetrically splitting a current block, a method of splitting a current block according to a triangular shape, a method of splitting a current block according to other geometric shape, or the like may be used to split a current block having a square shape or a rectangular shape.

When the split information does not indicate that the current block is to be split, the block splitter 1610 does not split the current block. Then, the block decoder 1640 decodes the current block.

When the current block is a coding unit, the block splitter 1610 determines the current block as a final coding unit. The final coding unit is not split into coding units having a deeper depth. According to an embodiment, when the current block that is the final coding unit is split into data units other than a coding unit, the block decoder 1640 may make the block splitter 1610 split the current block.

According to an embodiment, the block splitter 1610 may split the current block into one or more prediction units according to a hierarchical tree structure. Equally, the block splitter 1610 may split the current block may split the current block into one or more transform units according to the hierarchical tree structure. Then, the block decoder 1640 may reconstruct the current block according to a prediction result with respect to the prediction units and a transformation result with respect to the transform units.

When the current block is a prediction unit, the block decoder 1640 may perform prediction on the current block. When the current block is a transform unit, the block decoder 1640 may inverse quantize and inverse transform a quantized transform coefficient with respect to the current block, thereby obtaining residual data.

The encoding order determiner 1620 obtains encoding order information indicating an encoding order of lower blocks. Then, the encoding order determiner 1620 may determine a decoding order of the lower blocks, based on the obtained encoding order information.

The encoding order information indicates an encoding order of at least two lower blocks included in the current block. A data amount of the encoding order information is determined based on the number of lower blocks and an encoding order determining scheme.

For example, when there are two lower blocks, the encoding order information may be determined to indicate a first-encoded lower block from among the two lower blocks. Thus, the encoding order information may be in the form of a flag having a 1-bit data amount.

However, when there are four lower blocks, the number of cases of an encoding order of lower blocks is 4!=24. Therefore, to indicate 24 encoding orders, a 5-bit data amount is required. That is, when the number of lower blocks is increased, the number of cases of an encoding order is increased. Therefore, to decrease a data amount of the encoding order information, an encoding order determining scheme of determining an encoding order by determining whether encoding orders of some lower block pairs are swapped in a predetermined default encoding order. Encoding order information indicating whether the encoding orders of some lower block pairs are swapped indicates a forward direction or a backward direction with respect to the default encoding order.

Figure 17A:
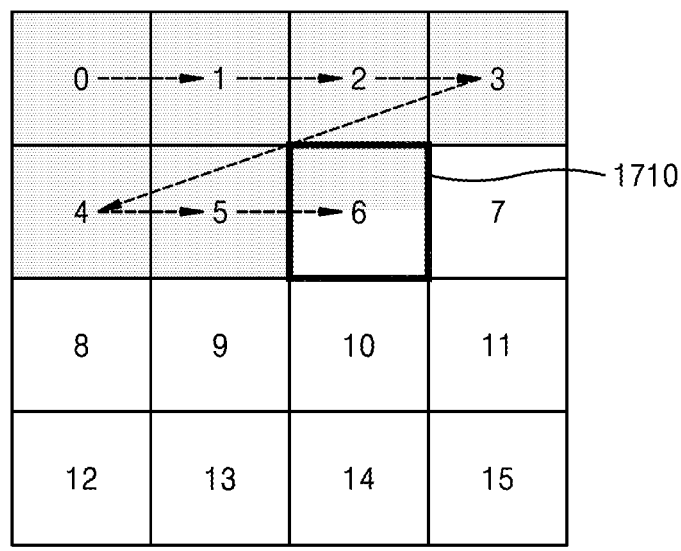
FIGS. 17A to 17C illustrate a default encoding order according to an embodiment.
Figure 17B:
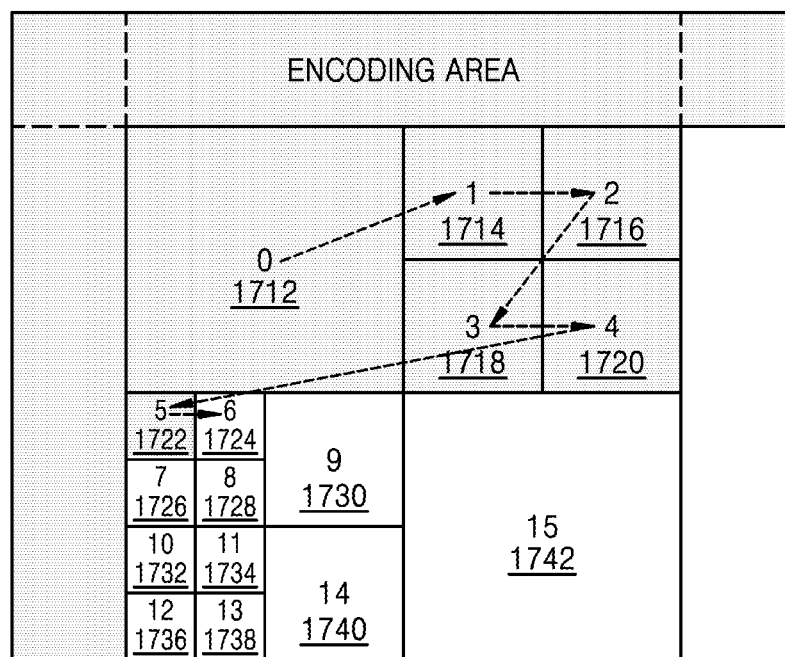
Figure 17C:
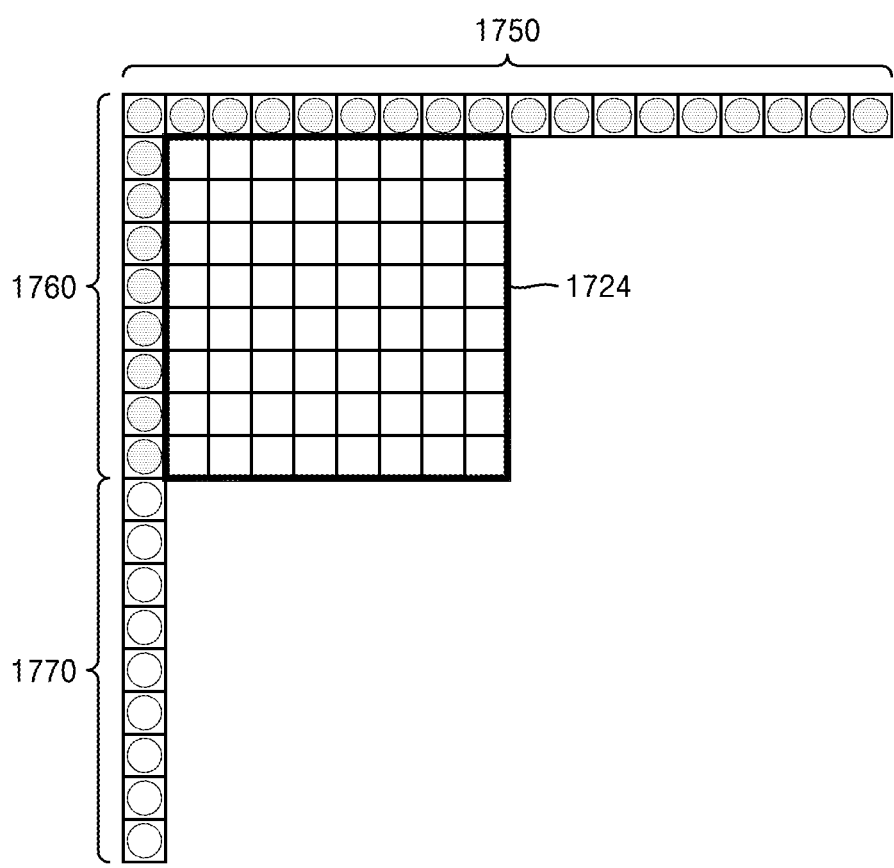

A current picture including the current block is encoded and decoded according to the default encoding order. All blocks and pixels to be encoded and decoded in the current picture are to be encoded and decoded at a same level according to the default encoding order. Thus, lower blocks at a same level split from the current block are also to be encoded and decoded according to the default encoding order. An embodiment of the default encoding order is illustrated in FIGS. 17A to 17C to be described below.

Therefore, when a lower block pair is encoded according to the default encoding order, it is described that the lower block pair is encoded in a forward direction. On the contrary, when the lower block pair is encoded according to an inverse order to the default encoding order, it is described that the lower block pair is encoded in a backward direction.

For example, in a case where two lower blocks are horizontally adjacent to each other and are encoded in a forward direction, the encoding order information may be determined to allow a left lower block to be first decoded. On the contrary, in a case where the two lower blocks that are horizontally adjacent to each other are encoded in a backward direction, the encoding order information may be determined to allow a right lower block to be first decoded.

Equally, in a case where two lower blocks are vertically adjacent to each other and are encoded in a forward direction, the encoding order information may be determined to allow an upper lower block to be first decoded. On the contrary, in a case where the two lower blocks that are vertically adjacent to each other are encoded in a backward direction, the encoding order information may be determined to allow a further lower block to be first decoded.

When the encoding order information indicates only an encoding order of a lower block pair, the encoding order information has a 1-bit data amount. The encoding order information having 1-bit data amount may be defined as an encoding order flag.

The encoding order determiner 1620 may obtain the encoding order information from a bitstream. The encoding order information may be positioned after split information in the bitstream.

The encoding order determiner 1620 may implicitly determine the encoding order information according to a surrounding environment of the current block. The encoding order information may be determined according to whether neighboring blocks adjacent to the current block have been encoded. For example, the encoding order determiner 1620 may determine a lower block to be first decoded, the lower block having many adjacent neighboring blocks from among lower blocks.

With respect to the encoding order determiner 1620, a default encoding order according to an embodiment will now be described with reference to FIGS. 17A to 17C. The default encoding order of FIGS. 17A to 17C is a Z encoding order. According to the Z encoding order, data units are encoded from the left to the right, and when data units of a current row are all encoded, data units included in a lower row of the current row are encoded from the left to the right. The aforementioned Z encoding order is referred to as a raster scan order.

FIG. 17A illustrates encoding orders according to a Z encoding order of largest coding units included in a current picture 1700. According to the Z encoding order, indexes 0 to 15 are set to the largest coding units. Largest coding units of a first row to which the indexes 0 to 3 are set according to the Z encoding order are first encoded, and largest coding units of a second row to which the indexes 4 to 7 are encoded from the left to the right. The largest coding units are internally encoded according to the Z encoding order.

FIG. 17B illustrates an encoding order of a largest coding unit 1710 having the index 6 from among the largest coding units included in the current picture 1700. Coding units of a final depth for which split has been completed according to the Z encoding order are set with the indexes 0 to 15. The Z encoding order is applied to data units of a same depth. In addition, until lower coding units of a current coding unit of a depth n are all encoded, a next coding unit of a depth n is not encoded. For example, until coding units having the indexes 5 to 14 are all encoded, a coding unit having the index 15 is not encoded. The coding units are also internally encoded according to the Z encoding order.

FIG. 17C illustrates a reference sample to be referred to by a coding unit 1724 having the index 6 from among the coding units included in the largest coding unit 1710. Only a coding unit 1712 having the index 0 and a coding unit 1722 having the index 5 have been reconstructed around the coding unit 1724 having the index 6 to be currently encoded. Therefore, for the coding unit 1724, only a pixel 1750 of the coding unit 1712 and a pixel 1760 of the coding unit 1722 may be used as a reference sample.

The Z encoding order of FIGS. 17A to 17C may be applied in another direction according to a data unit. For example, the Z encoding order may be changed to allow data units to be encoded from the right to the left in a same row. Also, the Z encoding order may be changed such that, after all data units of a current row are encoded, data units included in an upper row of the current row are to be encoded. Also, the Z encoding order may be changed such that data units of a same column are encoded from the top to the bottom and, after all data units of a current column are encoded, data units included in a right column of the current column are to be encoded.

Figure 18A:
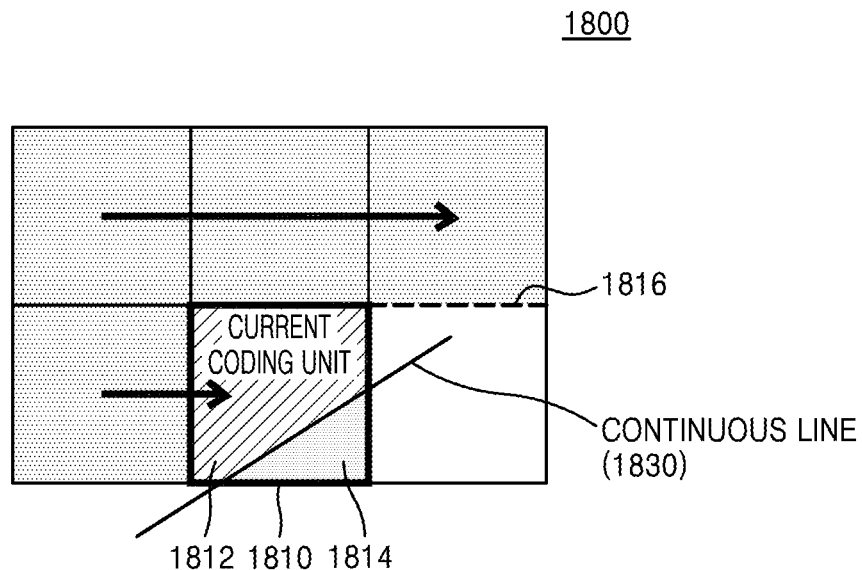
FIGS. 18A and 18B respectively illustrate a case in which a coding unit is encoded in a forward direction and a case in which a coding unit is encoded in a backward direction.
Figure 18B:
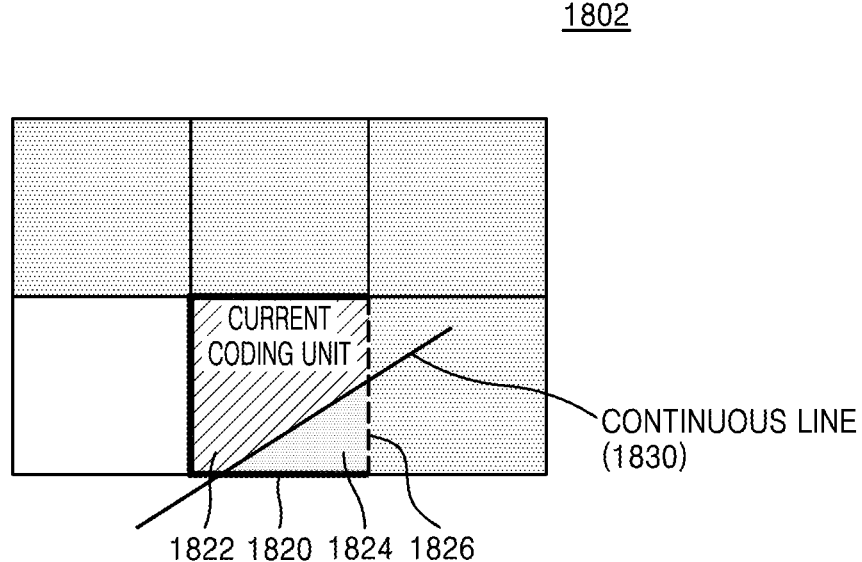

Regarding the encoding order determiner 1620, FIGS. 18A and 18B respectively illustrate a case 1800 in which a coding unit 1810 is encoded in a forward direction and a case 1802 in which a coding unit 1820 is encoded in a backward direction. With reference to FIGS. 18A and 18B, an advantage obtained by changing an encoding order will now be described.

The coding units 1810 and 1820 of FIGS. 18A and 18B are predicted according to an intra mode in an upper right direction. A continuous line 1830 of FIGS. 18A and 18B corresponds to pixels having a constant value and arranged in a straight line in an original image. Therefore, when a current coding unit is predicted in a direction of the continuous line 1830, prediction accuracy with respect to the coding units 1810 and 1820 may be improved.

In the case 1800 of encoding in the forward direction, a left coding unit, an upper coding unit, and an upper right coding unit of the current coding unit 1810 are first reconstructed before the current coding unit 1810. Therefore, the current coding unit 1810 refers to pixels or encoding information of the left coding unit, the upper coding unit, and the upper right coding unit. For example, pixels 1816 located a lower corner of the upper right coding unit are used in predicting the current coding unit 1810. Because the pixels 1816 are spatially distant from the current coding unit 1810, prediction accuracy with respect to a portion 1814 of the current coding unit 1810 may be low.

However, in the case 1802 of encoding in the inverse direction, a right coding unit, an upper coding unit, and an upper left coding unit of a current coding unit 1820 are first reconstructed before the current coding unit 1820, and thus, in intra prediction, pixels 1826 located at a left corner of the right coding unit may be used in predicting the current coding unit 1820. Because the pixels 1826 are adjacent to the current coding unit 1820, prediction accuracy with respect to a portion 1824 of the current coding unit 1820 may be further improved than the prediction accuracy with respect to the portion 1814 of the current coding unit 1810.

As in an embodiment of the intra prediction described with reference to FIGS. 18A and 18B, there are many cases in which prediction accuracy of inter prediction may be improved by obtaining encoding information from a block located in a backward direction. When a current coding unit and a right coding unit of the current coding unit are coding units with respect to a same object, the current coding unit and motion information of the right coding unit may be similar to each other. Therefore, coding efficiency may be increased by deriving motion information of the current coding unit from the motion information of the right coding unit.

Therefore, by determining an encoding order by comparing coding efficiency of a case in which the current coding unit is encoded in a forward direction with coding efficiency of a case in which the current coding unit is encoded in a backward direction, coding efficiency with respect to an image may be improved.

Encoding order information may be set to be equal to encoding order information applied to an upper block of a current block. For example, when the current block is a prediction unit or a transform unit, the encoding order determiner 1620 may apply, to the current block, encoding order information applied to a coding unit including the current block. As another example, when the current block is a coding unit, the encoding order determiner 1620 may apply, to the current block, encoding order information applied to a coding unit whose depth is lower than the current block.

When at least two encoding order flags are present with respect to the current block, the encoding order determiner 1620 may obtain only one encoding order flag from a bitstream, and may determine the other encoding order flag to interoperate with the encoding order flag obtained from the bitstream.

Figure 19:
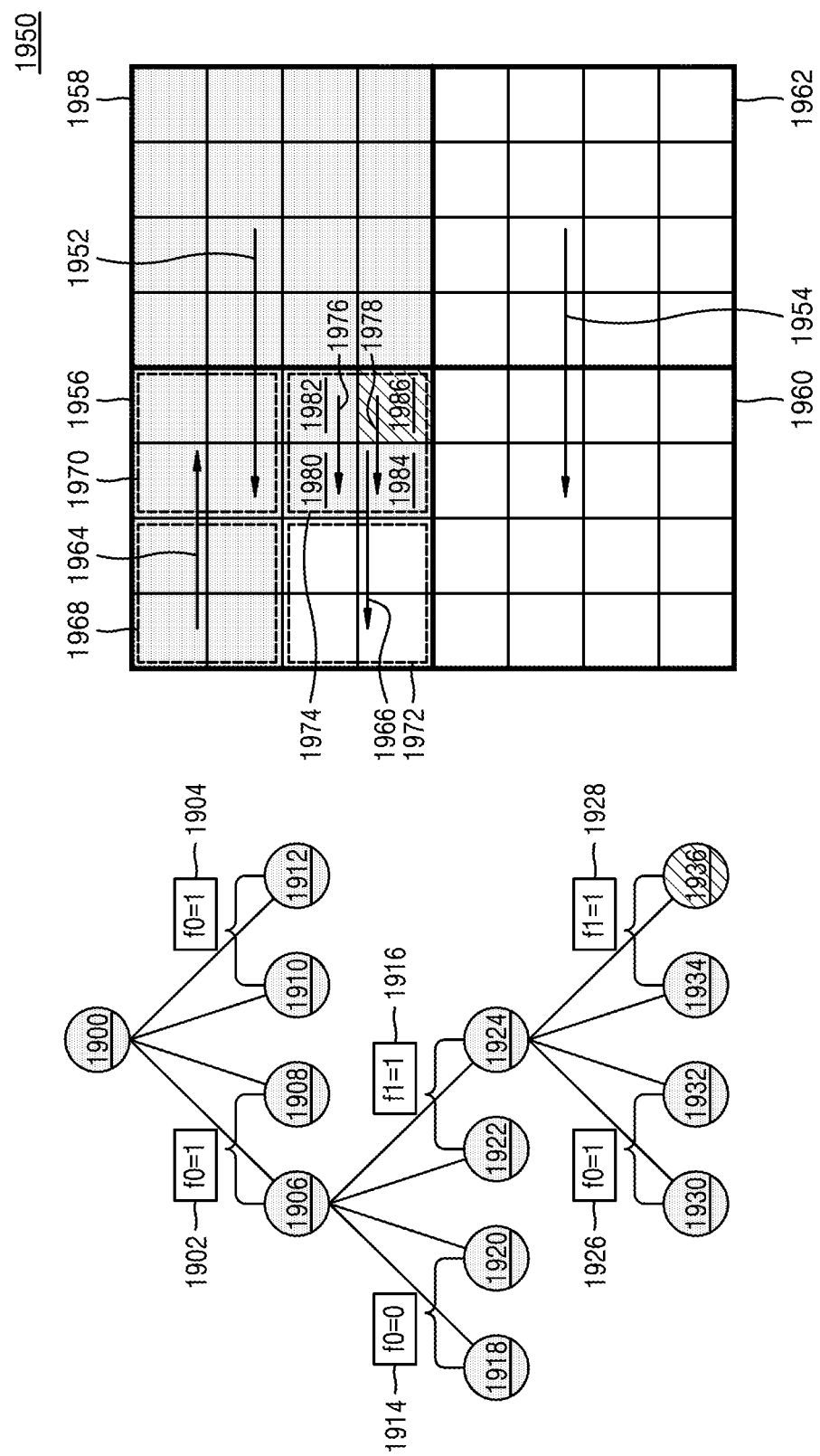
FIG. 19 illustrates a tree structure of a largest coding unit for describing an encoding order of a largest coding unit and coding units included in the largest coding unit.

With respect to encoding order determination by the encoding order determiner 1620, FIG. 19 illustrates a tree structure of a largest coding unit for describing an encoding order of the largest coding unit and coding units included in the largest coding unit.

A largest coding unit 1950 is split into a plurality of coding units 1956, 1958, 1960, 1962, 1968, 1970, 1972, 1974, 1980, 1982, 1984, and 1986. The largest coding unit 1950 corresponds to an uppermost node 1900 of the tree structure. The plurality of coding units 1956, 1958, 1960, 1962, 1968, 1970, 1972, 1974, 1980, 1982, 1984, and 1986 respectively correspond to a plurality of nodes 1906, 1908, 1910, 1912, 1918, 1920, 1922, 1924, 1930, 1932, 1934, and 1936. Upper encoding order flags 1902, 1914, and 1926 indicating encoding orders in the tree structure correspond to arrows 1952, 1964, and 1976, and upper encoding order flags 1904, 1916, and 1928 correspond to arrows 1954, 1966, and 1978.

An upper encoding order flag indicates an encoding order of two coding units located above from among four coding units having a same depth. When the upper encoding order flag indicates 0, encoding is performed in a forward direction. On the contrary, when the upper encoding order flag indicates 1, encoding is performed in a backward direction.

Equally, a lower encoding order flag indicates an encoding order of two coding units located in the lower side from among the four coding units having the same depth. When the lower encoding order flag indicates 0, encoding is performed in a forward direction. On the contrary, when the lower encoding order flag indicates 1, encoding is performed in a backward direction.

For example, because an upper encoding order flag 1914 indicates 0, an encoding order between coding units 1968 and 1970 is determined to be from the left that is a forward direction to the right. Also, because a lower encoding order flag 1916 indicates 0, an encoding order between coding units 1972 and 1974 is determined to be from the right that is a backward direction to the left.

According to an embodiment, it may be set for an upper encoding order flag and a lower encoding order flag to have a same value. For example, when the upper encoding order flag 1902 is determined to be 1, the lower encoding order flag 1904 corresponding to the upper encoding order flag 1902 may be determined to be 1. Because values of the upper encoding order flag and the lower encoding order flag are determined to be 1 bit, information amount of encoding order information is decreased.

According to an embodiment, an upper encoding order flag and a lower encoding order flag of a current coding unit may be determined by referring to at least one of an upper encoding order flag and a lower encoding order flag applied to a coding unit having a depth lower than the current coding unit. For example, the upper encoding order flag 1926 and the lower encoding order flag 1928 applied to the coding units 1980, 1982, 1984, and 1986 may be determined based on the lower encoding order flag 1916 applied to the coding units 1972 and 1974. Therefore, the upper encoding order flag 1926 and the lower encoding order flag 1928 may be determined to have a same value as the lower encoding order flag 1916. Because values of the upper encoding order flag and the lower encoding order flag are determined from an upper coding unit of the current coding unit, encoding order information is not obtained from a bitstream. Therefore, information amount of the encoding order information is decreased.

With respect to encoding order determination by the encoding order determiner 1620, how an encoding order of at least three blocks arranged in a vertical or horizontal direction is changed according to an encoding order flag will now be described with reference to FIGS. 20A and 20B.

Figure 20A:
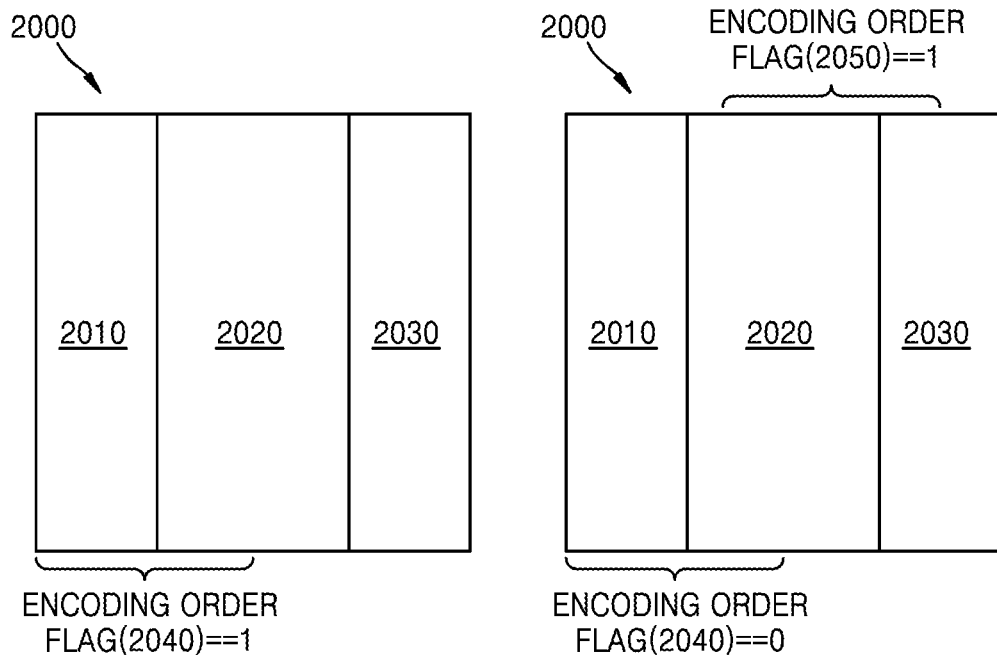
FIGS. 20A and 20B illustrate how an encoding order of at least three blocks arranged in a vertical or horizontal direction is changed according to an encoding order flag.

An embodiment of FIG. 20A is about a method of swapping encoding orders, based on an encoding order flag, only when the encoding orders of spatially-adjacent coding units are adjacent to each other.

A coding unit 2000 is split into three coding units 2010, 2020, and 2030. When a default encoding order is from the left to the right, encoding is performed in order of the coding unit 2010, the coding unit 2020, and the coding unit 2030. However, an encoding order may be changed according to encoding order flags 2040 and 2050.

The encoding order flag 2040 indicates an encoding order of the coding unit 2010 and the coding unit 2020. When the encoding order flag 2040 indicates 0, the encoding order of the coding unit 2010 and the coding unit 2020 is determined to be a forward direction. Therefore, the coding unit 2010 is encoded prior to the coding unit 2020. However, when the encoding order flag 2040 indicates 1, the encoding order of the coding unit 2010 and the coding unit 2020 is determined to be a backward direction, and thus the coding unit 2020 is encoded prior to the coding unit 2010.

The encoding order flag 2050 indicates an encoding order of the coding unit 2020 and the coding unit 2030. When the encoding order flag 2040 indicates a forward direction, the encoding order flag 2050 is obtained. When the encoding order flag 2040 indicates a backward direction, encoding orders of the coding unit 2020 and the coding unit 2030 are not adjacent to each other, and thus the encoding order flag 2050 is not obtained. When the encoding order flag 2050 indicates 0, an encoding order of the coding unit 2020 and the coding unit 2030 is determined to be a forward direction. Therefore, the coding unit 2020 is encoded prior to the coding unit 2030. However, when the encoding order flag 2050 indicates 1, an encoding order of the coding unit 2020 and the coding unit 2030 is determined to be a backward direction, and thus the coding unit 2030 is encoded prior to the coding unit 2020.

According to an embodiment of FIG. 20A, an encoding order of three coding units has three cases. Therefore, to determine the encoding order, one or two encoding order flags are used.

Figure 20B:
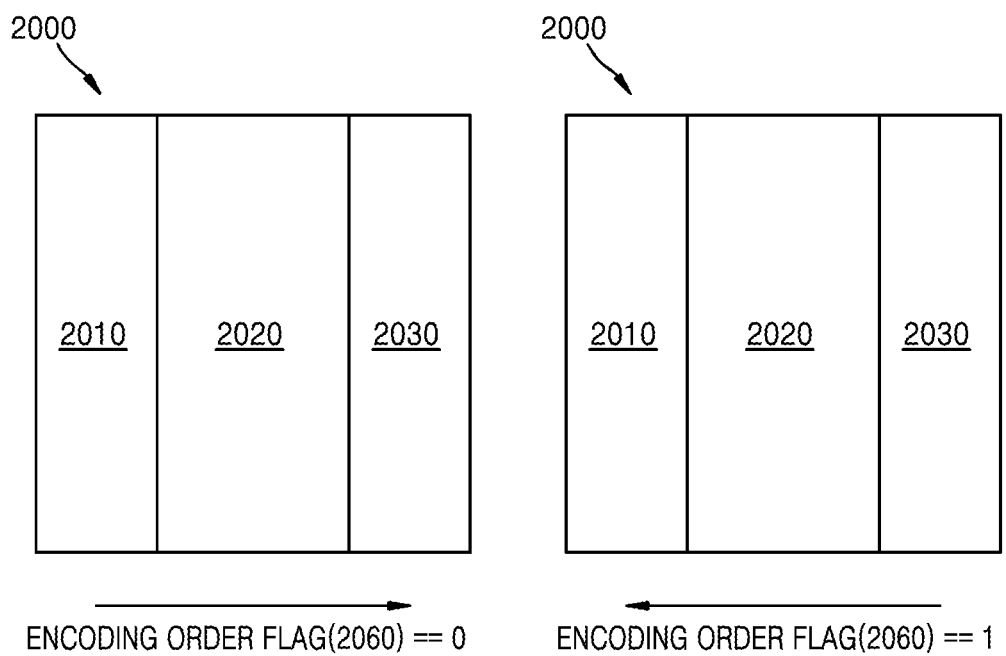

An embodiment of FIG. 20B is about a method of determining an encoding order, based on an encoding order flag 2060 indicating a direction of the encoding order to be applied to three coding units.

The encoding order flag 2060 indicates whether an encoding order is a forward direction or a backward direction. For example, when the encoding order flag 2060 indicates 0, an encoding order of the coding units 2010, 2020, and 2030 may be determined to be the forward direction. Therefore, when the encoding order flag 2060 indicates 0, encoding may be performed in order of the coding unit 2010, the coding unit 2020, and the coding unit 2030.

On the other hand, when the encoding order flag 2060 indicates 1, the encoding order of the coding units 2010, 2020, and 2030 may be determined to be the backward direction. Therefore, when the encoding order flag 2060 indicates 1, encoding may be performed in order of the coding unit 2030, the coding unit 2020, and the coding unit 2010.

Referring to the embodiment of FIG. 20B, the encoding order of three coding units has two cases. Therefore, to determine the encoding order, one encoding order flag is used.

The methods of determining an encoding order which are used in the embodiments of FIGS. 20A and 20B may be applied to at least four coding units.

The encoding order determiner 1620 may check encoding order change allowance information with respect to an upper data unit of a current block. The encoding order change allowance information indicates whether a change in an encoding order is allowable for blocks included in the upper data unit of the current block. When the encoding order change allowance information indicates that the change in the encoding order is not allowable, all blocks of the upper data unit are decoded according to a default encoding order. Alternatively, all blocks of the upper data unit may be decoded according to an encoding order of a data unit including the upper data unit. When the encoding order change allowance information indicates that encoding order information with respect to the current block has been encoded, the encoding order determiner 1620 may obtain the encoding order information.

The encoding order change allowance information may be included in a video parameter set, a sequence parameter set, a picture parameter set, a slice segment header, a header of a largest coding unit, or the like. When at least two types of the encoding order information are present, two pieces of encoding order change allowance information about at least two types of the encoding order information may be separately stored in different headers.

The encoding order change allowance information may indicate a depth at which encoding order information is provided, or a block size. For example, only when a depth of the current block is included in the depth indicated by the encoding order change allowance information, the encoding order determiner 1620 may obtain the encoding order information. As another example, only when the depth of the current block corresponds to the block size indicated by the encoding order change allowance information, the encoding order determiner 1620 may obtain the encoding order information.

When split information does not indicate that the current block is to be split, the prediction method determiner 1630 may determine a prediction method with respect to the current block according to encoding information of the current block and whether neighboring blocks of the current block have been decoded.

The encoding information of the current block may indicate how the current block is to be predicted. In detail, the encoding information may indicate a prediction method from among a plurality of intra prediction modes and inter prediction modes. The intra prediction modes that are applicable to the current block may include a directional mode, a DC mode, a planar mode, a multi-parameter intra (MPI) prediction mode, a linear-model (LM) chroma mode, a most probable chroma (MPC) mode, or the like. The inter prediction modes that are applicable to the current block may include a merge mode, an advanced motion vector prediction (AMVP) mode, an inter skip mode, an overlapped block motion compensation (OBMC) mode, a sub-block motion vector prediction (MVP) mode, an affine motion compensation (MC) mode, a frame rate up conversion (FRUC) mode, or the like. Therefore, the prediction method determiner 1630 may determine a prediction mode to be applied to the current block, based on the encoding information of the current block.

Whether the neighboring blocks of the current block have been decoded, a reference block and a reference sample to be referred to in predicting the current block may be determined. Referring to the raster scan described with reference to FIGS. 17A to 17C, only left, upper, upper left, upper right, and lower left blocks in the current block may have been decoded prior to the current block. However, when an encoding tree block including the current block has been decoded by the encoding order determiner 1620 according to an encoding order different from the raster scan, a right block and a lower right block of the current block may have been decoded prior to the current block. Therefore, the prediction method determiner 1630 may determine the reference block and the reference sample to be referred to in predicting the current block, according to whether the left, upper, upper left, upper right, lower left, right, and lower right blocks of the current block have been decoded.

When the current block is intra predicted, the prediction method determiner 1630 may determine reference samples to be referred to for the current block, according to whether the neighboring blocks of the current block have been decoded. In an intra prediction mode, prediction values of samples of the current block are determined by referring to sample values of samples adjacent to the current block. Therefore, only an adjacent block from among adjacent blocks of the current block may be used in predicting the current block, wherein the adjacent block has been decoded prior to the current block and may be referred to for the current block.

For example, when blocks are encoded according to a forward direction of the raster scan described with reference to FIGS. 17A to 17C, reference samples of the upper block, the left block, the upper left block, the lower left block, and the upper right block of the current block may be used in predicting the current sample. On the contrary, when the blocks are encoded according to a backward direction to the raster scan, reference samples of the upper block, the right block, the upper right block, the lower right block, and the upper left block of the current block may be used in predicting the current sample.

A method of using reference samples according to a direction of an encoding order, the method being related to the prediction method determiner 1630, will now be described in detail with reference to FIGS. 21 to 25B.

Figure 21:
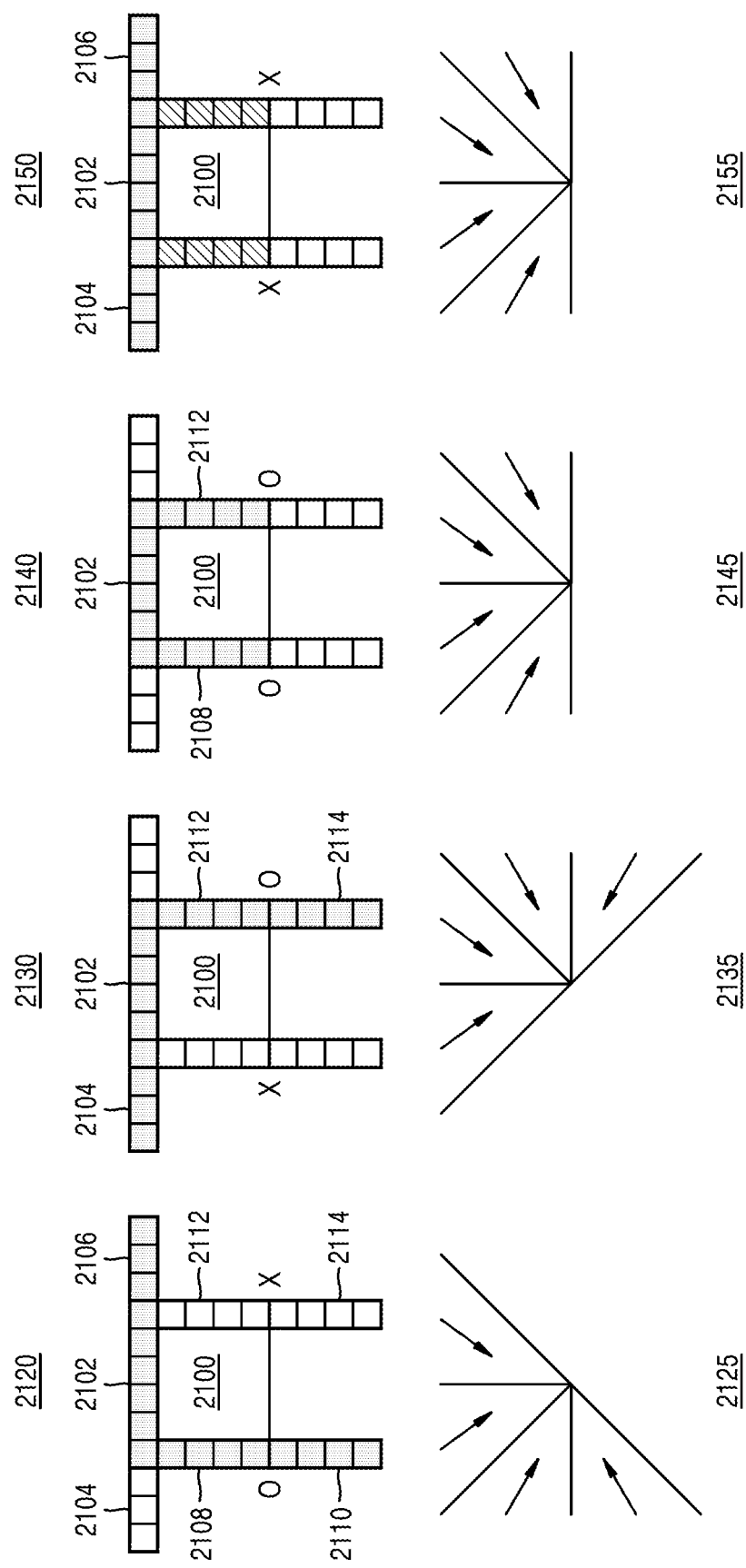
FIG. 21 illustrates a method of determining a reference sample required in a directional intra prediction mode.

FIG. 21 illustrates a method of determining a reference sample required in a directional intra prediction mode.

A first embodiment 2120 illustrates reference samples 2102, 2106, 2108, and 2110 used in intra prediction when blocks in an upper row and a left block are reconstructed. In the first embodiment 2120, the reference samples 2102 and 2106 of the reconstructed upper blocks and the reference samples 2108 of the reconstructed left block may be used in the intra prediction. The reference samples 2110 of a lower left block may be used only when the lower left block is reconstructed. To use the reference samples 2102, 2106, 2108, and 2110, prediction directions included in a first intra prediction direction group 2125 may be used in intra predicting a current block 2100.

A second embodiment 2130 illustrates reference samples 2102, 2104, 2112, and 2114 used in intra prediction when blocks in an upper row and a right block are reconstructed. In the second embodiment 2130, the reference samples 2102 and 2104 of the reconstructed upper blocks and the reference samples 2112 of the reconstructed right block may be used in the intra prediction. The reference samples 2114 of a lower right block may be used only when the lower right block is reconstructed. To use the reference samples 2102, 2104, 2112, and 2114, prediction directions included in a second intra prediction direction group 2135 may be used in intra predicting the current block 2100.

A third embodiment 2140 illustrates reference samples 2102, 2108, and 2112 used in intra prediction when an upper block, a right block, and a left block are reconstructed. In the third embodiment 2140, the reference samples 2102 of the upper block, the reference samples 2108 of the left block, and the reference samples 2112 of the right block may be used in the intra prediction. Prediction directions included in a third intra prediction direction group 2145 may be used in intra predicting the current block 2100.

According to the first embodiment 2120 and the second embodiment 2130, when the reference samples 2110 of the lower left block and the reference samples 2114 of the lower right block cannot be used, prediction accuracy may deteriorate. However, in the third embodiment 2140, the used reference samples 2102, 2108, and 2112 are all adjacent to the current block 2100, and thus, prediction accuracy may be relatively high, compared to other embodiments.

A fourth embodiment 2150 illustrates reference samples 2102, 2104, and 2106 used in intra prediction when only blocks in an upper row are reconstructed. In the fourth embodiment 2150, only the reference samples 2102, 2104, and 2106 of the reconstructed upper blocks may be used in the intra prediction. Prediction directions included in a fourth intra prediction direction group 2155 may be used in intra predicting the current block 2100.

Unlike the third embodiment 2140, in the fourth embodiment 2150, the reference sample 2102 of the upper block is the only sample that is adjacent to the current block 2100. Because the reference samples 2104 and 2106 are spatially distant from the current block 2100, prediction accuracy may deteriorate, compared to the first, second, and third embodiments 2120, 2130, and 2140. Therefore, the intra prediction used in the fourth embodiment 2150 may be a vertical mode or a directional prediction mode in a direction adjacent to the vertical mode which uses the reference sample 2102 of the upper block that is adjacent to the current block 2100.

In a Z encoding order, the inter prediction method according to the first embodiment 2120 is used, but, when encoding orders of two blocks that are adjacent in a left-right direction have been swapped, the right block may be first predicted according to the intra prediction method according to the fourth embodiment 2150. Then, after the right block is reconstructed, the left block may be predicted according to the intra prediction method according to the third embodiment 2140 and thus may be reconstructed.

Figure 22A:
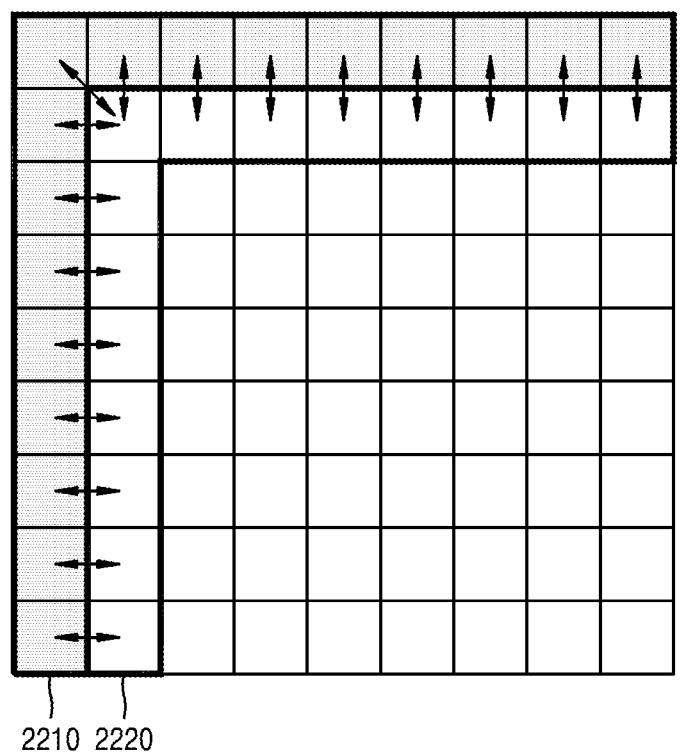
FIGS. 22A and 22B illustrate a prediction method in a discrete cosine (DC) mode according to whether a right block has been decoded.
Figure 22B:
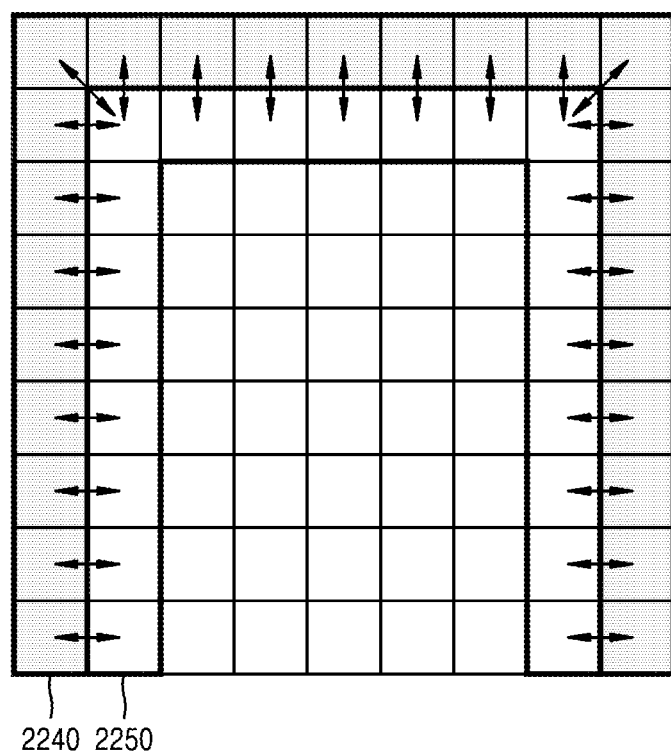

FIGS. 22A and 22B illustrate a prediction method in a DC mode according to whether a right block has been decoded.

FIG. 22A indicates a range of reference samples when an encoding order of a current block is fixed to a default encoding order according to a raster scan. FIG. 22B indicates a range of reference samples when an encoding order of the current block is not fixed to the default encoding order.

Referring to FIG. 22A, decoded samples from among samples 2210 that are adjacent to left, upper, and upper left sides of a current block 2200 may be used as a reference sample. However, in FIG. 22B, a right block of a current block 2230 may have been decoded prior to the current block 2230, and thus decoded samples from among samples 2240 that are adjacent to left, upper, upper left, upper right, and right sides of the current block 2230 may be used as a reference sample.

In a DC mode, all samples of a current block have a same prediction sample, and thus a discontinuity may occur between a sample value of a reference sample and a prediction value of a sample of the current block. Therefore, in the DC mode, a prediction value of a sample located at a boundary of the current block is filtered according to an adjacent reference sample, and thus continuity in the prediction value of the sample of the current block may be achieved. Therefore, prediction accuracy in the DC mode may be increased.

Referring to FIG. 22A, only left, upper, and upper left samples of the current block 2200 may be determined as the reference sample, and thus prediction values of samples 2220 located at left and top boundaries of the current block 2200 are targets for prediction value filtering. However, referring to FIG. 22B, right and upper right samples of the current block 2230 may be determined as the reference sample, and thus prediction values of samples 2250 located at left, top, and right boundaries of the current block 2230 may be targets for prediction value filtering.

Figure 23B:
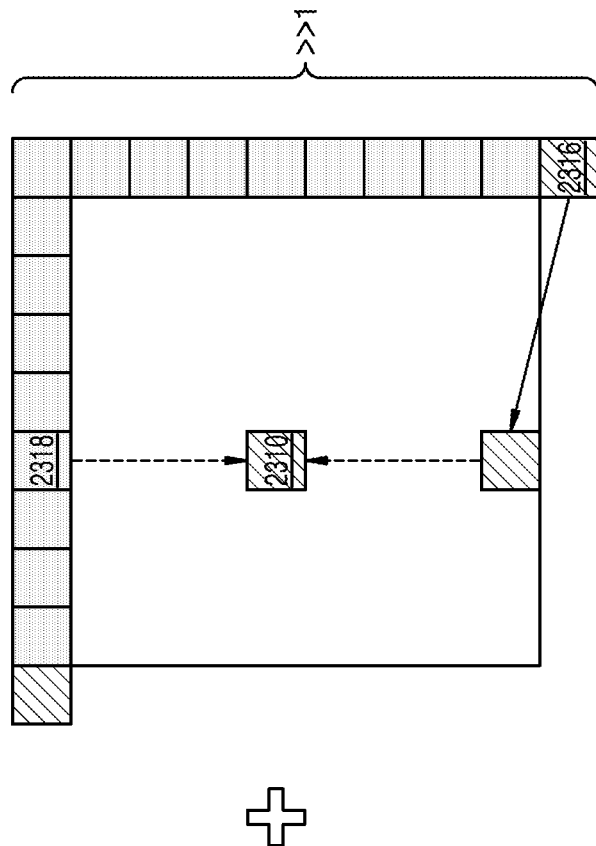
Figure 23B:
Figure 23B:
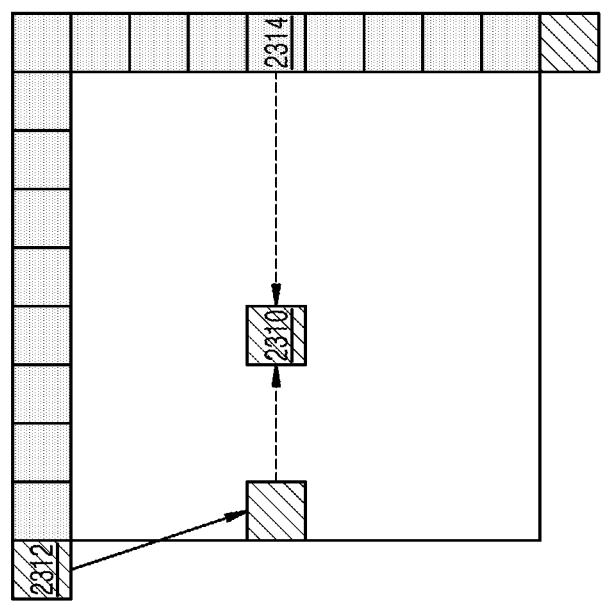
Figure 23C:
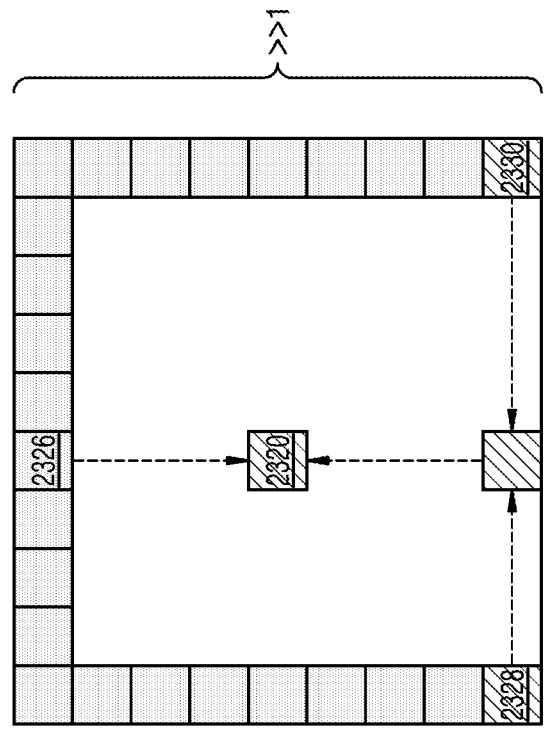

FIGS. 23A to 23C illustrate a prediction method in a planar mode according to whether a right block has been decoded. FIG. 23A indicates a method of determining a prediction value of a current sample in the planar mode when an encoding order of a current block is fixed to a default encoding order according to a raster scan. FIGS. 23B and 23C indicate a method of determining a prediction value of the current sample in the planar mode when an encoding order of the current block is not fixed to the default encoding order.

Referring to FIG. 23A, double interpolation values of four reference samples 2302, 2304, 2306, and 2308 with respect to a current sample 2300 are determined as a prediction value of the current sample 2300. A horizontal interpolation value is determined by performing linear interpolation on a first corner sample 2302 and a first side sample 2304, based on a horizontal location of the current sample 2300. A vertical interpolation value is determined by performing linear interpolation on a second corner sample 2306 and a second side sample 2308, based on a vertical location of the current sample 2300. An average value of the horizontal interpolation value and the vertical interpolation value is determined as the prediction value of the current sample 2300.

With reference to FIG. 23B, a prediction method with respect to a current sample in a planar mode, when a left block of a current block has not been decoded and a right block of the current block has been decoded, will now be described.

Referring to FIG. 23B, four reference samples 2312, 2314, 2316, and 2318 that are symmetrical to FIG. 23A are determined. A prediction method in a planar mode of FIG. 23B is different from that of FIG. 23A in locations of reference samples, but a method of determining a prediction value of a current sample is similar to that of FIG. 23A.

In detail, a horizontal interpolation value is determined by performing linear interpolation on a first corner sample 2312 and a first side sample 2314, based on a horizontal location of a current sample 2310. A vertical interpolation value is determined by performing linear interpolation on a second corner sample 2316 and a second side sample 2318, based on a vertical location of the current sample 2310. Then, an average value of the horizontal interpolation value and the vertical interpolation value is determined as the prediction value of the current sample 2310.

With reference to FIG. 23C, a prediction method with respect to a current sample in a planar mode, when a left block and a right block of the current block have been all decoded, will now be described.

Referring to FIG. 23C, because reference samples are present in the top, left, and right sides of the current block, prediction accuracy in the planar mode may be increased. However, because the bottom outside the current block has not been decoded, a first corner sample 2328 and a second corner sample 2330 are linear interpolated according to a horizontal location of a current sample 2320 and thus a bottom medium value for calculation of a vertical interpolation value is determined.

A horizontal interpolation value is determined by interpolating a first side sample 2322 and a second side sample 2324, based on a horizontal distance of the current sample 2320. Also, a vertical interpolation value is determined by interpolating a third side sample 2326 and the bottom medium value, based on a vertical location of the current sample 2320. Then, an average value of the horizontal interpolation value and the vertical interpolation value is determined as the prediction value of the current sample 2310.

Also, as seen in FIG. 23C, when both a left block and a right block of a current block have been decoded, one of the prediction method in a planar mode of FIG. 23A and the prediction method in a planar mode of FIG. 23B may be selected, and the current block may be predicted according to the selected prediction method in a planar mode. Alternatively, when both the left block and the right block of the current block have been decoded, a prediction value according to the planar mode may be determined by averaging a prediction value obtained according to a method of FIG. 24A and a prediction value obtained according to a method of FIG. 24B.

Alternatively, when both the left block and the right block of the current block have been decoded, a current sample located in a particular line of the current block may be predicted by interpolating the side samples 2304 and 2314 located in the left and right, according to a location of a current sample.

FIGS. 24A to 24D illustrate a method of predicting a current block according to a multi-parameter intra (MPI) mode. The MPI mode is a method of predicting a current sample by using samples that are from among neighboring samples of the current sample and are decoded or predicted in a particular direction. In particular, the current sample is determined as a weighted average value of sample values of neighboring samples, and a weight used in the weighted average value may be predicted from a neighboring block or may be obtained from a bitstream. Sample values of neighboring blocks which are used in predicting the current block may be prediction values or reconstruction values of the neighboring blocks.

Figure 24A:
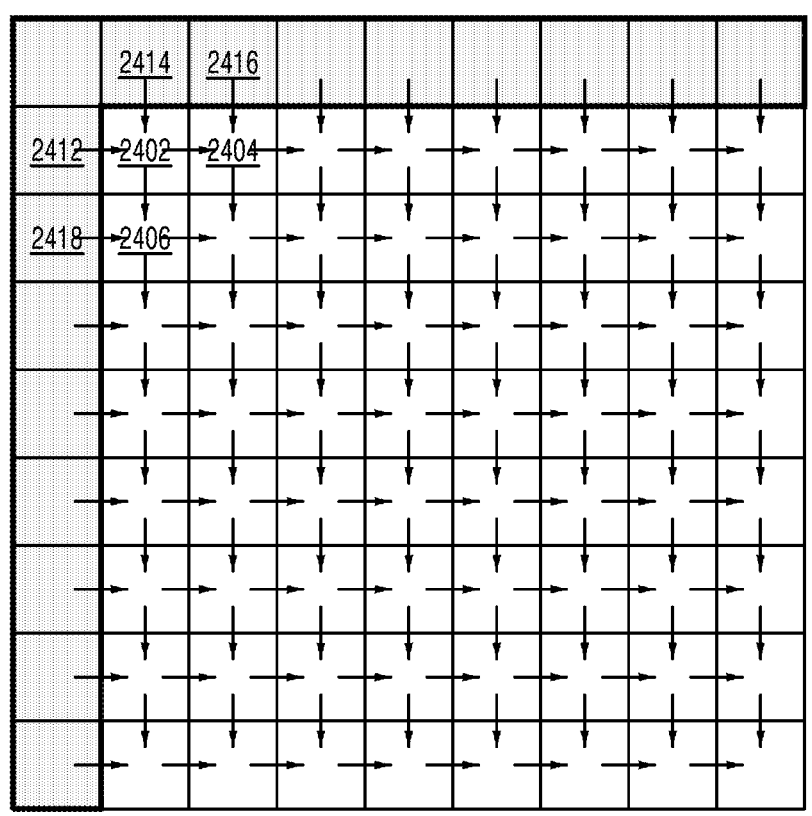
FIGS. 24A to 24D illustrate a method of predicting a current block according to a multi-parameter intra (MPI) mode.
Figure 24B:
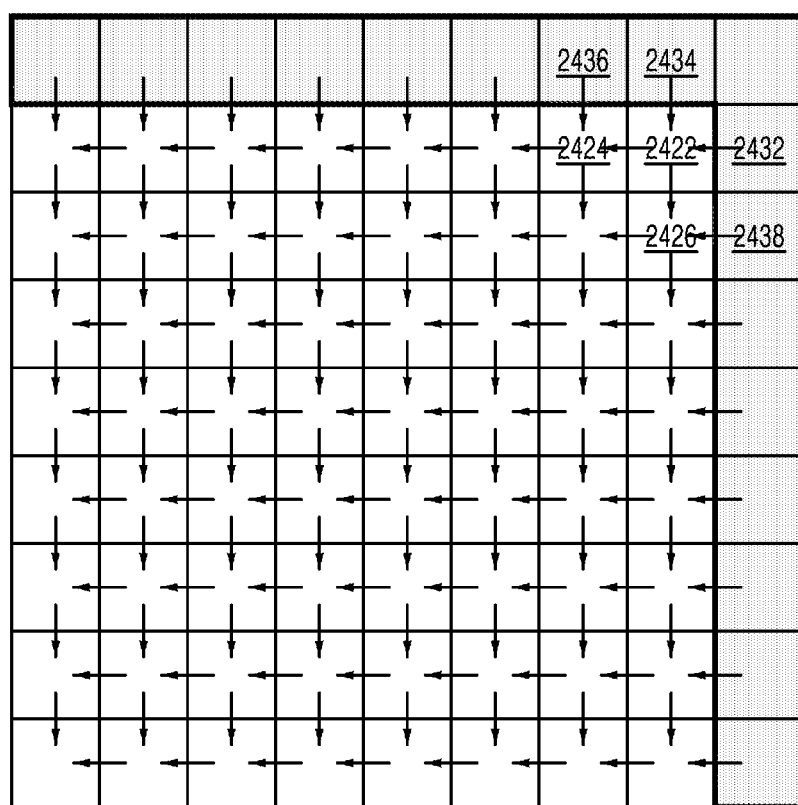
Figure 24C:
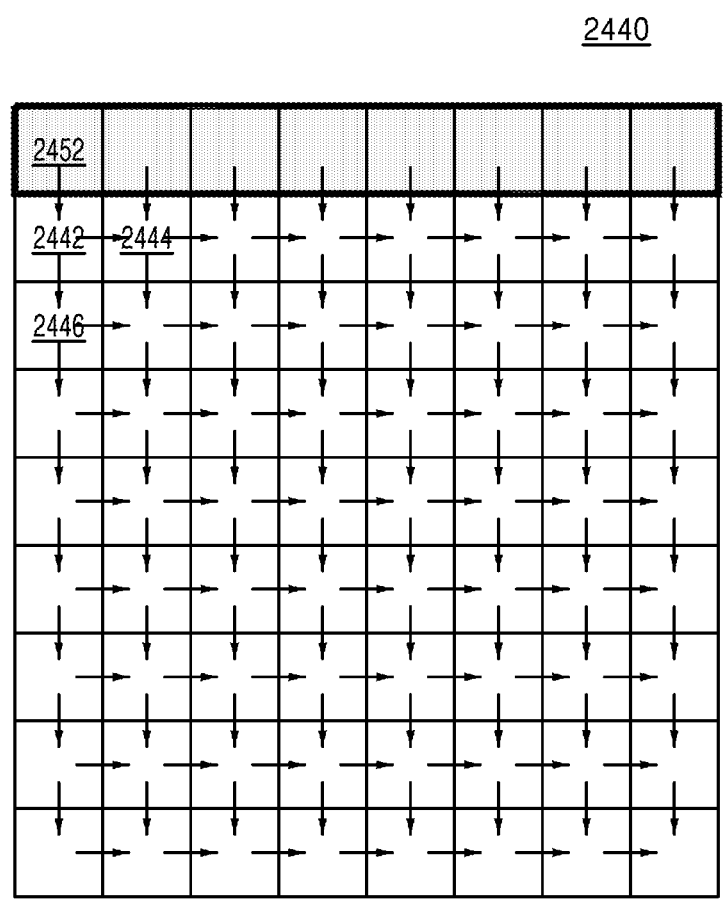
Figure 24D:
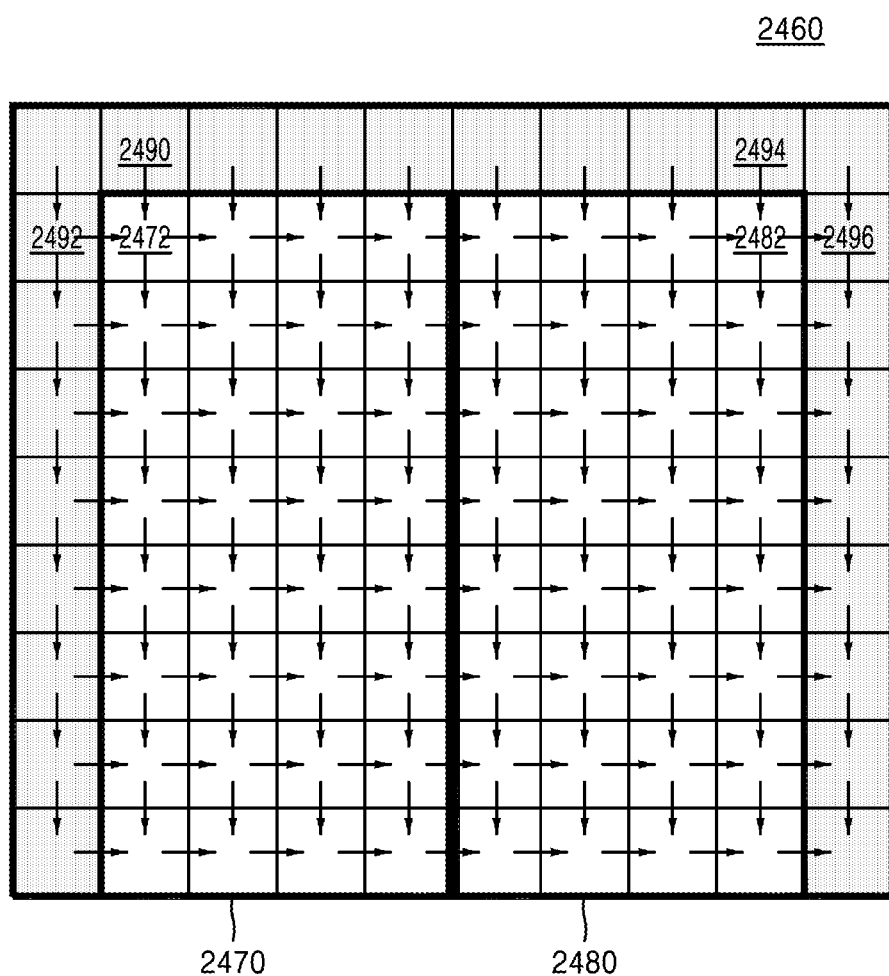

FIG. 24A illustrates a method of predicting a current block according to the MPI mode when an encoding order of the current block is fixed to a default encoding order according to a raster scan. FIGS. 24B to 24D illustrate a method of predicting a current block according to the MPI mode when an encoding order of the current block is not fixed to the default encoding order.

Referring to FIG. 24A, a prediction value of a current sample included in a current block 2400 is determined as an average value or a weighted average value which is obtained by averaging or weight-averaging a sample value of a left sample of the current sample and a sample value of an upper sample of the current sample. Referring to FIG. 24A, because reference samples are located in the left and top of the current block 2400, an upper left sample of the current block 2400 is first predicted.

For example, a prediction value of a sample 2402 of the current block 2400 is determined as a weighted average value of sample values of a reference sample 2412 and a reference sample 2414. The prediction value or a reconstruction value of the sample 2402 is used in predicting a sample 2404 in the right of the sample 2402 and a sample 2406 below the sample 2402. Therefore, a prediction value of the sample 2404 is determined as a weighted average value of sample values of the sample 2402 and a reference sample 2416, and a prediction value of the sample 2406 is determined as a weighted average value of sample values of the sample 2402 and a reference sample 2418. In this regard, a weight used in determining the weighted average value may be determined according to a location of the current sample. Also, other samples of the current block 2400 are predicted based on the weight.

Referring to FIG. 24B, opposite to FIG. 24A, an upper block and a right block of a current block 2420 have been first decoded, and a left block of the current block 2420 is not decoded. Therefore, referring to FIG. 24B, a prediction value of a current sample included in the current block 2420 is determined as an average value or a weighted average value which is obtained by averaging or weight-averaging a sample value of a right sample in the current sample and a sample value in an upper sample of the current sample. Referring to FIG. 24B, because reference samples are located in the right and top of the current block 2420, an upper right sample in the current block 2420 is first predicted.

For example, a prediction value of a sample 2422 of the current block 2420 is determined as a weighted average value of sample values of a reference sample 2432 and a reference sample 2434. The prediction value or a reconstruction value of the sample 2422 is used in predicting a sample 2424 in the left of the sample 2422 and a sample 2426 below the sample 2422. Therefore, a prediction value of the sample 2424 is determined as a weighted average value of sample values of the sample 2422 and a reference sample 2436, and a prediction value of the sample 2426 is determined as a weighted average value of sample values of the sample 2422 and a reference sample 2438. In this regard, a weight used in determining the weighted average value may be determined according to a location of the current sample. Also, other samples of the current block 2420 are predicted in a same manner.

Referring to FIG. 24C, only an upper block of a current block 2440 has been first decoded, and a right block and a left block of the current block 2440 have not been decoded. Therefore, referring to FIG. 24C, only reference samples in the top of a current block are used to predict samples of the current block. In a case of FIG. 24C, equally to FIG. 24A, the current block may be predicted in a lower right direction from an upper left sample of the current block. Also, equally to FIG. 24B, the current block may be predicted in a lower right direction from an upper right sample of the current block. Therefore, when only an upper block of the current block has been first decoded, a prediction order and a prediction method with respect to samples may be determined based on neighboring blocks of the current block or may be obtained from a bitstream.

FIG. 24C illustrates a case in which the current block 2440 is predicted in a lower right direction from an upper left sample in the current block 2440. Referring to FIG. 24C, a method of predicting the current block 2440 is similar to that of FIG. 24A. However, unlike to FIG. 24A, samples adjacent to a left boundary of the current block 2440 do not have reference samples in the left, and thus, the samples are predicted based on only a sample value of an upper sample.

For example, a prediction value of a sample 2442 of the current block 2440 is determined as a sample value of a reference sample 2452. The prediction value or a reconstruction value of the sample 2442 is used in predicting a sample 2444 in the right of the sample 2442 and a sample 2446 below the sample 2442. A prediction value of the sample 2446 located at a left boundary of the current block 2440 is determined based on the prediction value or the reconstruction value of the sample 2442, and samples below the sample 2446 are predicted in a same manner. Samples located in other portions of the current block 2440 are predicted in a same manner as in FIG. 24A.

Referring to FIG. 24D, an upper block, a right block, and a left block of a current block 2460 have been all decoded. Therefore, referring to FIG. 24D, reference samples in the top, right, and left of the current block 2460 may be all used to predict samples of the current block 2460. Accordingly, referring to FIG. 24D, the current block 2460 may be predicted by using various schemes according to the reference samples in the top, right, and left of the current block 2460.

According to an embodiment provided in FIG. 24D, the current block 2460 is divided into a left sub-block 2470 and a right sub-block 2480. The left sub-block 2470 is predicted in a lower right direction from an upper left sample, and the right sub-block 2480 is predicted in a lower left direction from an upper right sample as in FIG. 24B. In detail, a sample 2472 located at a top left corner of the left sub-block 2470 is determined as an average value or a weighted average value of a top reference sample 2490 and a left reference sample 2492. Other samples of the left sub-block 2470 are each determined as an average value or a weighted average value of sample values of left and upper samples. A sample 2482 located at a top right corner of the right sub-block 2480 is determined as an average value or a weighted average value of a top reference sample 2494 and a right reference sample 2496. Other samples of the right sub-block 2480 are each determined as an average value or a weighted average value of sample values of right and upper samples.

Figure 25A:
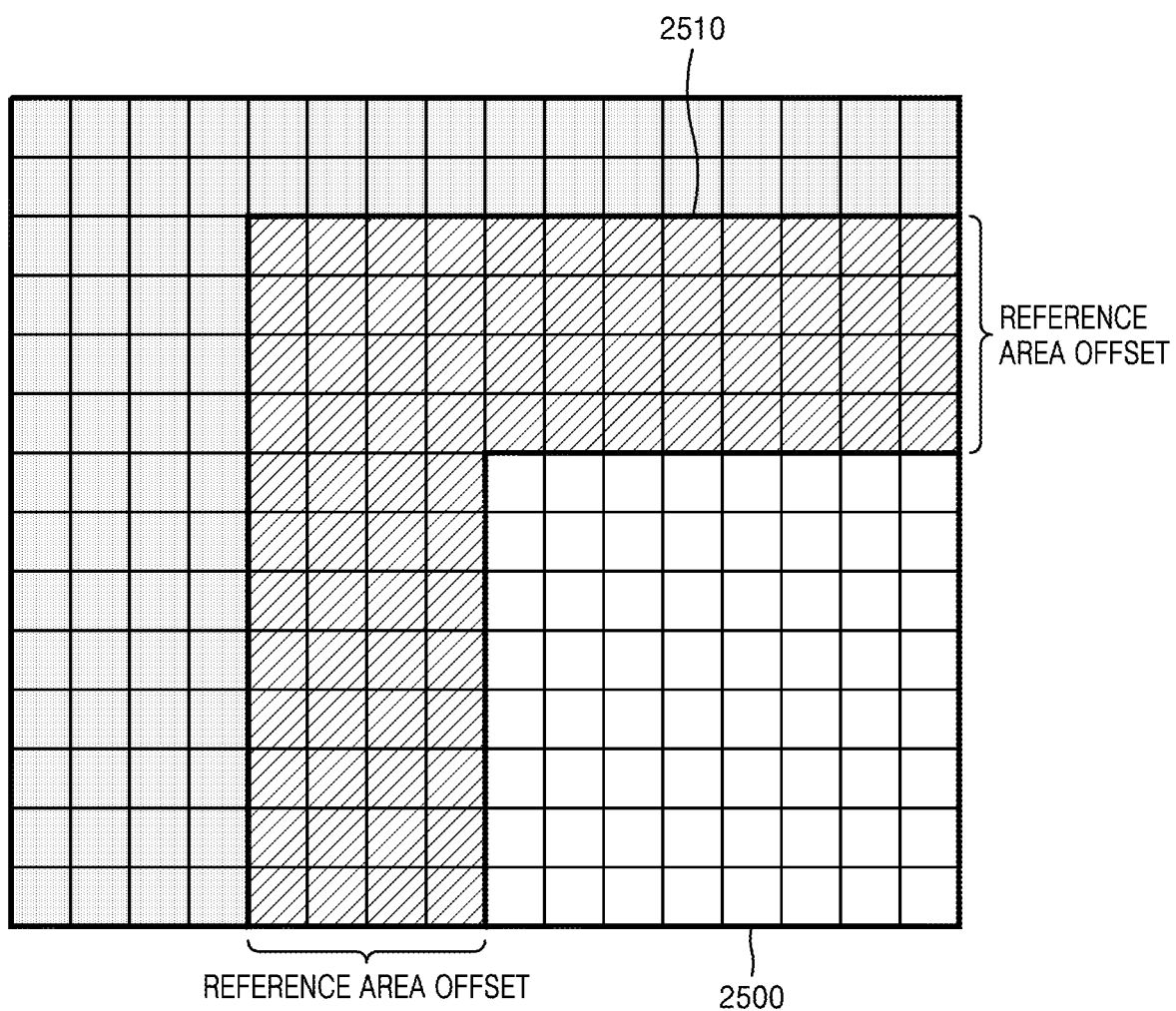
FIGS. 25A and 25B illustrate reference areas that are referred to in a linear-model (LM) chroma mode and a most probable chroma (MPC) mode.
Figure 25B:
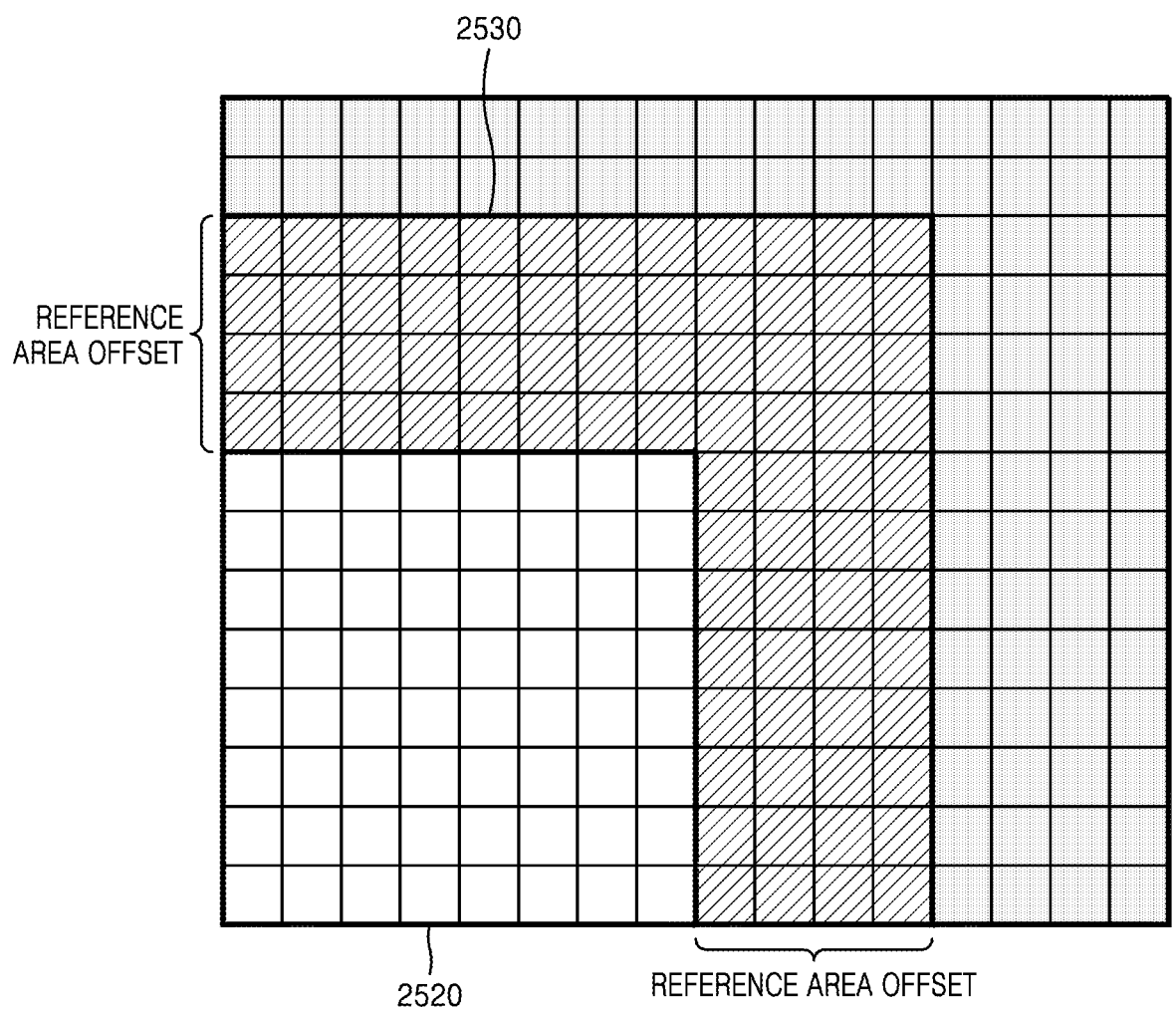

With reference to FIGS. 25A and 25B, reference areas that are referred to in an LM chroma mode and an MPC mode will now be described. The LM chroma mode and the MPC mode are prediction modes for predicting a chroma block from a collocated luma block. In the LM chroma mode and the MPC mode, a reference area in which a luma sample and a chroma sample have been all decoded is determined, a correlation between the luma sample and the chroma sample is obtained from the reference area, and the chroma block is predicted based on a sample value of the luma block corresponding to the chroma block and the correlation between the luma sample and the chroma sample.

However, in the LM chroma mode, a luma-chroma linear model is derived from a correlation between a sample value of the luma sample and a sample value of the chroma sample which are obtained from the reference area, and then the chroma block is predicted from the collocated luma block, according to the luma-chroma linear model. In the MPC mode, a most probable chroma (MPC) value with respect to each luma sample value is determined from the correlation between the sample value of the luma sample and the sample value of the chroma sample which are obtained from the reference area, and then the chroma block is predicted from the collocated luma block, according to a result of analyzing the MPC value.

FIG. 25A illustrates a reference area of the LM chroma mode and the MPC mode when an encoding order of a current block is fixed to a default encoding order according to a raster scan. FIG. 25B illustrates a reference area of the LM chroma mode and the MPC mode when an encoding order of the current block is not fixed to the default encoding order.

Referring to FIG. 25A, left, upper, and upper left blocks of a current block 2500 have been decoded. Therefore, a reference area 2510 is set in the current block 2500 in left, upper, and upper left directions.

Referring to FIG. 25B, opposite to FIG. 25A, right, upper, and upper right blocks of a current block 2520 have been decoded. Therefore, a reference area 2530 is set in the current block 2520 in right, upper, and upper right directions.

Unlike to FIGS. 25A and 25B, when all of left, upper, right, upper left, and upper right blocks of a current block have been decoded, a reference area may be set in the current block in left, upper, right, upper left, and upper right directions.

Widths of the reference areas 2510 and 2530 of FIGS. 25A and 25B are determined according to a reference area offset. The reference area offset may be determined based on sizes of the current blocks 2500 and 2520, or may be determined based on encoding information obtained from a bitstream.

Other than the intra prediction mode described with reference to FIGS. 21 to 25B, when a right block has been decoded, the prediction method determiner 1630 may predict a current block by using a right reference sample instead of a left block or with the left block.

When the current block is inter predicted, the prediction method determiner 1630 may determine a reference block to be referred to for the current block, according to whether a neighboring block of the current block has been decoded. In the inter prediction mode, the prediction method determiner 1630 obtains a motion vector from a block that is spatially or temporally adjacent to the current block, and predicts the current block according to the obtained motion vector.

A reference picture including a temporally-adjacent block is decoded prior to a current picture. Therefore, regardless of an encoding order of blocks, temporally-adjacent blocks may be determined in a same manner. However, some of spatially-adjacent blocks may have not been decoded according to the encoding order of blocks. Therefore, a spatially-adjacent block to be referred to for the current block may vary according to a decoding order.

In detail, when the blocks are encoded according to a forward direction of the raster scan described with reference to FIGS. 17A to 17C, motion vectors of an upper block, a left block, an upper left block, a lower left block, and an upper right block of the current block may be used in predicting a current sample. On the contrary, when the blocks are encoded in an opposite direction to the raster scan, reference samples of the upper block, a right block, an upper right block, a lower right block, and the upper left block of the current block may be used in predicting the current sample.

When the left and right blocks of the current block have been all decoded, the upper block, the left block, the right block, the upper left block, the lower left block, the lower right block, and the upper right block may be all used. On the contrary, when the left and right blocks of the current block have not been decoded, only the upper block, the upper left block, and the upper right block may be used.

Figure 26:
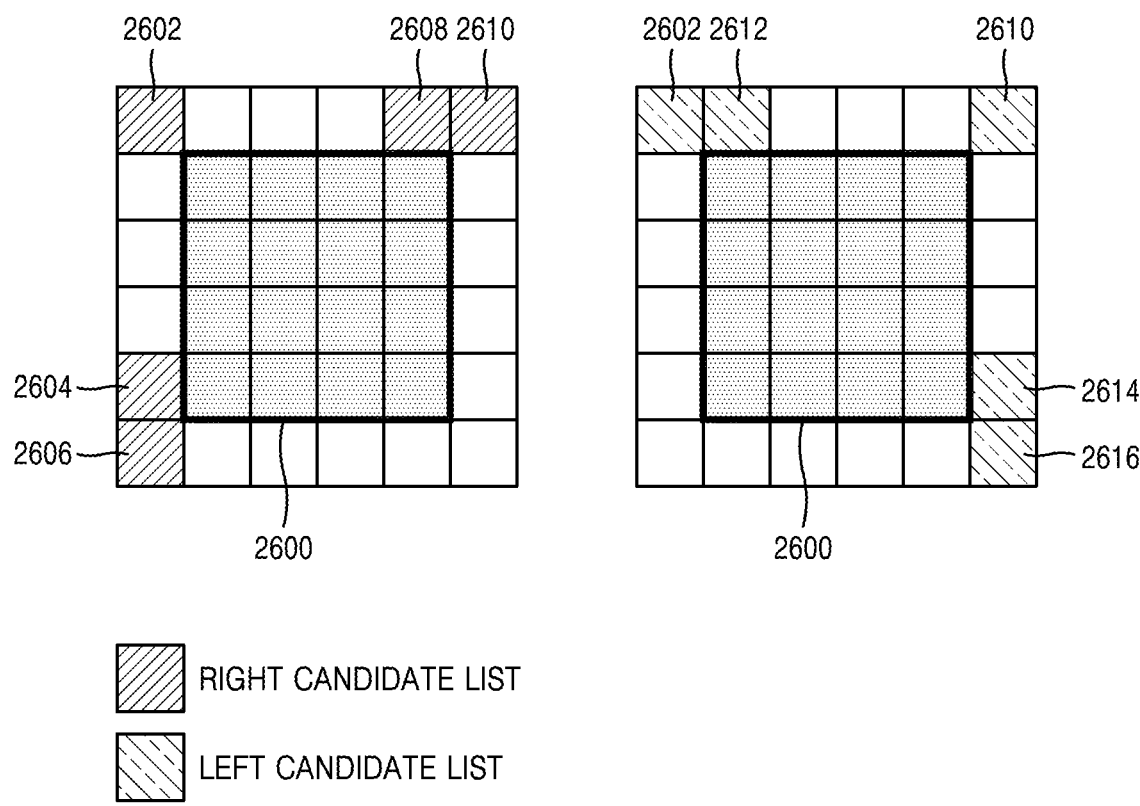
FIG. 26 illustrates a block that is spatially adjacent to a current block according to an encoding order of the current block in a merge mode and an advanced motion vector prediction (AMVP) mode.

With reference to FIG. 26, a block that is spatially adjacent to a current block according to an encoding order of the current block in a merge mode and an AMVP mode will now be described.

The merge mode is an inter prediction mode in which a reference block of a current block is determined from a merge candidate list consisting of neighboring blocks of the current block, and the current block is predicted based on a motion vector extracted from the reference block and a reference picture index. The merge candidate list may be determined according to different schemes according to whether the motion vector is extractable from a right block.

When the motion vector is not extractable from the right block, the prediction method determiner 1630 may extract motion vectors, in order of a left block including a reference sample 2604, a lower left block including a reference sample 2606, an upper block including a reference sample 2608, an upper right block including a reference sample 2610, and an upper left block including a reference sample 2602. Then, the prediction method determiner 1630 may sequentially include the extracted motion vectors in the merge candidate list.

When the motion vector is extractable from the right block, the prediction method determiner 1630 may extract motion vectors, in order of a right block including a reference sample 2614, a lower right block including a reference sample 2616, an upper block including a reference sample 2612, an upper left block including a reference sample 2602, a left block including a reference sample 2604, and an upper right block including a reference sample 2610. Then, the prediction method determiner 1630 may sequentially include the extracted motion vectors in the merge candidate list.

When at most 5 merge candidates can be included in the merge candidate list, only inter-predicted blocks from among the 6 blocks may be sequentially included in the merge candidate list. Therefore, in a case where only the right block is decoded and inter-predicted whereas the left block is not, only the left block is excluded from the merge candidate list, and the right block, the lower right block, the upper block, the upper left block, and the upper right block may be included therein.

In the AMVP mode, a motion vector predictor is obtained from the reference block, and a difference motion vector and a reference picture index are separately obtained from a bitstream. Then, the current block is predicted based on the motion vector and the reference picture index that are obtained from the motion vector predictor and the difference motion vector. Similar to the merge mode, in the AMVP mode, an AMVP candidate list including a motion vector obtained from a neighboring block of the current block is obtained. Also, the AMVP candidate list may be determined according to different schemes according to whether the motion vector is extractable from the right block.

When the motion vector is not obtainable from the right block, the prediction method determiner 1630 may determine a first motion vector predictor candidate from the left block including the reference sample 2604 and the lower left block including the reference sample 2606. Then, the prediction method determiner 1630 may determine a second motion vector predictor candidate from the upper block including the reference sample 2608, the upper right block including the reference sample 2610, and the upper left block including the reference sample 2602. Then, the prediction method determiner 1630 may determine the motion vector predictor from the AMVP candidate list including the first motion vector predictor candidate and the second motion vector predictor candidate.

When the motion vector is obtainable from the right block, the prediction method determiner 1630 may determine the first motion vector predictor candidate from the right block including the reference sample 2614 and the lower right block including the reference sample 2616. Then, the prediction method determiner 1630 may determine the second motion vector predictor candidate from the upper block including the reference sample 2608, the upper right block including the reference sample 2610, and the upper left block including the reference sample 2602. Then, the prediction method determiner 1630 may determine a third motion vector predictor candidate from the left block including the reference sample 2604 and the lower left block including the reference sample 2606. When the motion vector is not extractable from the left block and the lower left block, a motion vector obtained by scaling the second motion vector predictor candidate may be determined as the third motion vector predictor candidate. Then, the prediction method determiner 1630 may determine the motion vector predictor from the AMVP candidate list including the first motion vector predictor candidate, the second motion vector predictor candidate, and the third motion vector predictor candidate.

The merge mode list of the merge mode may include a motion vector candidate obtained from a temporally adjacent block. Equally, the AMVP candidate list of the AMVP mode may include the motion vector candidate predicted from the temporally adjacent block.

In inter prediction, left neighboring blocks are not limited to particular locations such as the left block, the upper left block, the lower left block, or the like, right neighboring blocks are not limited to particular locations such as the right block, the lower right block, the upper right block, or the like, and upper neighboring blocks are not limited to particular locations such as the up side, the upper left side, the upper right side, or the like. Also, in a skip mode, the merge mode, and the AMVP mode, a candidate list may be differently consisted and the number of allowable candidate lists may vary according to whether the left block and the right block have been decoded.

Figure 27:
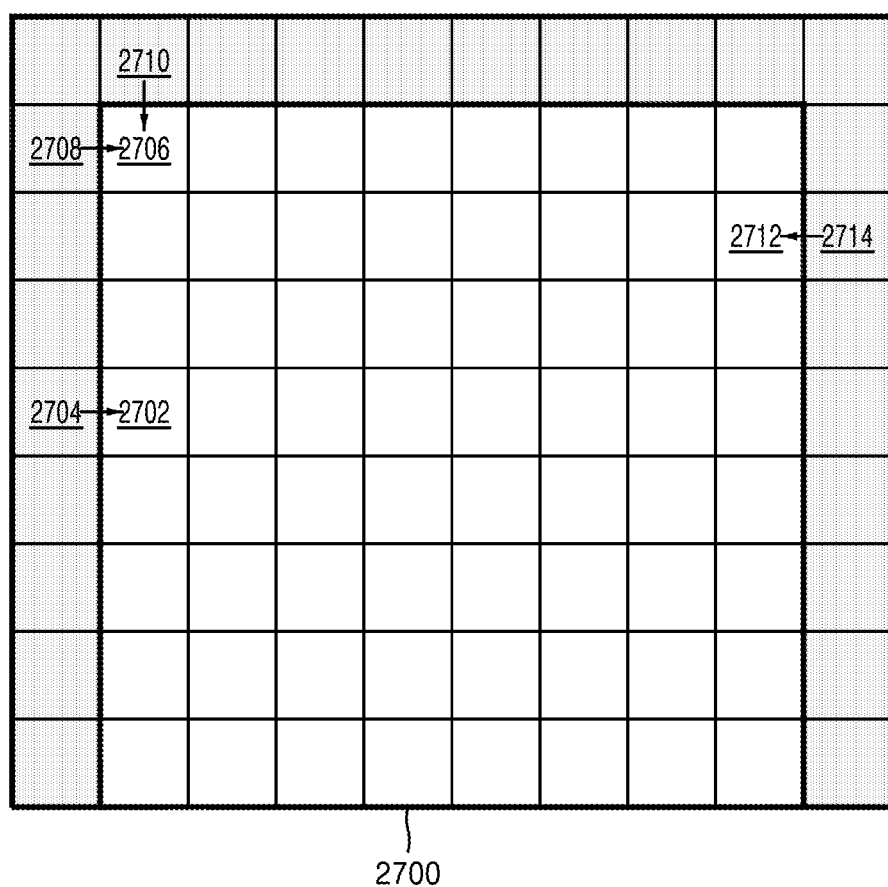
FIG. 27 illustrates a prediction method using a right block of a current block in an overlapped block motion compensation (OBMC) mode.

With reference to FIG. 27, a prediction method using a right block of a current block in an OBMC mode will now be described. In the OBMC mode, with respect to samples at a boundary of the current block, a plurality of prediction values are obtained by using a motion vector of the current block and a motion vector of a block adjacent to the current block. Then, a final prediction value of a current sample is obtained by weight-averaging the plurality of prediction values. In weight-averaging, a weight to a current motion vector is generally greater than a weight to an adjacent motion vector.

For example, with respect to a sample 2702 located at a left boundary of a current block 2700, a current motion vector of the current block 2700 is obtained, and an adjacent motion vector is obtained from a left block of the current block 2700, the left block including a left sample 2704 of the sample 2702. Then, a final prediction value of the sample 2702 is determined by weight-averaging a prediction value obtained from the current motion vector, and a prediction value obtained from the adjacent motion vector.

For a sample 2706 that is adjacent to both a left boundary and a top boundary of the current block 2700, a current motion vector of the current block 2700 is obtained, a first adjacent motion vector is obtained from a left block of the current block 2700, the left block including a left sample 2708 of the sample 2706, and a second adjacent motion vector is obtained from an upper block of the current block 2700, the upper block including an upper sample 2710 of the sample 2706. Then, a final prediction value of the sample 2706 is determined by weight-averaging a prediction value obtained from the current motion vector, a prediction value obtained from the first adjacent motion vector, and a prediction value obtained from the second adjacent motion vector.

When a current block is decoded according to an encoding order according to a raster scan, a right block is not decoded and thus the prediction method according to the OBMC mode is not applied to a sample 2712. However, when a right block of the current block 2700 has been decoded, the prediction method according to the OBMC mode may be applied to samples located at a right boundary of the current block 2700.

For example, when the right block of the current block 2700 has been decoded, a current motion vector of the current block 2700 is obtained with respect to the sample 2712 located at the right boundary of the current block 2700, and an adjacent motion vector is obtained from the right block of the current block 2700, the right block including a right sample 2714 of the sample 2712. Then, a final prediction value of the sample 2712 is determined by weight-averaging a prediction value obtained from the current motion vector and a prediction value obtained from the adjacent motion vector.

Figure 28A:
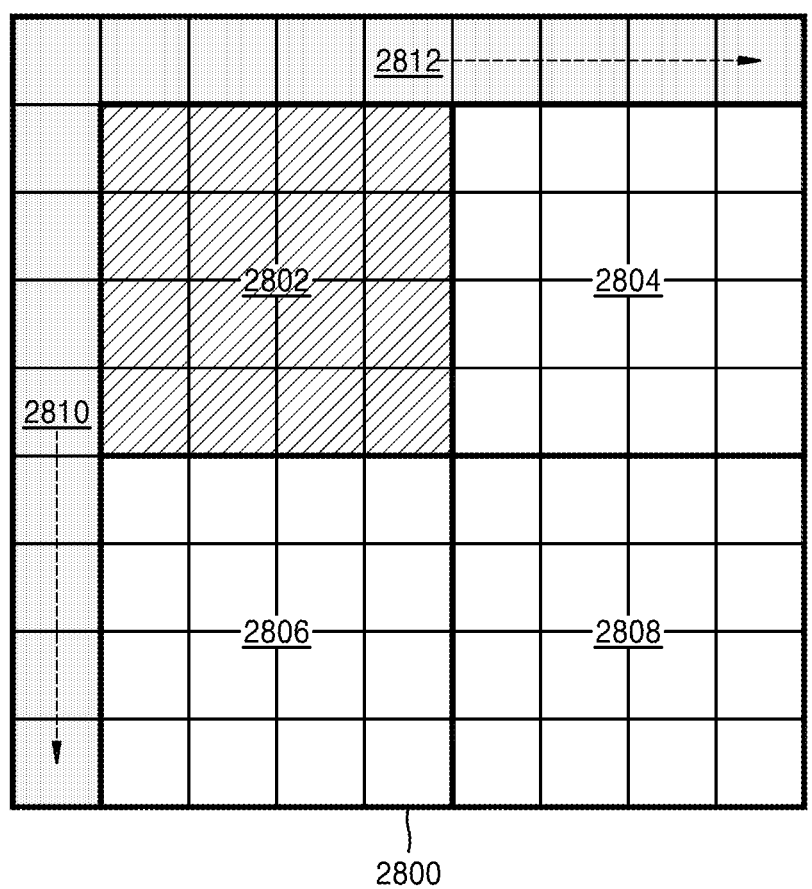
FIGS. 28A to 28C illustrate a prediction method using a right block of a current block in a sub-block motion vector prediction (MVP) mode.
Figure 28B:
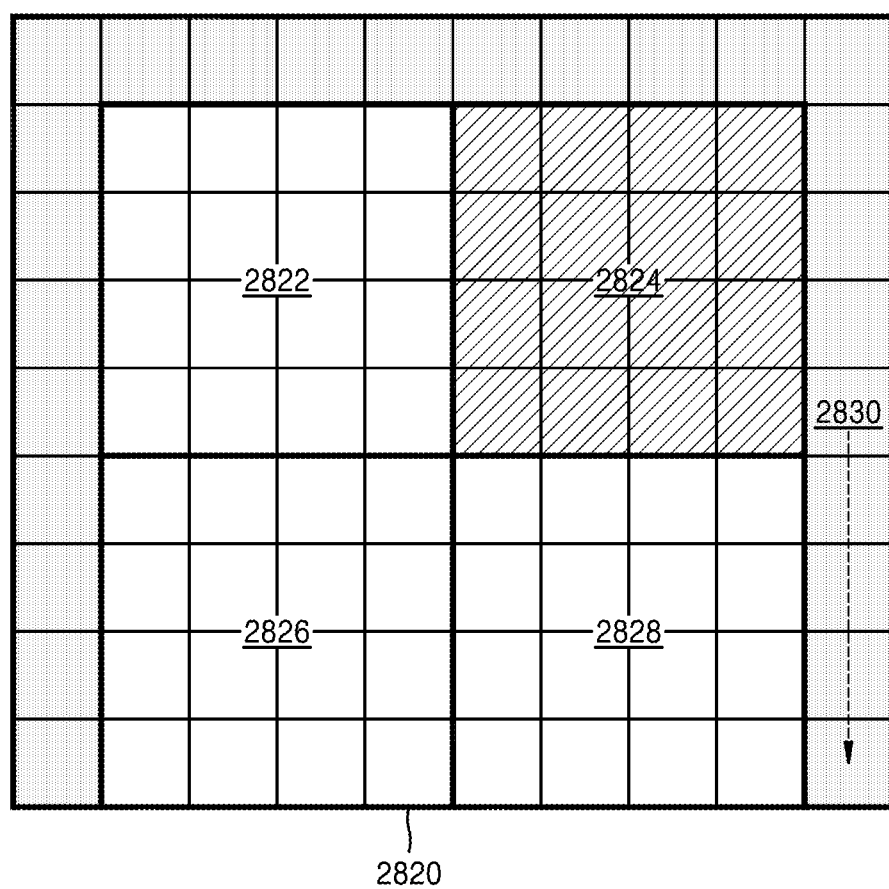
Figure 28C:
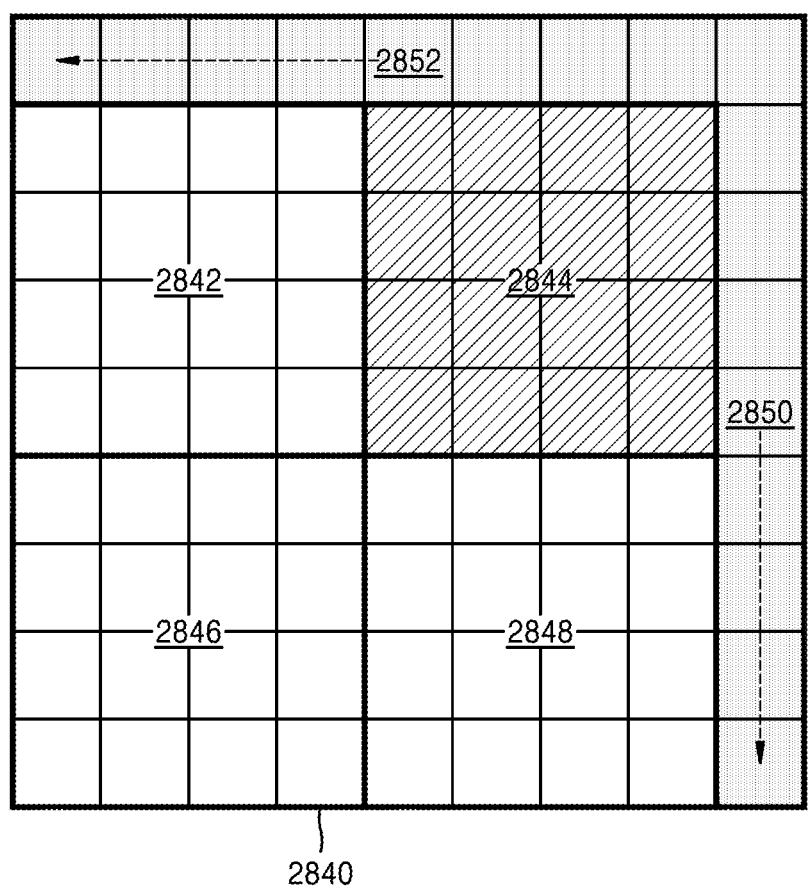

With reference to FIGS. 28A to 28C, a prediction method using a right block of a current block in a sub-block MVP mode will now be described. The sub-block MVP mode is an inter prediction mode in which a block is split into sub-blocks, and a motion vector predictor is determined for each of the sub-blocks.

With reference to FIG. 28A, a method of predicting a current block according to the sub-block MVP mode, when the right block has not been decoded nor inter-predicted, will now be described. Referring to FIG. 28A, a right block of a current block 2800 has not been decoded nor inter-predicted and thus cannot be used in inter predicting the current block 2800. The current block 2800 includes four sub-blocks 2802, 2804, 2806, and 2808. For each of the sub-blocks 2802, 2804, 2806, and 2808, two spatial motion vector candidates are obtained from a block including a left sample and a block including an upper sample of a sub-block. Also, a temporal motion vector is obtained from a block of a reference picture, the block including a collocated sample of the sub-block. Then, a motion vector of the sub-block is determined by averaging the two spatial motion vector candidates and the temporal motion vector.

For example, with respect to a sub-block 2802, a first spatial motion vector may be obtained from a block including a left sample 2810 of the sub-block 2802. When the block including the left sample 2810 has not been encoded nor inter-predicted, the first spatial motion vector may be obtained by referring to a block including samples located below the left sample 2810.

A second spatial motion vector may be obtained from a block including an upper sample 2812 of the sub-block 2802. When the block including the upper sample 2812 has not been encoded nor inter-predicted, the second spatial motion vector may be obtained by referring to a block including samples located in the right of the upper sample 2812.

A temporal motion vector may be obtained by referring to a collocated block of the sub-block 2802 from the reference picture referred to for a current picture. Alternatively, temporal motion vectors of the sub-blocks 2802, 2804, 2806, and 2808 may be determined by referring to a collocated block of the sub-block 2802.

Finally, a motion vector of the sub-block 2802 is obtained by averaging the first spatial motion vector, the second spatial motion vector, and the temporal motion vector. For other sub-blocks 2804, 2806, and 2808, motion vectors are determined by using the same method.

With reference to FIG. 28B, a method of predicting a current block according to a sub-block MVP mode, when both a left block and a right block of a current block have been decoded according to an inter prediction mode, will now be described. Referring to FIG. 28B, a motion vector determining method according to FIG. 28A may be applied to sub-blocks 2822 and 2826 in the left of a current block 2820. However, with respect to sub-blocks 2824 and 2828 in the right of the current block 2820, a third spatial motion vector may be additionally obtained from a block including a right sample of a sub-block so as to obtain a motion vector of the sub-block.

For example, a third spatial motion vector may be obtained from a block including a right sample 2830 of the sub-block 2824. When the block including the right sample 2830 has not been encoded nor inter predicted, the third spatial motion vector may be obtained by referring to a block including samples located below the right sample 2830. Then, a first spatial motion vector, a second spatial motion vector, and a temporal motion vector of the sub-block 2824 may be obtained in a manner described with reference to FIG. 28A.

Finally, a motion vector of the sub-block 2824 may be obtained by averaging the first spatial motion vector, the second spatial motion vector, the third spatial motion vector, and the temporal motion vector of the sub-block 2824. A motion vector of the sub-block 2828 may be determined by using the same method.

With reference to FIG. 28C, a method of predicting a current block according to a sub-block MVP mode, when a left block has not been decoded nor inter predicted, will now be described. Referring to FIG. 28C, a left block of a current block 2840 has not been decoded nor inter predicted and thus cannot be used in inter predicting the current block 2840. The current block 2840 includes four sub-blocks 2842, 2844, 2846, and 2848. For each of the sub-blocks 2842, 2844, 2846, and 2848, two spatial motion vector candidates are obtained from a block including a right sample and a block including an upper sample of a sub-block. Also, a temporal motion vector is obtained from a block of a reference picture, the block including a collocated sample of the sub-block. Then, a motion vector of the sub-block is determined by averaging the two spatial motion vector candidates and the temporal motion vector.

For example, for the sub-block 2844, a first spatial motion vector may be obtained from a block including a right sample 2850 of the sub-block 2844. When the block including the right sample 2850 has not been encoded nor inter-predicted, the first spatial motion vector may be obtained by referring to a block including samples located below the right sample 2850.

A second spatial motion vector may be obtained from a block including an upper sample 2852 of the sub-block 2844. When the block including the upper sample 2852 has not been encoded nor inter-predicted, the second spatial motion vector may be obtained by referring to a block including samples located to the left of the upper sample 2852.

A temporal motion vector may be obtained by referring to a collocated block of the sub-block 2844 from the reference picture referred to for a current picture. Alternatively, temporal motion vectors of the sub-blocks 2842, 2844, 2846, and 2848 may be determined by referring to a collocated block of the sub-block 2848.

Finally, a motion vector of the sub-block 2844 may be obtained by averaging the first spatial motion vector, the second spatial motion vector, and the temporal motion vector. Motion vectors of other sub-blocks 2842, 2846, and 2848 are determined by using the same method.

Figure 29A:
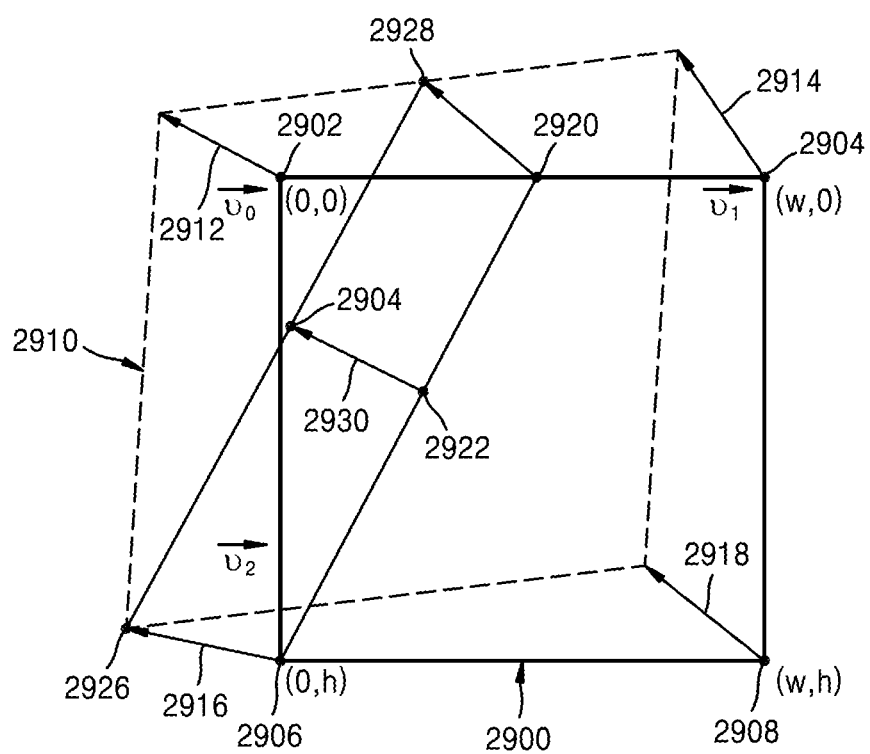
FIGS. 29A and 29B illustrate a prediction method using a right block of a current block in an affine motion compensation (MC) mode.
Figure 29B:
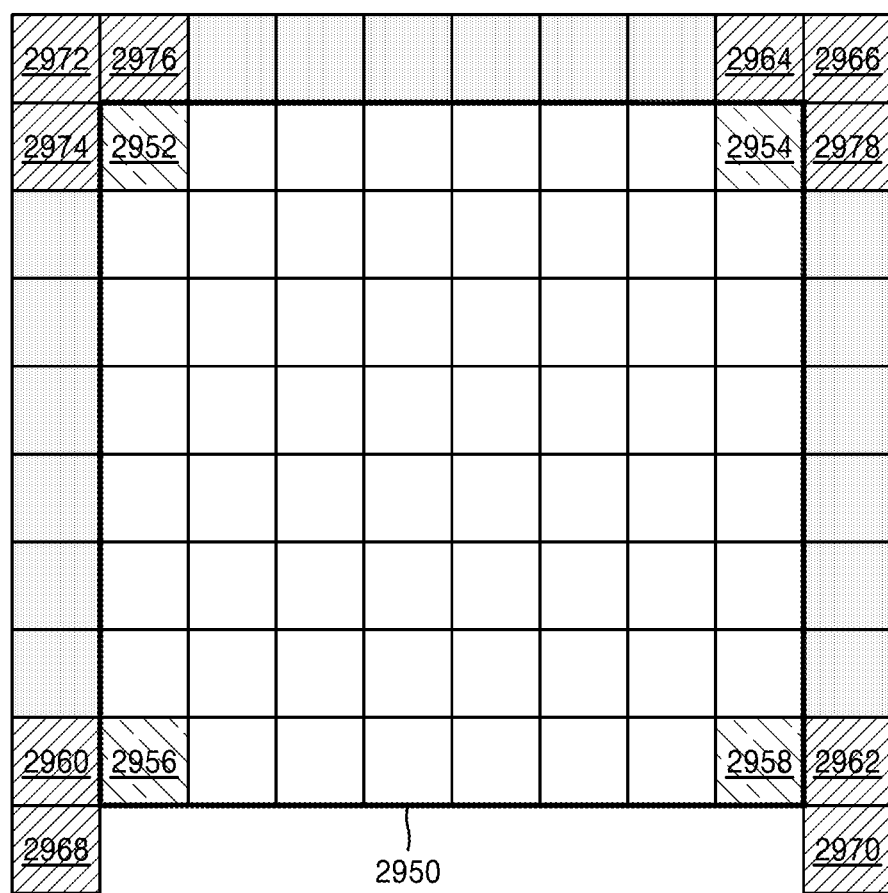

With reference to FIGS. 29A and 29B, a prediction method using a right block of a current block in an affine MC prediction mode will now be described. In an image, magnification or reduction of an object, rotation, a perspective, and other irregular operations occur. To exactly predict motion of the object, the affine MC prediction mode using affine transformation may be used.

The affine transformation indicates transformation on two affine spaces that preserve collinear points. Here, an affine space is a geometric structure obtained by generalizing a Euclidean space, and in the affine space, attributes with respect to measurement of distances and angles are not maintained, but only collinearity between points, collaterality of lines, and length ratios between points on a same line are maintained. That is, according to affine transformation, lines and collaterality of the lines are preserved, and directions and angles of the lines, distances between the lines, and areas are not preserved. Therefore, when the object is magnified and reduced, or is rotated, an area including the object in the image may be exactly predicted according to the affine MC prediction mode.

With reference to FIG. 29A, the affine transformation will now be briefly described. Four vertexes 2902, 2904, 2906, and 2908 of a block 2900 respectively correspond to motion vectors 2912, 2914, 2916, and 2918. The block 2900 is affine transformed based on the motion vectors 2912, 2914, 2916, and 2918, and thus an affine transformation block 2910 is generated. Samples located in the block 2900 may match samples of the affine transformation block 2910.

For example, a sample 2904 that is obtained by affine transforming a sample 2922 located at a line connecting the vertex 2906 and a sample 2920 located at the top of the block 2900 is located at a line connecting a sample 2926 of the affine transformation block 2910 and a sample 2928 of the affine transformation block 2910, the sample 2926 being indicated by the motion vector 2916 of the vertex 2906 and the sample 2928 being indicated by the motion vector 2930 of the sample 2920. a location of the affine transformed sample 2924 may be determined based on the motion vector 2930 obtained by linear interpolating the motion vectors 2912, 2914, 2916, and 2918 according to a location of the sample 2922. Equally, other samples in the block 2900 may be affine transformed and then may be matched with samples of the affine transformation block 2910. As described with reference to FIG. 29A, all samples in a block may be inter predicted by using a motion vector generated for affine transformation.

With reference to FIG. 29B, blocks that are referred to in an affine MC prediction mode will now be described.

The affine MC prediction mode includes an affine merge mode and an affine AMVP mode. In the affine merge mode, blocks that are from among neighboring blocks of a current block and are predicted according to the affine MC prediction mode are determined as candidate blocks. Then, information for affine MC is obtained from a block selected from the candidate blocks. In the affine AMVP mode, at least two motion vector predictors that are used in affine transformation are determined from the neighboring blocks of the current block. Then, the current block is predicted by using the motion vector predictor, and a difference motion vector and reference picture information that are included in a bitstream. In detail, prediction methods according to the affine merge mode and the affine AMVP mode will now be described.

When the affine merge mode is applied to a current block 2950, candidate blocks are determined from neighboring blocks predicted according to the affine MC prediction mode of the current block 2950. When a change in encoding orders of blocks is not allowed, it is checked whether each of neighboring blocks has been predicted according to the affine MC prediction mode, in order of a neighboring block including a left block 2960 of the current block 2950, a neighboring block including an upper sample 2964, a neighboring block including an upper right sample 2966, a neighboring block including a lower left sample 2968, and a neighboring block including an upper left sample 2972. Then, the neighboring blocks predicted according to the affine MC prediction mode are included in an affine merge list according to the order.

When a change in encoding orders of blocks is allowed, it is checked whether each of neighboring blocks has been predicted according to the affine MC prediction mode, in order of the neighboring block including the left block 2960 of the current block 2950, a neighboring block including a right block 2962, the neighboring block including the upper sample 2964, the neighboring block including the upper right sample 2966, the neighboring block including the lower left sample 2968, a neighboring block including a lower right sample 2970, and the neighboring block including the upper left sample 2972. Equally, the neighboring blocks predicted according to the affine MC prediction mode are included in an affine merge list according to the order. Therefore, the right block and the lower right block of the current block 2950 may be included in the affine merge list.

Motion vectors and reference picture information for affine transformation of the current block 2950 are obtained from a block that is from among the candidate blocks of the affine merge list and is indicated by an affine merge flag obtained from a bitstream. Then, the current block 2950 is predicted based on the motion vectors and the reference picture information.

When the affine AMVP mode is applied to the current block 2950, at least two motion vector predictors are determined from neighboring blocks of the current block 2950. According to an embodiment, three motion vector predictors may be determined. For example, a first motion vector predictor is obtained from a neighboring block located adjacent to an upper left vertex 2952 of the current block 2950. The first motion vector predictor may be obtained from a neighboring block including a sample 2972 located in the upper left of the upper left vertex 2952, a neighboring block including a sample 2974 located in the left, and a neighboring block including a sample 2976 located above.

A second motion vector predictor is obtained from a neighboring block located adjacent to an upper right vertex 2954 of the current block 2950. The second motion vector predictor may be obtained from a neighboring block including a sample 2964 located above the upper right vertex 2954, and a neighboring block including a sample 2966 located in the upper right. When a change in encoding orders of blocks is allowed, the second motion vector predictor may be obtained from a neighboring block including a sample 2978 located in the right of the upper right vertex 2954.

A third motion vector predictor is obtained from a neighboring block located adjacent to a lower left vertex 2956 of the current block 2950. The third motion vector predictor may be obtained from a neighboring block including a sample 2960 located in the left of the lower left vertex 2956, and a neighboring block including a sample 2968 located in the lower left. When a change in encoding orders of blocks is allowed, and a left block of the current block 2950 has not been encoded whereas a right block has been first encoded, the third motion vector predictor is obtained from a neighboring block located adjacent to a lower right vertex 2958 of the current block 2950. Therefore, the third motion vector predictor may be obtained from a neighboring block including a sample 2962 located in the right of the lower right vertex 2958, and a neighboring block including a sample 2970 located in the lower right.

Alternatively, when the right block has been first encoded, the third motion vector predictor may be changed, based on a motion vector prediction value of the lower left vertex 2956 which is derived by using the first motion vector predictor, the second motion vector predictor, and the third motion vector predictor which are obtained from the upper left vertex 2952, the upper right vertex 2954, and the lower left vertex 2956. Then, the changed third motion vector predictor may be used in predicting a current block.

After the three motion vector predictors are obtained, three motion vectors used in affine transformation are determined based on the reference picture information obtained from the bitstream and three difference motion vectors. Then, the current block 2950 is predicted according to the three motion vectors.

As described above, a plurality of pieces of information necessary for the affine MC prediction mode may be obtained from a neighboring block located in the right of a current block.

Figure 30A:
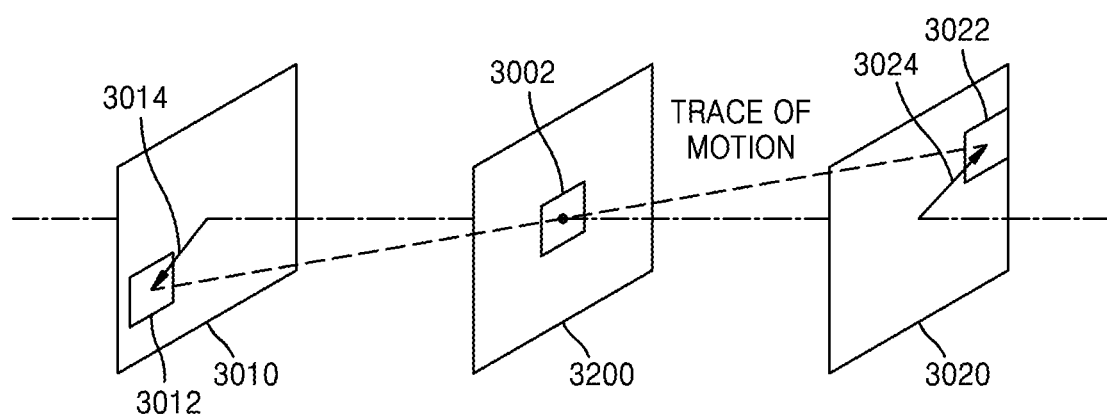
FIGS. 30A and 30B illustrate a prediction method using a right block of a current block in a frame rate up conversion (FRUC) mode.
Figure 30B:
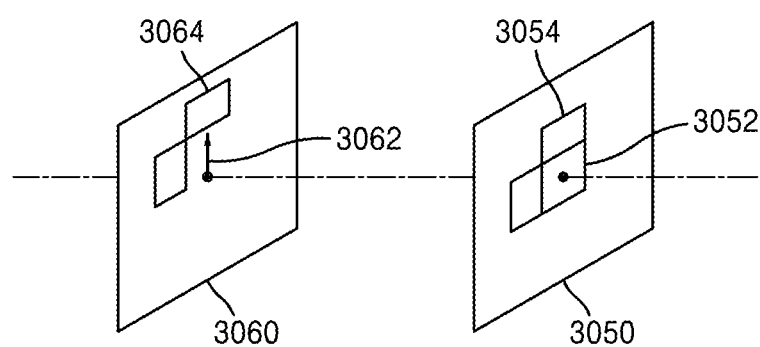

With reference to FIGS. 30A and 30B, a prediction method using a right block of a current block in an FRUC mode will now be described. FIG. 30A describes a bilateral matching FRUC mode, and FIG. 30B describes a template matching FRUC mode.

The FRUC mode is an inter prediction mode based on a frame rate increase transformation technique. The FRUC mode includes the bilateral matching FRUC mode and the template matching FRUC mode that are commonly characterized in determining a motion vector of a current block by using a merge candidate list of the current block.

The bilateral matching FRUC mode is an inter prediction mode in which a motion vector of a current block is searched for, assuming that there is a continuity in motions of sequential pictures. According to the bilateral matching FRUC mode, the prediction method determiner 1630 obtains a plurality of motion vector candidates from a merge candidate list. Then, the prediction method determiner 1630 obtains a reference block pair from each of the motion vector candidates. Also, the prediction method determiner 1630 compares matching accuracies of reference block pairs, and determines a motion vector candidate having highest matching accuracy as a motion vector predictor of the current block. The prediction method determiner 1630 scans a peripheral area of a point indicated by the motion vector predictor and thus determines a motion vector having machining accuracy that is more accurate than the motion vector predictor. Finally, the prediction method determiner 1630 determines the current block according to the motion vector.

Referring to FIG. 30A, a motion vector candidate is obtained from a merge candidate list with respect to a current block 3002 located in a current picture 3000. For a first reference picture 3010 that is temporally behind the current picture 3000, a first matching motion vector 3014 is determined based on the motion vector candidate. Then, for a second reference picture 3020 that is temporally ahead the current picture 3000, a second matching motion vector 3024 is determined based on the motion vector candidate.

The first matching motion vector 3014 and the second matching motion vector 3024 are proportional to a temporal distance between the current picture 3000 and the first reference picture 3010 and a temporal distance between the current picture 3000 and the second reference picture 3020. Therefore, a first reference block 3012, the current picture 3000, and a second reference block 3022 are located at a same motion tracking path. Therefore, assuming that there is continuity in motions of the first reference block 3012, the current picture 3000, and the second reference block 3022, matching accuracy of a first reference block 3012 and a second reference block 3022 is calculated.

With respect to all motion vector candidates of the merge candidate list, the aforementioned matching accuracy calculation process is performed. A motion vector candidate having highest matching accuracy is determined as a motion vector predictor of the current block.

Finally, with respect to the first reference picture 3010 and the second reference picture 3020, a peripheral area of a point indicated by the motion vector predictor is scanned to search for a motion vector having higher matching accuracy among reference blocks, and the current block 3002 is predicted according to the motion vector.

Because the merge candidate list is used in the bilateral matching FRUC mode, when a right block 3004 of the current block 3002 has been decoded, a merge candidate list including a motion vector of the right block 3004 may be used according to the method described with reference to FIG. 26.

The template matching FRUC mode is an inter prediction mode in which a template of a current block is compared with a template of a reference picture corresponded due to a motion vector candidate of a merge candidate list, and a motion vector of the current block is searched for due to matching accuracy between the templates. According to the template matching FRUC mode, left and upper areas of the current block may be determined as the template of the current block. When a right block of the current block has been decoded, a right area of the current block may also be determined as the template of the current block.

Referring to FIG. 30B, a motion vector candidate is obtained from a merge candidate list with respect to a current block 3052 located in a current picture 3050. Then, a matching motion vector 3062 is determined from the motion vector candidate, according to a temporal distance between the current picture 3050 and a reference picture 3060.

According to which neighboring blocks from among neighboring blocks of the current block 3052 have been decoded, a current block template 3054 is determined. Referring to FIG. 30B, because a right block of the current block 3052 has been determined, the current block template 3054 includes a right area of the current block 3050.

A reference block template 3064 is obtained from a point of the current block template 3054, the point being indicated by the matching motion vector 3062. Then, template matching accuracy is calculated by comparing the current block template 3054 with the reference block template 3064.

Template matching accuracy is calculated for each motion vector candidate. Then, a motion vector candidate having most accurate template matching accuracy is determined as a motion vector predictor of the current block 3050.

Finally, a peripheral area of a point of the reference picture 3060 indicated by the motion vector predictor is scanned to search for a motion vector having higher template matching accuracy, and the current block 3052 is predicted according to the motion vector.

As in the bilateral matching FRUC mode, the merge candidate list is also used in the template matching FRUC mode, and thus, when the right block 3004 of the current block 3002 has been decoded, a merge candidate list including a motion vector of the right block 3004 may be used according to the method described with reference to FIG. 26.

The block decoder 1640 may predict a current block according to a prediction method determined by the prediction method determiner 1630, and may decode the current block, based on a result of the prediction with respect to the current block.

When split information does not indicate that the current block is to be split, the block decoder 1640 may obtain, from a bitstream, a final block flag indicating whether the current block is a last block of an encoding tree block including the current block.

When the final block flag indicates that the current block is the last block of the encoding tree block, the block decoder 1640 may end decoding of the encoding tree block after the current block is decoded. After the current block is decoded, a next encoding tree block may be decoded by the video decoding device 1600. As in the encoding tree block including the current block, the block splitter 1610, the encoding order determiner 1620, the prediction method determiner 1630, and the block decoder 1640 that are included in the video decoding device 1600 may perform split of a block, determination of an encoding order, and decoding of a final split block on the next encoding tree block.

Also, the block decoder 1640 may not obtain the final block flag from the bitstream but may determine whether other blocks except for the current block from among blocks included in the encoding tree block have been decoded, and then may determine whether the current block is the last block of the encoding tree block.

The block decoder 1640 may entropy decode a syntax element according to a context of a neighboring block, the syntax element being obtained from the bitstream. Therefore, the syntax element may be entropy decoded, in consideration of encoding information about the right block of the current block.

For example, a skip flag indicating whether the current block has been encoded according to a skip mode may be entropy encoded according to a context of neighboring blocks of the current block. Therefore, the skip flag may be entropy encoded, in consideration of encoding information about the right block of the current block. Therefore, the block decoder 1640 may entropy encode the skip flag, in consideration of the encoding information about the right block of the current block.

Equally, split information indicating whether the current block is to be split into lower blocks, split shape information indicating to which shape the current block is to be split, an FRUC mode flag indicating whether the current block is to be predicted according to the FRUC mode, FRUC mode information indicating which FRUC mode is to be applied to the current block when the current block is to be predicted according to the FRUC mode, an affine mode flag indicating whether the current block is to be predicted according to the affine mode, a motion vector minimum unit flag indicating a minimum unit of the motion vector of the current block, or the like may be entropy decoded according to encoding information about neighboring blocks including the right block of the current block.

The block decoder 1640 may inverse quantize and inverse transform residual data obtained from the bitstream. Then, the block decoder 1640 may reconstruct the current block by using the inverse quantized and inverse transformed residual data, and the prediction result about the current block.

Figure 31:
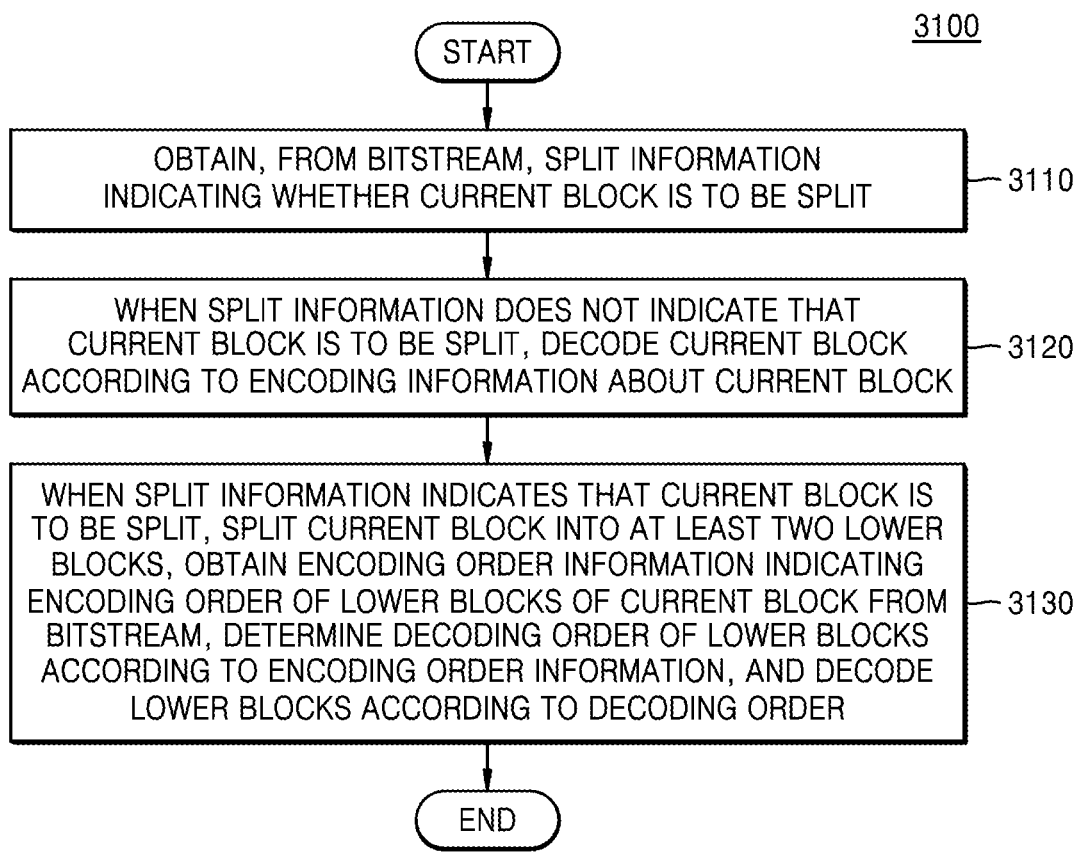
FIG. 31 illustrates a video decoding method according to an embodiment involving splitting a current block and determining an encoding order of split lower blocks.

FIG. 31 illustrates a video decoding method 3100 according to an embodiment involving splitting a current block and determining an encoding order of split lower blocks.

In operation 3110, split information indicating whether a current block is to be split is obtained from a bitstream.

When the split information does not indicate that the current block is to be split, a final block flag indicating whether the current block is a last block of an encoding tree block including the current block is obtained. When the final block flag indicates that the current block is the last block of the encoding tree block, after the current block is decoded, decoding of the encoding tree block is ended. When the final block flag indicates that the current block is not the last block of the encoding tree block, decoding is performed on a block in a next order of the current block.

In operation 3120, when the split information does not indicate that the current block is to be split, the current block is decoded according to encoding information about the current block.

When the current block is not split according to the split information but is inter predicted, reference samples to be referred to for the current block are determined according to whether a left block and a right block of the current block have been decoded. Then, the current block is predicted and decoded according to the reference samples.

When only the left block of the current block has been decoded, samples adjacent to the current block in left and upper directions are included in the reference samples. When only the right block of the current block has been decoded, samples adjacent to the current block in right and upper directions are included in the reference samples. When both the left and right blocks of the current block have been decoded, samples adjacent to the current block in right, left and upper directions are included in the reference samples. When both the left and right blocks of the current block have not been decoded, samples adjacent to the current block in an upper direction are included in the reference samples.

When the current block is to be intra predicted according to the DC mode, a prediction value of samples included in the current block is determined as an average value of sample values of reference samples, and a prediction value of samples that are from among the samples of the current block and are adjacent to the reference samples is filtered according to the sample values of the reference samples.

When the current block is intra predicted according to the planar mode, and the right block and an upper block of the current block have been decoded, a prediction value of the current sample is determined based on a first corner sample, a second corner sample, a first side sample, and a second side sample that are included in the reference samples. The first corner sample is located at a cross point of a row adjacent to the current block including the current sample in an upper direction and a column adjacent to the current block in a left direction. The second corner sample is located at a cross point of a row adjacent to the current block in a lower direction and a column adjacent to the current block in a right direction. The first side sample is located at a cross point of a row of the current sample and the column adjacent to the current block in the right direction. The second side sample is located at a cross point of the row adjacent to the current block in the upper direction and a column of the current sample.

When the current block is intra predicted according to a MPI mode, and the right block and an upper block of the current block have been decoded, a prediction value of the current sample may be determined according to a weighted average of a sample value of an upper sample adjacent to the current sample in an up direction and a sample value of a right sample adjacent to the current sample in a right direction. In this regard, prediction with respect to samples included in the current block may start from a sample adjacent to an upper right corner of the current block.

Unlike to the aforementioned example, when a current block is to be intra predicted according to a MPI mode, and a left block, a right block and an upper block of the current block have been decoded, the current block may be divided into a left area and a right area, and samples to be used in prediction with respect to the left area and the right area may be determined in different manners. According to another embodiment, when all of the left block, the right block and the upper block of the current block have been decoded, there is no division to a left area and a right area but a prediction value obtained from the left block and the upper block and a prediction value obtained from the right block and the upper block may be averaged or weight averaged and thus may be used as a final prediction value.

When the current sample is located in the left area, a prediction value of the current sample is determined by weight-averaging a sample value of the upper sample adjacent to the current sample in the upper direction and a sample value of the left sample adjacent to the current sample in the left direction. On the contrary, when the current sample is located in the right area, a prediction value of the current sample is determined by weight-averaging a sample value of the upper sample adjacent to the current sample in the upper direction and a sample value of the right sample adjacent to the current sample in the right direction.

When a current block is to be intra predicted according to the LM chroma mode or an MPC mode, and a right block of the current block has been decoded, the current block may be predicted by referring to luma-chroma sample pairs located in a right side of the current block.

When a current block is to be inter predicted, it is checked whether a right block of the current block has been decoded according to inter prediction. When the right block of the current block has been decoded according to inter prediction, a motion vector of the current block is determined by using a motion vector of the right block.

When a current block is inter predicted according to the merge mode, motion vector candidates are obtained from a right block, a lower right block, an upper block, an upper left block, a left block, and an upper right block. When a current block is inter predicted according to the AMVP mode, a first motion vector candidate is determined from a right block or a lower right block of the current block, and a second motion vector candidate is determined from an upper block, an upper right block, or an upper left block of the current block.

When a current block is inter predicted according to the AMVP mode, and a right block of the current block has been decoded prior to the current block, a first motion vector candidate may be determined from the right block or a lower right block of the current block, and a second motion vector candidate may be determined from an upper block, an upper right block, or an upper left block of the current block.

When a current block is inter predicted according to the OBMC mode, and a right block of the current block has been decoded prior to the current block, a right adjacent motion vector of the right block of the current block is obtained. Then, a sample located at a right boundary of the current block is predicted by using a prediction value according to the motion vector of the current block and a prediction value according to the right adjacent motion vector.

When a current block is inter predicted according to the sub-block MVP mode, the current bock is split into a plurality of sub-blocks. One or more spatial motion vectors may be obtained from a right block, a left block, and an upper block of the current block. A collocated block of the current block is obtained from a reference picture including the current block, and a temporal motion vector is obtained from the collocated block. A motion vector of the sub-blocks may be determined by averaging the one or more spatial motion vectors and the temporal motion vector.

When a current block is inter predicted according to the affine merge mode, affine candidate blocks that are predicted according to affine motion information including a plurality of motion vectors and are from among neighboring blocks of the current block are searched for, and an affine merge list including the affine candidate blocks is generated. Then, an affine candidate block to be used in predicting the current block is determined from the affine merge list, according to an affine merge flag obtained from a bitstream. Finally, the affine motion information is obtained from the affine candidate block. The affine merge list may be determined by using the method described with reference to FIG. 29B.

When a current block is inter predicted according to the affine AMVP mode, a first motion vector predictor is obtained from blocks adjacent to an upper left vertex of the current block. A second motion vector predictor is obtained from blocks adjacent to an upper right vertex of the current block. When a left block from among the left block and a right block of the current block has been decoded, a third motion vector predictor is obtained from blocks adjacent to a lower left vertex of the current block, and when the right block from among the left block and the right block of the current block has been decoded, a third motion vector predictor is obtained from blocks adjacent to a lower right vertex of the current block. Then, affine motion information about the current block is obtained according to the first motion vector predictor, the second motion vector predictor, and the third motion vector predictor.

When a current block is inter predicted according to the bilateral matching FRUC mode, and a right block of the current block has been decoded, a plurality of motion vector candidates are obtained from the right block, a lower right block, an upper block, an upper left block, a left block, and an upper right block of the current block. A plurality of reference block pairs are generated by applying the plurality of motion vector candidates to at least two reference pictures. Then, a reference block pair having high matching accuracy from among the plurality of reference block pairs is selected, and a motion vector candidate used in generating the selected reference block pair is determined as a motion vector predictor. A motion vector that generates a reference block pair having matching accuracy that is higher than that of the motion vector predictor is searched for by scanning peripheral areas of points with respect to the at least two reference pictures, the points being indicated by the motion vector predictor. Then, the motion vector is determined as a motion vector of the current block.

When a current block is inter predicted according to the template matching FRUC mode, and a right block of the current block has been decoded, a plurality of motion vector candidates are obtained from the right block, a lower right block, an upper block, an upper left block, a left block, and an upper right block of the current block. Then, a template of the current block is obtained from an upper area and a right area of the current block. Alternatively, when both the left block and the right block have been decoded, a plurality of motion vector candidates are obtained from the left block, a lower left block, an upper left block, the right block, the lower right block, the upper block, the upper left block, and the upper right block of the current block. Then, the template of the current block is obtained from a left area, an upper area, and a right area of the current block. A plurality of reference blocks are obtained by applying a plurality of motion vectors to at least two reference pictures, and a plurality of reference block templates are obtained from upper areas and right areas of the plurality of reference blocks. Then, a motion vector is determined as a motion vector predictor of the current block, the motion vector corresponding to a reference block template that is most similar to the template of the current block and is from among the plurality of reference block templates. Also, a motion vector that generates a reference block pair having matching accuracy that is higher than that of the motion vector predictor is searched for by scanning peripheral areas of points with respect to the at least two reference pictures, the points being indicated by the motion vector predictor. Then, the motion vector is determined as a motion vector of the current block.

In operation 3130, when the split information indicates that the current block is to be split, the current block is split into at least two lower blocks, encoding order information indicating an encoding order of the lower blocks of the current block is obtained from the bitstream, a decoding order of the lower blocks is determined according to the encoding order information, and the lower blocks are decoded according to the decoding order.

Functions of the video decoding device 1600 which are described with reference to FIG. 16 may be included in the video decoding method 3100.

Figure 32:
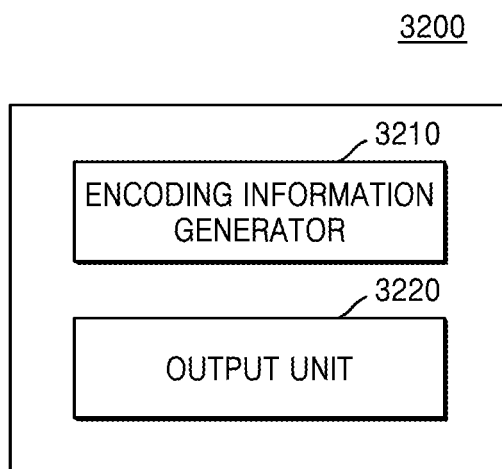
FIG. 32 illustrates a video encoding device according to an embodiment involving splitting a current block and determining an encoding order of split lower blocks.

FIG. 32 illustrates a video encoding device 3200 according to an embodiment involving splitting a current block and determining an encoding order of split lower blocks.

The video encoding device 3200 includes an encoding information generator 3210 and an output unit 3220. In FIG. 32, the encoding information generator 3210 and the output unit 3220 are illustrated as separate configuring units, but in another embodiment, the encoding information generator 3210 and the output unit 3220 may be combined to be implemented as one configuring unit.

In FIG. 32, the encoding information generator 3210 and the output unit 3220 are illustrated as configuring units included in one device, but devices performing respective functions of the encoding information generator 3210 and the output unit 3220 are not required to be physically adjacent to each other. Therefore, in another embodiment, the encoding information generator 3210 and the output unit 3220 may be dispersed.

The encoding information generator 3210 and the output unit 3220 may be implemented by one processor according to an embodiment. Alternatively, they may be implemented by a plurality of processors according to another embodiment.

Functions performed by the encoding information generator 3210 and the output unit 3220 of FIG. 32 may be performed by the output unit 130 of FIG. 1A.

The encoding information generator 3210 may split a current block into at least two lower blocks, and according to a result of the split of the current block, may determine whether to split the current block. For example, when coding efficiency by splitting the current block is good, the encoding information generator 3210 may determine to split the current block, and when coding efficiency by not splitting the current block is good, the encoding information generator 3210 may determine not to split the current block.

The encoding information generator 3210 may generate split information indicating whether the current block is to be split. Then, the encoding information generator 3210 may determine a split method for the current block according to the coding efficiency, and may generate split shape information indicating the split method for the current block.

The encoding information generator 3210 may determine an encoding order of lower blocks included in the current block, based on coding efficiency according to the encoding order, and may generate encoding order information indicating the encoding order of the lower blocks.

When the current block is not to be encoded any more, the encoding information generator 3210 may determine a prediction mode with respect to the current block. The encoding information generator 3210 may determine the prediction mode with respect to the current block, according to coding efficiencies of prediction modes that are applicable to the current block. The prediction modes that are applicable to the current block may include a directional mode, a DC mode, a planar mode, a MPI mode, an LM chroma mode, an MPC mode, a merge mode, an AMVP mode, an OBMC mode, a sub-block MVP mode, an affine merge mode, an affine AMVP mode, a bilateral matching FRUC mode, a template matching FRUC mode, or the like.

The output unit 3220 outputs a bitstream including encoding information about the current block, the encoding information being generated by the encoding information generator 3210. The encoding information about the current block may include split information, split shape information, split order information, prediction mode information, or the like.

Figure 33:
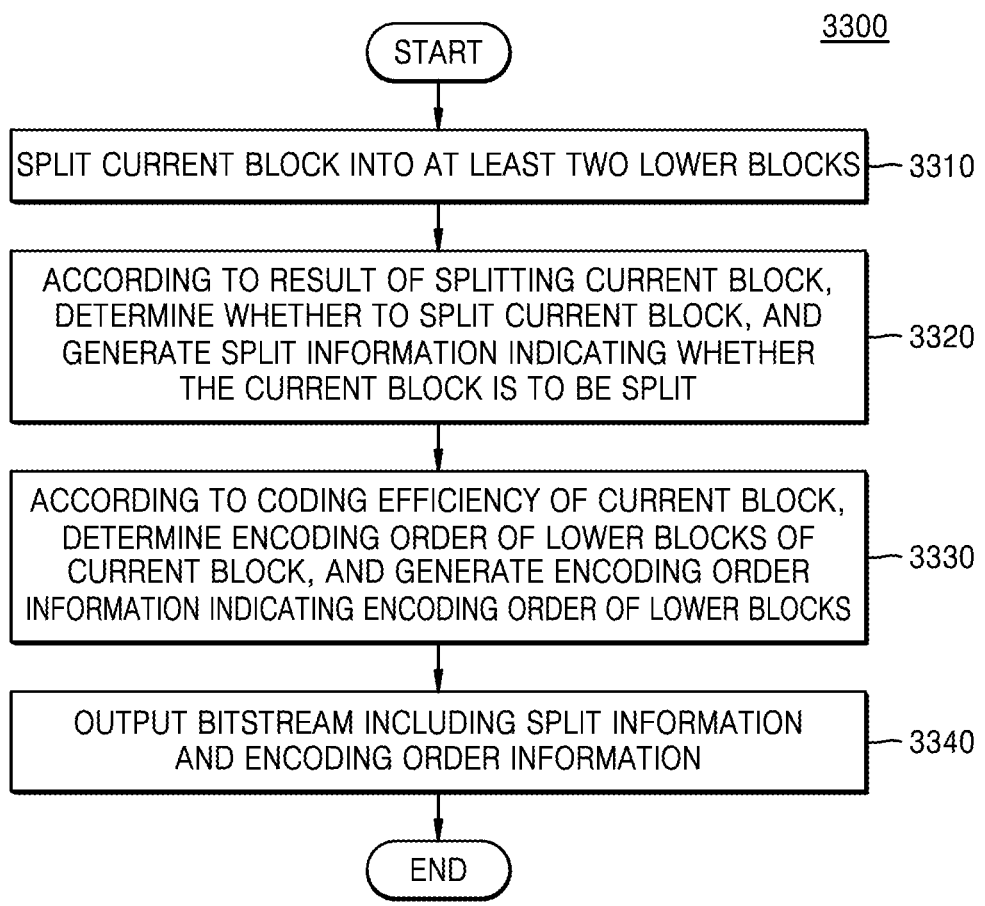
FIG. 33 illustrates a video encoding method according to an embodiment involving splitting a current block and determining an encoding order of split lower blocks.

FIG. 33 illustrates a video encoding method 3300 according to an embodiment involving splitting a current block and determining an encoding order of split lower blocks.

In operation 3310, a current block is split into at least two lower blocks.

In operation 3320, according to a result of splitting the current block, split information indicating whether to split the current block is determined.

In operation 3330, according to coding efficiency of the current block, an encoding order of the lower blocks of the current block is determined, and encoding order information indicating the encoding order of the lower blocks is generated.

In operation 3340, a bitstream including split information and the encoding order information is output.

Functions of the video encoding device 3200 which are described with reference to FIG. 32 may be included in the video encoding method 3300.

According to the video encoding technique based on coding units having a tree structure which is described with reference to FIGS. 1 to 33, image data of a spatial domain is encoded in each of the coding units having a tree structure, and decoding is performed on each largest coding unit according to the video decoding technique based on coding units having a tree structure so that the image data of the spatial domain is reconstructed, and by doing so, a picture and a video that is a picture sequence may be reconstructed. The reconstructed video may be reproduced by a reproducing apparatus, may be stored in a storage medium, or may be transmitted through a network.

The embodiments according to the present disclosure may be written as computer programs and may be implemented in a general-use digital computer that executes the programs by using a computer-readable recording medium.

While the best embodiments of the present disclosure have been described, it will be understood by one of ordinary skill in the art that various replacements, modifications, or changes with respect to the present disclosure may be made therein without departing from the spirit and scope as defined by the following claims. That is, the claims will be construed as including the various replacements, modifications, or changes with respect to the present disclosure. Therefore, the descriptions provided in the specification and drawings should be considered in a descriptive sense only and not for purposes of limitation.

The invention claimed is:

1. A video decoding method comprising:
obtaining, from a bitstream, split information indicating whether a current block is to be split into at least two lower blocks;
when the split information indicates that the current block is not to be split into the at least two lower blocks, decoding the current block;
when the split information indicates that the current block is to be split into the at least two lower blocks:
obtaining encoding order information indicating an encoding order of at least two lower blocks of the current block from the bitstream;
determining whether a decoding order is a first order from a left lower block to a right lower block, among the at least two lower blocks, or a second order from the right lower block to the left lower block, according to the encoding order information;
splitting the current block into the at least two lower blocks; and
when an affine merge mode is applied to the left lower block and the decoding order is the second order from the right lower block to the left lower block, determining an affine merge candidate list for the left lower block, from neighboring blocks including at least one of a right neighboring block and a lower right neighboring block, determining a motion vector of the left lower block by using a motion vector of a block from the affine merge candidate list and determining prediction samples of the left lower block by using the motion vector of the left lower block.

2. A video encoding method comprising:
determining whether to split a current block into at least two lower blocks, and generating split information indicating whether the current block is to be split into the at least two lower blocks or not to be split;
when the split information is generated to indicate that the current block is not to be split into the at least two lower blocks, encoding the current block;
when the split information is generated to indicate that the current block is to be split into the at least two lower blocks:
splitting the current block into the at least two lower blocks;
determining an encoding order of the at least two lower blocks of the current block, among a first order from a left lower block to a right lower block, among the at least two lower blocks, or a second order from the right lower block to the left lower block, and generating encoding order information indicating the encoding order of the at least two lower blocks;
when an affine merge mode is applied to the left lower block and the encoding order is the second order from the right lower block to the left lower block, determining an affine merge candidate list for the left lower block, from neighboring blocks including at least one of a right neighboring block and a lower right neighboring block determining a motion vector of the left lower block by using a motion vector of a block from the affine merge candidate list and generating an affine merge information of the left lower block to indicate the block from the affine merge candidate list; and
outputting a bitstream comprising the split information of the current block, the encoding order information of the current block, and the affine merge information of the left lower block.

3. A video encoding device comprising:
an encoding information generator configured to:
determine whether to split a current block into at least two lower blocks, and generate split information indicating whether the current block is to be split into the at least two lower blocks or not to be split,
when the split information is generated to indicate that the current block is not to be split into the at least two lower blocks, encode the current block,
when the split information is generated to indicate that the current block is to be split into the at least two lower blocks:
split the current block into the at least two lower blocks, determine an encoding order of the at least two lower blocks of the current block, among a first order from a left lower block to a right lower block, among the at least two lower blocks, or a second order from the right lower block to the left lower block, and generate encoding order information indicating the encoding order of the at least two lower blocks, and
when an affine merge mode is applied to the left lower block and the encoding order is the second order from the right lower block to the left lower block, determine an affine merge candidate list for the left lower block, from neighboring blocks including at least one of a right neighboring block and a lower right neighboring block determine a motion vector of the left lower block by using a motion vector of a block from the affine merge candidate list and generate an affine merge information of the left lower block to indicate the block from the affine merge candidate list; and
an output unit configured to, when the current block is split into the at least two lower blocks, output a bitstream comprising the split information of the current block, further comprising the encoding order information of the current block, and the affine merge information of the left lower block.

\* \* \* \* \*